March 24, 1953 F. KESSLER 2,632,817

TESTING APPARATUS FOR TELEPHONE SYSTEMS

Filed Feb. 8, 1951 10 Sheets-Sheet 1

INVENTOR.
Frank Kessler
BY
Smith, Olsen & Baird
Attys.

INVENTOR.
Frank Kessler
BY
Smith, Olsen & Baird
Attys.

INVENTOR.
Frank Kessler
BY
Smith, Olsen + Baird
Attys.

INVENTOR.
Frank Kessler
BY
Smith, Olsen + Baird
Attys.

March 24, 1953 F. KESSLER 2,632,817

TESTING APPARATUS FOR TELEPHONE SYSTEMS

Filed Feb. 8, 1951 10 Sheets-Sheet 5

INVENTOR.
Frank Kessler
BY
Smith, Olsen + Baird
Attys.

INVENTOR.
Frank Kessler
BY
Smith, Olsen & Baird
Attys.

INVENTOR.
Frank Kessler
BY
Smith, Olsen + Baird
Attys.

March 24, 1953 F. KESSLER 2,632,817

TESTING APPARATUS FOR TELEPHONE SYSTEMS

Filed Feb. 8, 1951 10 Sheets-Sheet 8

INVENTOR.
Frank Kessler
BY
Smith, Olsen + Baird
Attys.

March 24, 1953 F. KESSLER 2,632,817

TESTING APPARATUS FOR TELEPHONE SYSTEMS

Filed Feb. 8, 1951 10 Sheets-Sheet 9

INVENTOR.
Frank Kessler
BY
Smith, Olsen + Baird
Attys.

INVENTOR.
Frank Kessler
BY
Smith, Olsen & Baird
Attys.

Patented Mar. 24, 1953

2,632,817

UNITED STATES PATENT OFFICE 2,632,817

TESTING APPARATUS FOR TELEPHONE SYSTEMS

Frank Kessler, Rochester, N. Y., assignor to Automatic Electric Laboratories, Inc., Chicago, Ill., a corporation of Delaware Application February 8, 1951, Serial No. 210,040

44 Claims. (Cl. 179—175.2)

Figure 7:
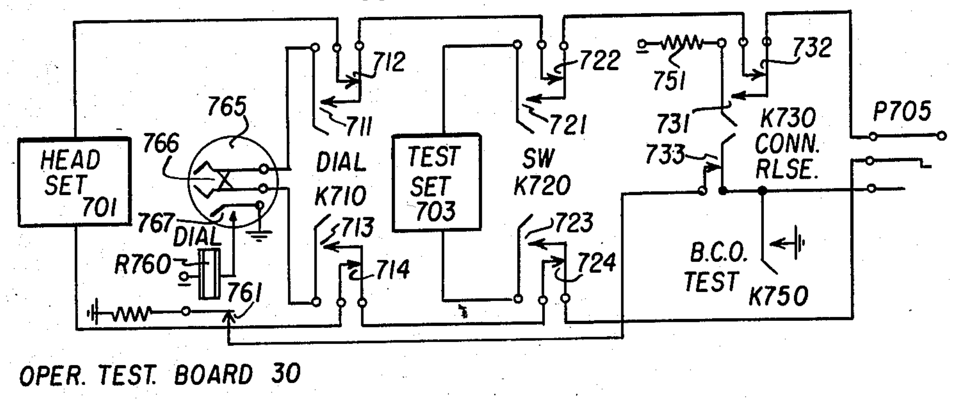

The present invention relates to telephone systems and more particularly to combined manual and automatic line selecting and testing apparatus therefor.

In an automatic telephone system, there is frequently provided in the central office a manual dial operator test board that has access via test switch trains to the subscriber lines in the central office and to the subscriber lines in the adjacent exchanges. A telephone system of this general character is disclosed in the copending application of Frank Kessler, Serial No. 774,495, filed September 17, 1947, now Patent No. 2,550,819, granted May 1, 1951; and in this system the operator at the test board in testing a subscriber line in the central office first connects the position equipment to the test switch train, dials the required digits comprising the numerical portion of the directory number of the desired subscriber line to cause the test switch train to select the desired subscriber line, and then manipulates the various test keys in the position equipment in order to cause the various line fault tests to be performed upon the selected subscriber line.

While this testing arrangement is very flexible permitting the detection of each individual type of line fault, as well as the measurement of the severity or intensity thereof, a greater number of key operations on the part of the operator at the test board are required and more time is consumed in performing a routine test upon the subscriber lines in the office than are desirable.

Accordingly it is a general object of the present invention to provide automatic line selecting and testing apparatus that may be employed in conjunction with a manual dial operator test board of the general character noted in the central office of an automatic telephone system, so that the operator at the test board may be relieved of a great amount of work involved in making routine line fault tests upon the subscriber lines; which apparatus is operative automatically to set up test connections sequentially to the various subscriber lines and automatically to perform a given series of predetermined line fault tests upon each selected subscriber line, automatically to identify the particular line fault that it has found upon a selected subscriber line, and automatically to identify the numerical portion of the directory number of the particular subscriber line upon which the line fault has been found; whereby the operator at the test board may devote most of her time to measuring the severity or character of line faults that have been located and identified by the automatic apparatus.

Another object of the invention is to provide automatic routine apparatus of improved circuit connection and arrangement for sequentially selecting the subscriber lines in an office of an automatic telephone system and for performing a given series of predetermined line fault tests upon each selected subscriber line.

Another object of the invention is to provide in an automatic telephone system including a central office and at least one exchange, an arrangement for selectively connecting automatic routine apparatus of the character noted arranged in the central office to the test switch train in the central office and to the test switch train in the exchange, whereby the operator at the test board in the central office may supervise the operation of the apparatus to test the subscriber lines in the office and the subscriber lines in the exchange.

Another object of the invention is to provide automatic routine apparatus of the character noted that also incorporates an improved arrangement for testing itself incident to the testing thereby of each group of subscriber lines in the office that is undergoing the routine testing operation.

Another object of the invention is to provide automatic routine apparatus of the character noted that is, in response to the connection thereof to a particular office, automatically adapted to the particular grouping arrangement of the subscriber lines in the particular office, so that the apparatus is automatically controlled to skip any vacant group of subscriber lines in the particular office and so that operation of the apparatus is automatically arrested when it has been operated to test each group of subscriber lines in the particular office.

A further object of the invention is to provide in automatic routine apparatus of the character noted, an improved arrangement of a single set of counting relays for the purposes of sending switch setting signals to the test switch train so as to effect sequential setting up of the test connections to the different subscriber lines, of indicating the different subscriber lines as they are sequentially selected to be tested, of performing the sequential line fault tests upon a selected subscriber line, of identifying the particular fault that is found on a selected subscriber line, and of cycling the apparatus itself.

A further object of the invention is to provide in an automatic routine apparatus of the character noted that is capable of sequentially testing a maximum of 10,000 subscriber lines in an office, an improved arrangement for effecting skipping of each vacant thousand group of subscriber lines, of each vacant hundred group of subscriber lines in each thousand group of subscriber lines, and of each busy subscriber line that is selected to be tested.

A still further object of the invention is to provide in automatic routine apparatus of the character noted, an improved arrangement for camping upon a busy switching element in the connected test switch train and then for controlling the last-mentioned element of the test switch train when it becomes idle in order to effect the selection of a subscriber line to be tested.

Further features of the invention pertain to the particular arrangement of the circuit elements of the telephone system and of the automatic routine apparatus, whereby the above-outlined and additional operating features thereof are attained.

Section 1.—*The general arrangement of the telephone system*

Figures 1, 12:
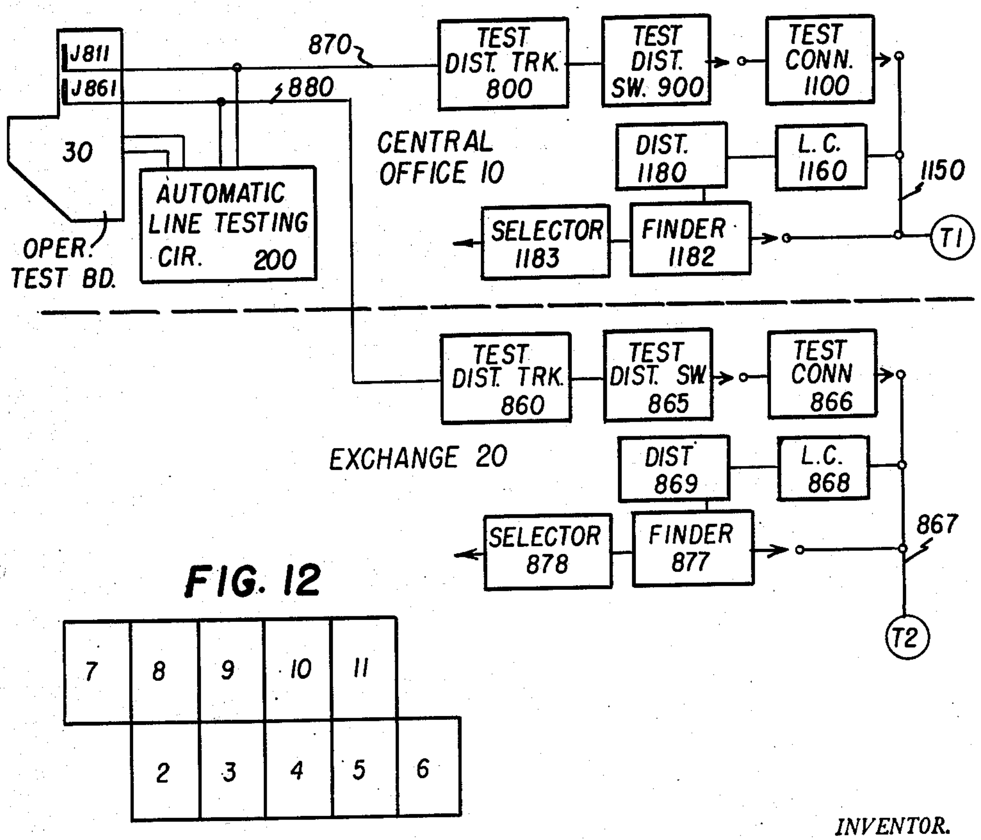
Figure 2:
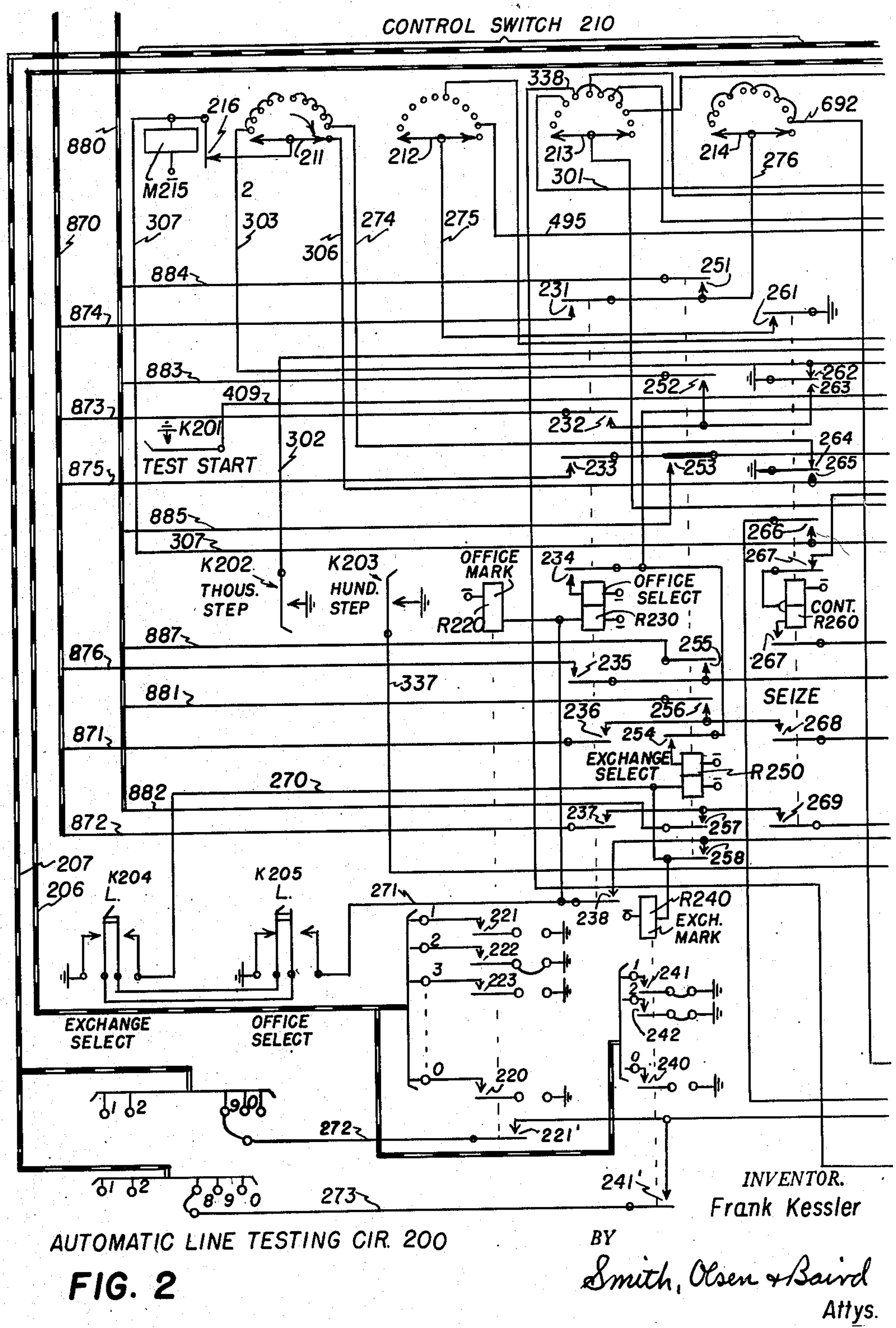
Figure 3:
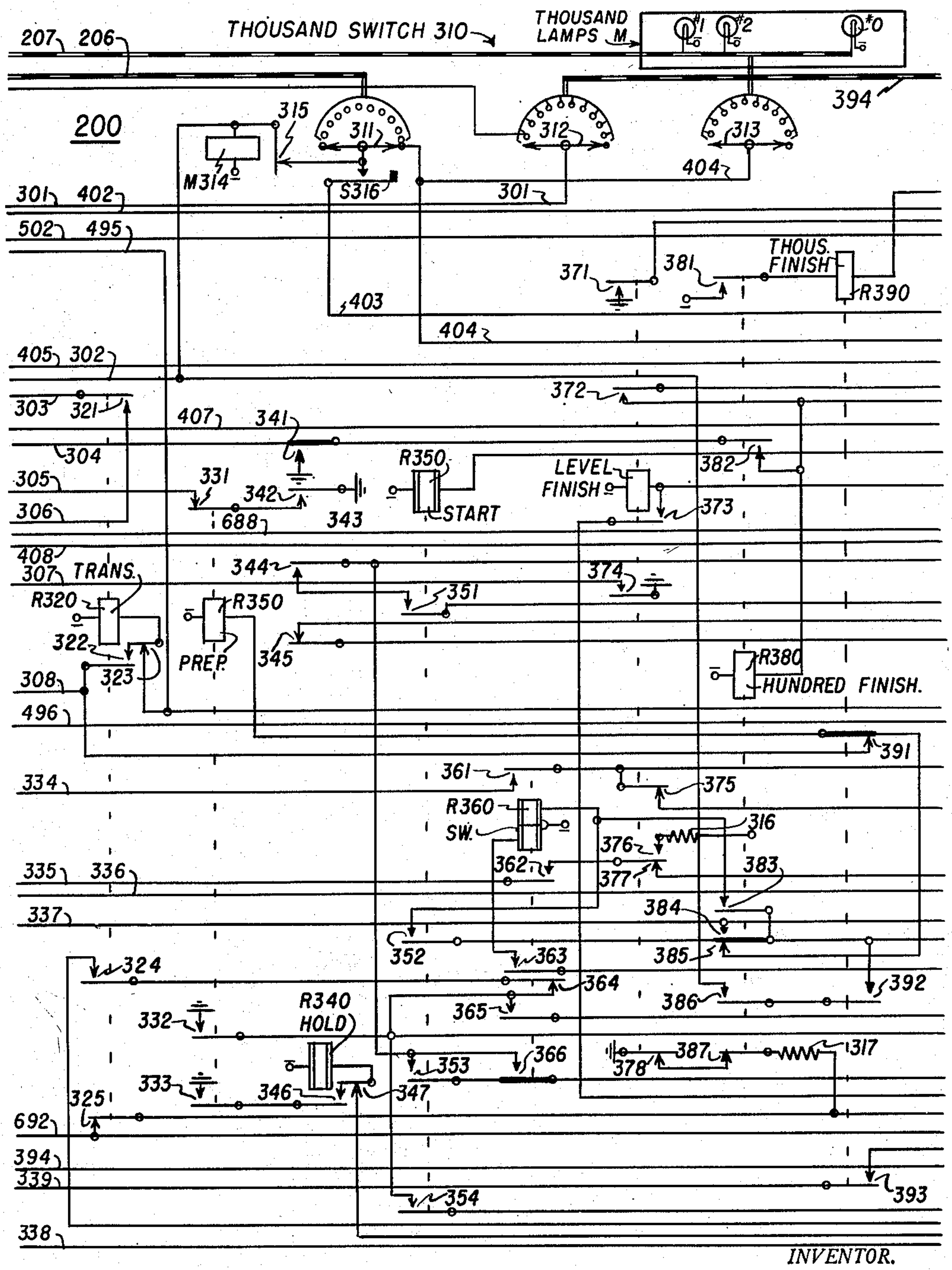
Figure 4:
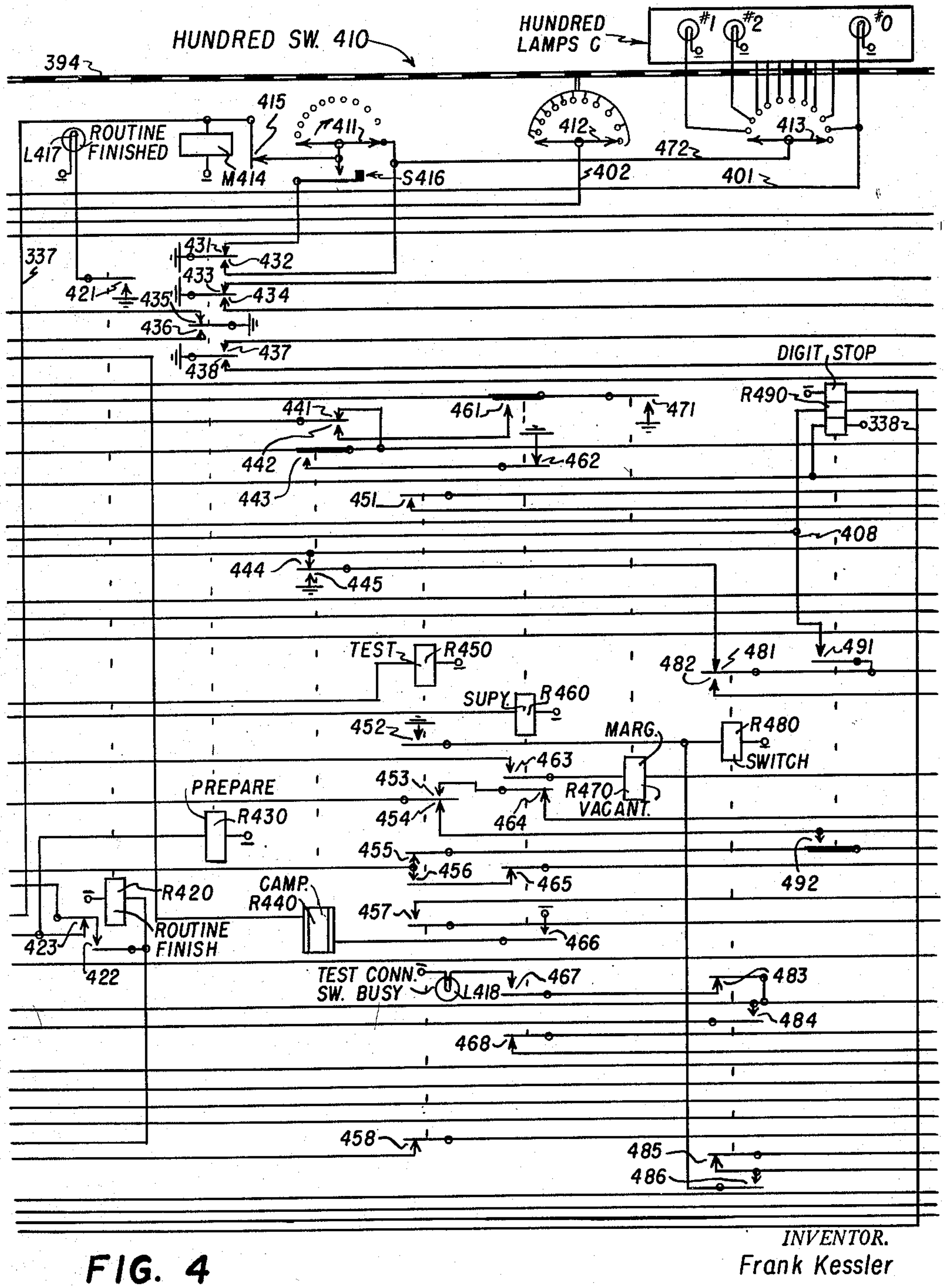
Figure 5:
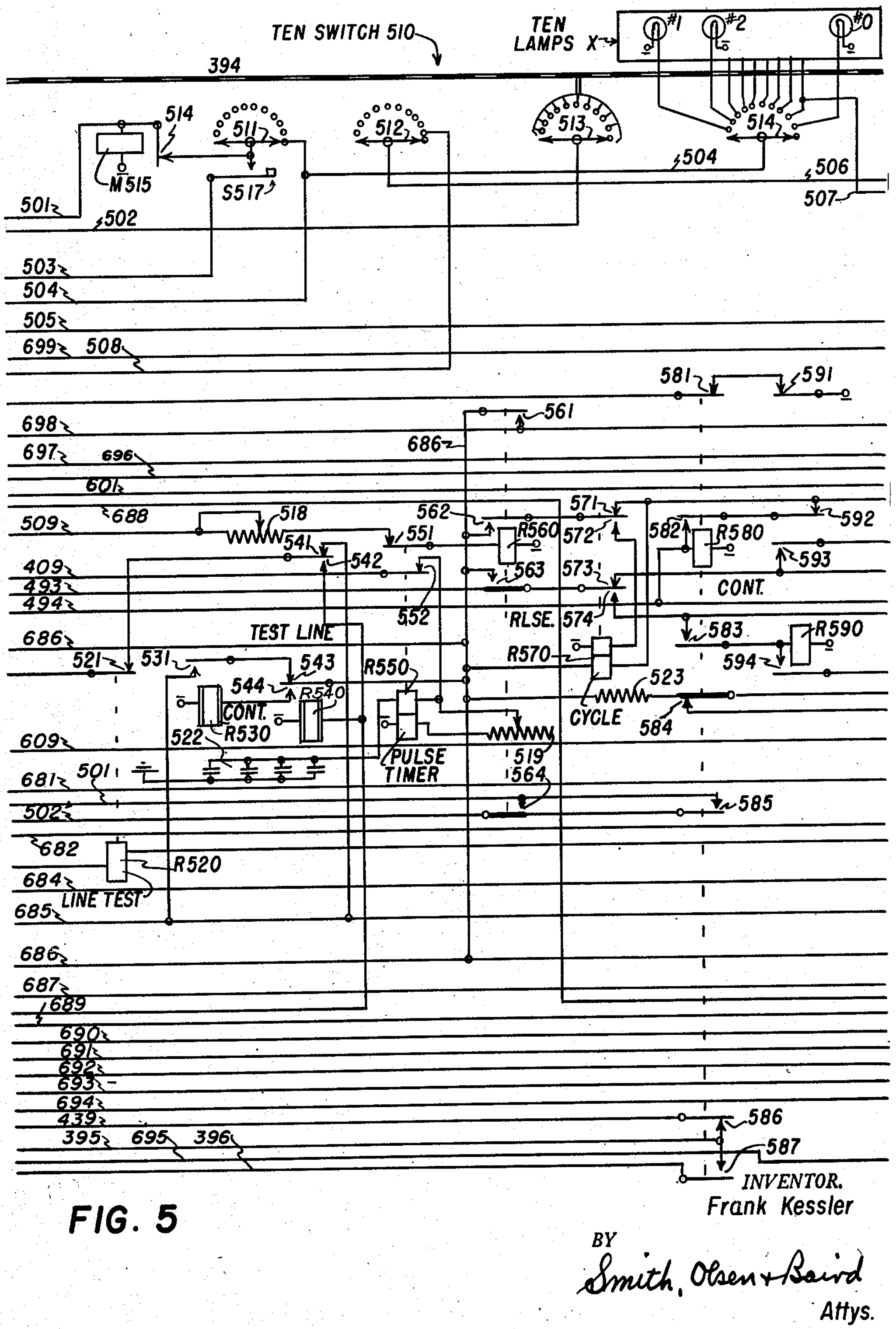
Figure 6:
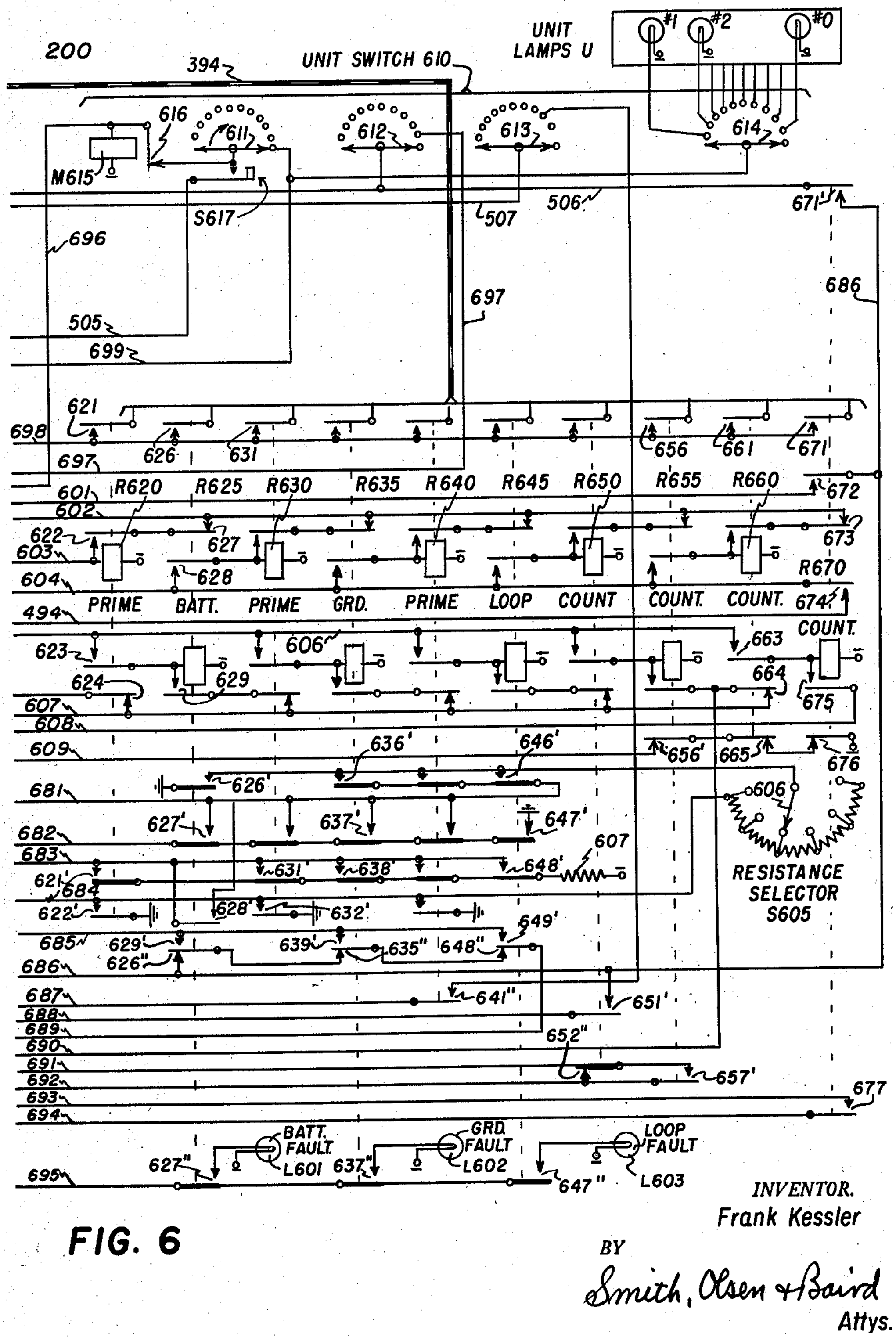

The invention both as to its organization and method of operation, together with further objects and advantages thereof will best be understood by reference to the following specification taken in connection with the accompanying drawings in which Figure 1 is a schematic diagram of the central office and the exchange of a telephone system embodying the present invention and illustrating the general arrangement of the apparatus incorporated therein; Figs. 2 to 11, inclusive, taken together, illustrate the details of certain of the apparatus incorporated in the telephone system, which apparatus has embodied therein the feature of the invention as briefly outlined above; and Fig. 12 is a block diagram illustrating the mode of combining Figs. 2 to 11, inclusive, to form a unified circuit diagram.

Figure 8:
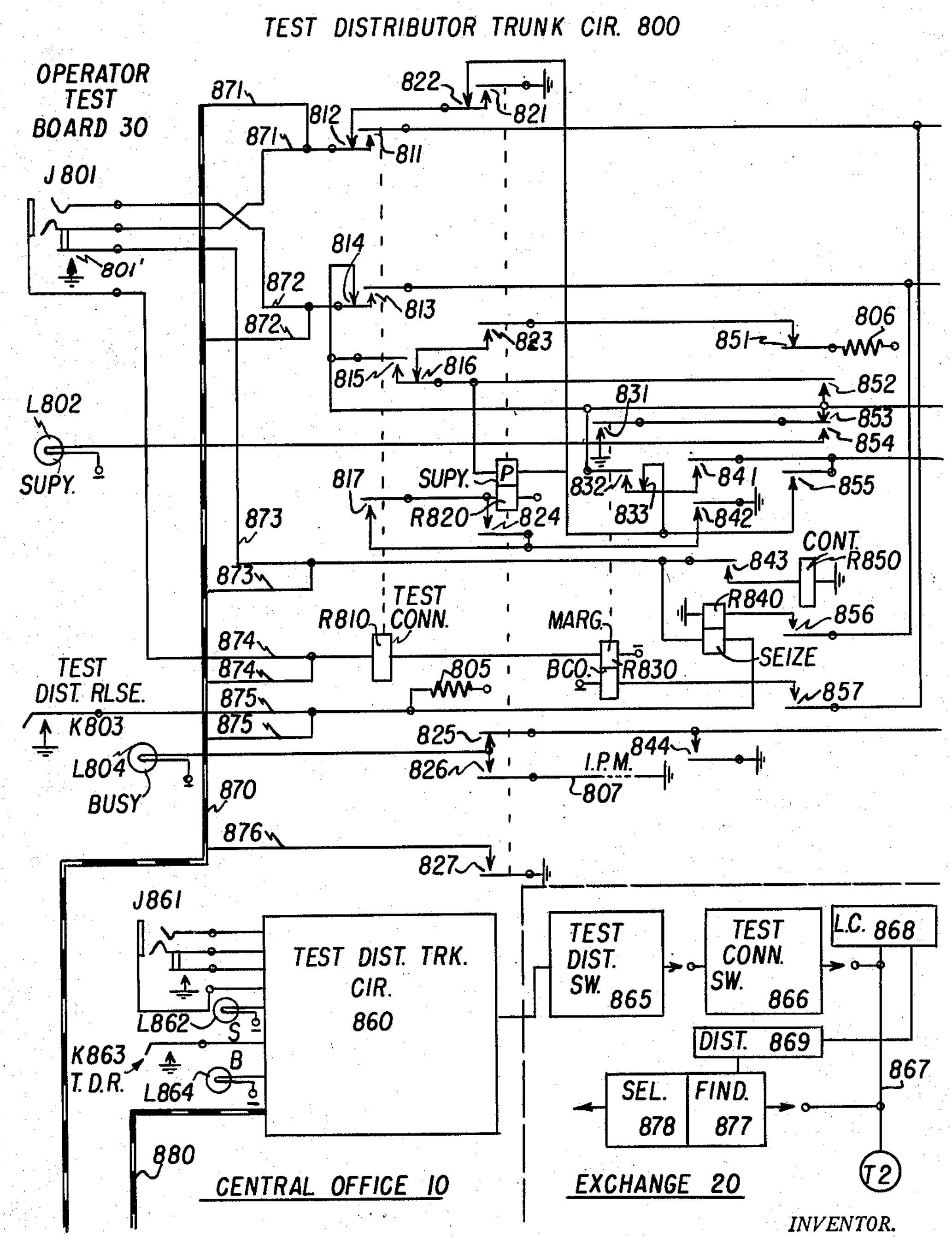
Figure 10:
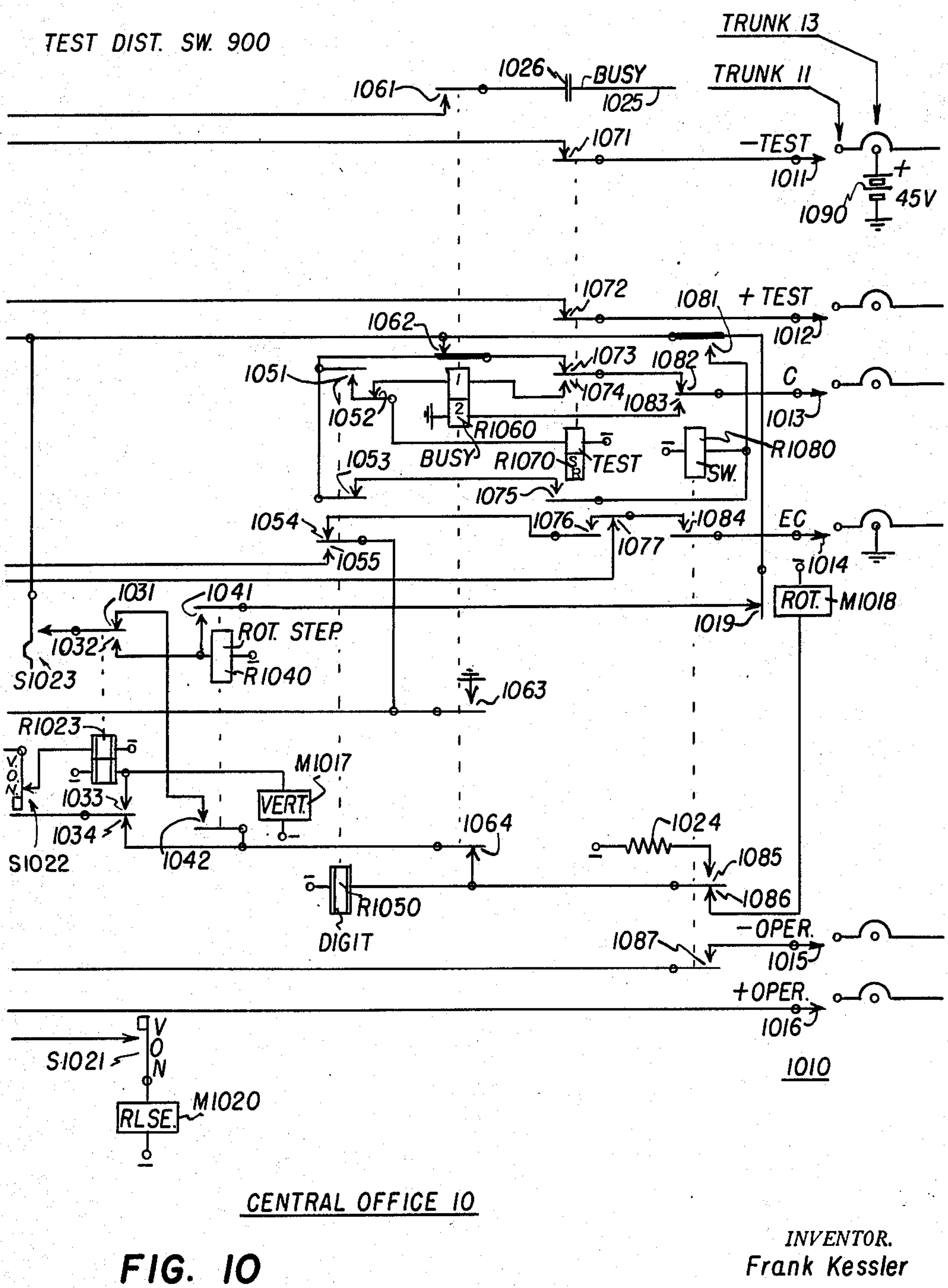
Figure 11:
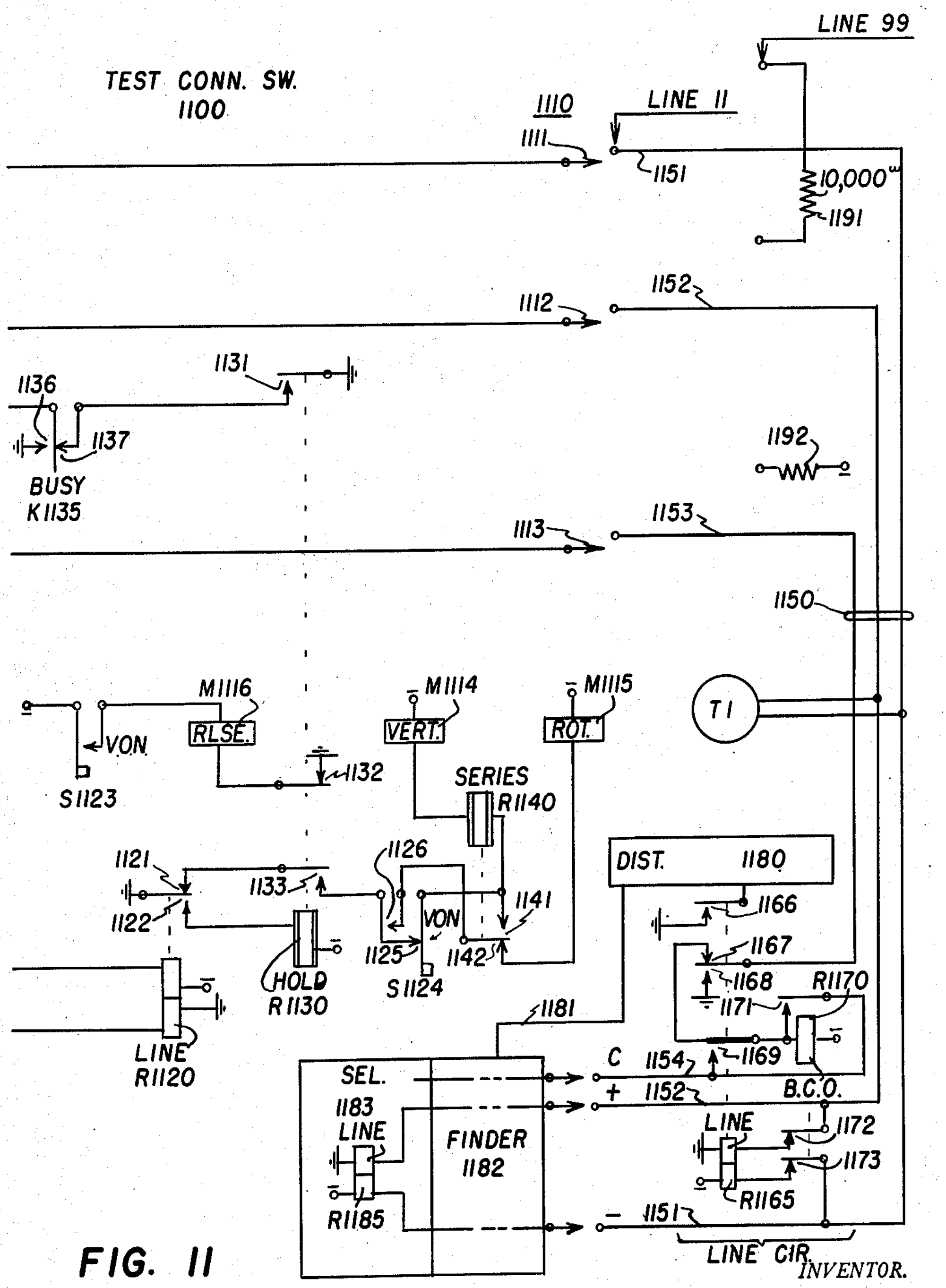
Figure 9:
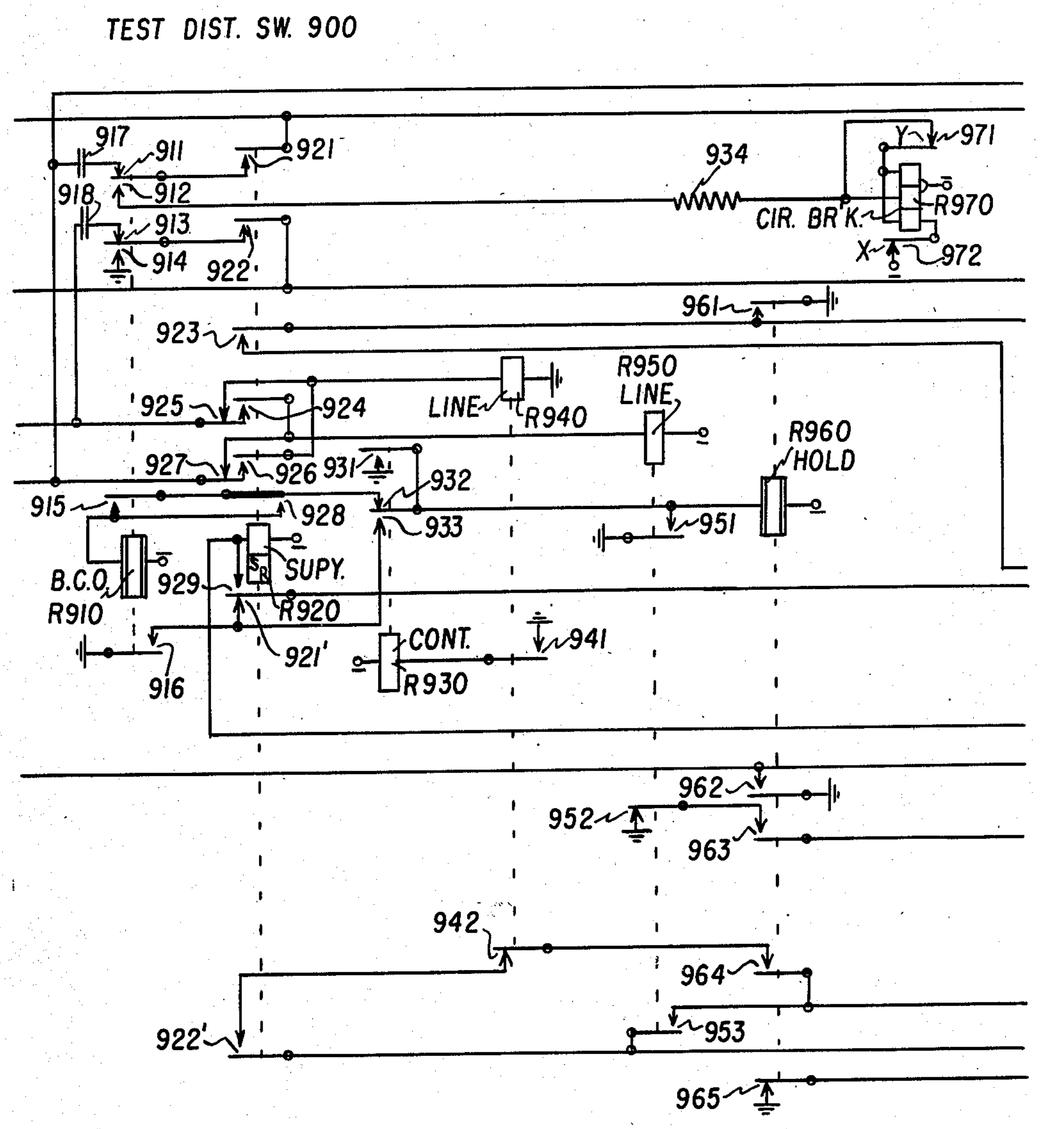

More particularly, Figs. 2 to 6, inclusive, illustrate the details of the automatic line testing circuit incorporated in the central office of the telephone system; Fig. 7 illustrates the details of one of the cord circuits disposed at the operator test board in the central office of the telephone system; Fig. 8 illustrates the details of one of the test distributor trunk circuits disposed in the central office and accessible to the operator test board therein; Figs. 9 and 10 illustrate the details of one of the test distributor switches disposed in the central office and operatively connected to the test distributor trunk circuit shown in Fig. 8; Fig. 11 illustrates the details of one of the test connector switches disposed in the central office and accessible to the test distributor switch shown in Figs. 9 and 10.

Referring now more particularly to Fig. 1, the telephone system there illustrated serves an area comprising a central office 10 and at least one exchange 20. The central office 10 serves a maximum number of 10,000 subscriber lines, including the subscriber line 1150 extending to the subscriber substation T1; and for purposes of illustration, it may be assumed that the second and tenth thousand groups of subscriber lines therein are vacant. The exchange 20 serves a maximum number of 10,000 subscriber lines, including the subscriber line 867 extending to the subscriber substation T2; and for purposes of illustration, it may be assumed that the first, second, ninth and tenth thousand groups of subscriber lines therein are vacant. Accordingly in the central office 10, the ninth thousand group of subscriber lines comprises the last thousand group that is equipped; and in the exchange 20, the eighth thousand group of subscriber lines comprises the last thousand group that is equipped.

In the central office 10 each of the subscriber lines is provided with a line circuit individual thereto, the subscriber line 1150 being provided with the individual line circuit 1160; and each hundred group of subscriber lines is provided with a distributor, the first hundred group of subscriber lines, including the subscriber line 1150, being provided with the distributor 1180. Further in the central office 10, each hundred group of subscriber lines is provided with a group of finder-selector links, the first hundred group of subscriber lines, including the subscriber line 1150, being provided with the group of finder-selector links, including the link illustrated that consists of the finder 1182 and the selector 1183. Of course the various groups of finder-selector links comprise a portion of the local switch train in the central office 10, that further includes groups of intermediate selectors, not shown, and groups of connectors, not shown, having access to the hundred groups of subscriber lines. Finally in the central office 10, the group of finder-selector links, including the link illustrated, is operatively associated with the distributor 1180.

Similarly in the exchange 20, each of the subscriber lines is provided with a line circuit individual thereto, the subscriber line 867 being provided with the individual line ciruit 868; and each hundred group of subscriber lines is provided with a distributor, the first hundred group of subscriber lines, including the subscriber line 867, being provided with the distributor 869. Further in the exchange 20, each hundred group of subscriber lines is provided with a group of finder-selector links, the first hundred group of subscriber lines, including the subscriber line 867, being provided with the group of finder-selector links, including the link illustrated that consists of the finder 877 and the selector 878. Of course the various groups of finder-selectors links comprise a portion of the local switch train in the exchange 20, that further includes groups of intermediate selectors, not shown, and groups of connectors, not shown, having access to the hundred groups of subscriber lines. Finally in the exchange 20, the group of finder-selector links, including the link illustrated, is operatively associated with the distributor 869.

Further the central office 10 comprises a test switch train that includes a plurality of test distributor trunk circuits 800, etc., a plurality of individually associated test distributor switches 900, etc., and a plurality of test connector switches 1100, etc. Each of the test distributor switches 900, etc., has access to each of the test connector switches 1100, etc.; and the test connector switches 1100, etc., have access to the individually associated hundred groups of subscriber lines. Thus the test connector switch 1100 has access to the first hundred group of subscriber lines, including the subscriber line 1150. Also in the central office 10, certain of the hundred groups of subscriber lines within a given thousand group of subscriber lines may be vacant; and for purposes of illustration, it may be assumed that the third hundred group of subscriber lines in the first thousand group of subscriber lines is vacant. In this case, special connections are made in the bank of the test distributor switches 900, etc., corresponding to the trunk that normally would have extended to the associated test connector switch. More specifically in the case illustrated, a booster battery 1090 of 45-volts is connected to the negative terminal of the contact set that would normally terminate the trunk 13; and a group strap is connected to the E. C. terminal of the contact set that would normally terminate the trunk 13. In the arrangement illustrated, it may be assumed that trunk 11 appearing in the contact banks of the test distributor switches 900, etc., extends to the test connector switch 1100, and that line 11 in the contact bank of the test connector switch 1100 comprises the subscriber line 1150; whereby the numerical portion of the directory number of the subscriber line 1150 extending to the subscriber substation T1 is 1111. Also in the central office 10, in each test connector switch 1100, etc., line 99 comprises a test line that is employed only for the purpose of controlling the automatic line testing circuit 200, in a manner more fully described hereinafter. For example, in the first hundred group of subscriber lines in the first thousand group of subscriber lines, line 99 appearing before the test connector switch 1100 comprises a test line and consists of a resistor 1191 of 10,000 ohms bridged between the + and − contacts of the associated contact set, as well as exchange battery potential applied through a resistor 1192 to the C contact of the associated contact set.

Further the exchange 20 comprises a test switch train that includes a plurality of test distributor trunks 860, etc., a plurality of individually associated test distributor switches 865, etc., and a plurality of test connector switches 866, etc. Each of the test distributor switches 865, etc., has access to each of the test connector switches 866, etc.; and the test connector switches 866, etc., have access to the individually associated hundred groups of subscriber lines. Thus the test connector switch 866 has access to the first hundred group of subscriber lines, including the subscriber line 867. Also in the exchange 20, certain of the hundred groups of subscriber lines within a given thousand group of subscriber lines may be vacant; however in the interest of brevity this arrangement is not disclosed, but, if provided, is the same as that in the central office 10, described above. Also in the exchange 20 in each test connector switch 866, etc., line 99 comprises a test line just as is the case in each test connector switch 1100, etc., in the central office 10.

Finally the central office 10 comprises an operator test board 30, and an automatic line testing circuit 200. Each of the test distributor trunk circuits 800, etc., terminates in an individually associated jack J801, etc., at the operator test board 30 in order to permit full manual testing of the subscriber lines in the central office 10; and each of the test distributor trunk circuits 860, etc., terminates in an individually associated jack J861, etc., at the operator test board 30 in order to permit full manual testing of the subscriber lines in the exchange 20. At least one of the test distributor trunk circuits 800, etc., is provided with a cable in multiple to the associated jack and accessible to the automatic line testing circuit 200; the test distributor trunk circuits 800 being provided with the cable 870 in multiple to the jack J801 and accessible to the automatic line test circuit 200. Similarly at least one of the test distributor trunk circuits 860, etc., is provided with a cable in multiple to the associated jack and accessible to the automatic line testing circuit 200; the test distributor trunk circuit 860 being provided with the cable 880 in multiple to the jack J861 and accessible to the automatic line testing circuit 200. Finally the operator test board P800 comprises a plurality of cord circuits 700, etc., having access to the jacks J801, J861, etc.

Section 2.—*The apparatus incorporated in the telephone system*

In the central office 10, each of the subscriber substations T1, etc., is provided with conventional subscriber substation apparatus, including a ringer, a dial, and a telephone instrument; each of the line circuits may be identical to the line circuit 1160 that includes, as illustrated in Fig. 11, a line relay R1165 and a B. C. O. relay R1170. The distributors 1180, etc., are preferably of a suitable conventional type, the finders 1182, etc., are of the conventional Strowger type; and the selectors 1183, etc., are of a conventional Strowger type, the selector 1183 including, as illustrated in Fig. 11, a line relay R1185. Similarly in the exchange 20, each of the subscriber substations T2 is provided with conventional subscriber substation apparatus of the character previously noted; each of the line circuits 868, etc., may be identical to the line circuit 1160; the distributors 869, etc., may be identical to the distributor 1180; the finders 877 may be identical to the finder 1182; and the selectors 878, etc., may be identical to the selector 1183.

Preferably the test connector switches 1100, etc., in the central office 10 and the test connector switches 866, etc., in the exchange 20 are identical; and the test connector switch 1100 comprises, as illustrated in Fig. 11, a Strowger mechanism 1110, including a wiper carriage carrying three wipers 1111 to 1113, inclusive, as well as an associated contact bank, including ten vertically spaced-apart arcuately arranged rows of ten contact sets each. Also the Strowger mechanism 1110 comprises a vertical magnet M1114 for driving the wiper carriage step by step in the vertical direction, a rotary magnet M1115 for driving the wiper carriage step by step in the rotary direction, and a release magnet M1116 for releasing the wiper carriage and for causing it to be returned to its normal rotary and vertical positions. Also associated with the wiper carriage of the Strowger mechanism 1110 are two sets of switch springs S1123 and S1124 are operated when the wiper carriage is moved away from its normal vertical position. Finally the test connector switch 1100 comprises a busy key K1135 and a relay group, including a line relay R1120, a hold relay R1130, and a series relay R1140. As previously explained, in the test connector switch 1100, the subscriber line 1150 extending to the subscriber substation T1 comprises line 11 therein, and line 99 therein comprises a test line, including the resistors 1191 and 1192 connected and arranged in the manner previously described.

Preferably the test distributor switches 900, etc., in the central office 10 and the test distributor switches 865, etc., in the exchange 20 are identical; and the test distributor switch 900 comprises, as illustrated in Figs. 9 and 10, a Strowger mechanism 1010, including a wiper carriage carrying six wipers 1011 to 1016, inclusive, as well as an associated contact bank, including ten vertically spaced-apart arcuately arranged rows of ten contact sets each. Also the Strowger mechanism 1010 comprises a vertical magnet M1017 for driving the wiper carriage step by step in the vertical direction, a rotary magnet M1018 for driving the wiper carriage step by step in the rotary direction, and a release magnet M1020 for releasing the wiper carriage and for causing it to be returned to its normal rotary and vertical positions. Also associated with the wiper carriage of the Strowger mechanism 1010 are two sets of switch springs S1021 and S1022 that are operated when the wiper carriage is moved away from its normal vertical position, as well as a set of switch springs S1023 that is operated when the wiper carriage is moved two steps away from its normal vertical position. Finally the test connector switch 900 comprises a relay group, including a B. C. O. relay R910, a supervisory relay R920, a control relay R930, two line relays R940 and R950, a hold relay R960, a circuit breaker relay R970, a transfer relay R1030, a rotary step relay R1040, a digit relay R1050, a busy relay R1060, a test relay R1070, and a switch relay R1080. As previously explained, in the test distributor switch 900, the trunk extending to the test connector switch 1100 comprises trunk 11 therein, and trunk 13 therein is vacant and is provided with the arrangement including the booster battery 1090 arranged in the manner previously described.

Preferably the test distributor trunk circuits 800, 860, etc., in the central office 10 are identical; and the test distributor trunk circuit 800 comprises, as illustrated in Fig. 8, a relay group, including a test connect relay R810, a supervisory relay R820, a B. C. O. relay R830, a seize relay R840 and a control relay R850. As previously explained, the test distributor trunk circuit 800 terminates in the jack J801 at the operator test board 30 and is accessible to the automatic line testing circuit 200 via the access cable 870. At the operator test board 30 and individually associated with the jack J801, there are provided a supervisory lamp L802, a busy lamp L804 and a test distributor release key K803. In a similar manner, the test distributor trunk circuit 860 terminates in the jack 861 at the operator test board 30 and is accessible to the automatic line testing circuit 200 via the access cable 880. At the operator test board 30 and individually associated with the jack J861, there are provided a supervisory lamp L862, a busy lamp L864, and a test distributor release key K863.

Also as previously noted, the operator test board 30 comprises a plurality of cord circuits 700, etc., that may be identical; and the cord circuit 700 comprises, as illustrated in Fig. 7, a plug P701, a connector release key K730, a B. C. O. test key K750, a switch key K720, a dial key K710, and a dial relay R760. Finally the operator test board 30 comprises a head set 701, a dial 765, and a test set 702; the details of the test set 702 have not been illustrated, as they may be entirely conventional or of the general character disclosed in the previously mentioned Kessler application.

The automatic line testing circuit 200 disposed in the central office 10, as illustrated in Figs. 2 to 6, inclusive, terminates the access cables 870 and 880 respectively extending to the test distributor trunk circuits 800 and 860 and comprises a control switch 210, a thousand switch 310, a hundred switch 410, a ten switch 510, and a unit switch 610, as well as a thousand bank of lamps M, a hundred bank of lamps C, a ten bank of lamps X, and a unit bank of lamps U. The control switch 210 is of the rotary type, including four wipers 211 to 214, inclusive, provided with individually associated contact banks, as well as a rotary magnet M215 for driving the wipers noted step by step in the clockwise direction. The thousand switch 310 is of the rotary type, including three wipers 311 to 313, inclusive, provided with individually associated contact banks, as well as a rotary magnet M314 for driving the wipers noted step by step in the clockwise direction. The hundred switch 410 is of the rotary type, including three wipers 411 to 413, inclusive, provided with individually associated contact banks, as well as a rotary magnet M414 for driving the wipers noted step by step in the clockwise direction. The ten switch 510 is of the rotary type, including four wipers 511 to 514, inclusive, provided with individually associated contact banks, as well as a rotary magnet M515 for driving the wipers noted step by step in the clockwise direction. The unit switch 610 is of the rotary type, including four wipers 611 to 614, inclusive, provided with individually associated contact banks, as well as a rotary magnet M615 for driving the wipers noted step by step in the clockwise direction. Also, the thousand switch 310 includes a set of switch springs S316 that is operated when the wipers noted thereof are moved away from their home positions; the hundred switch 410 includes a set of switch springs S416 that is operated when the wipers noted thereof are moved away from their home positions; the ten switch 510 includes a set of switch springs S517 that is operated when the wipers noted thereof are moved away from their home positions; and the unit switch 610 includes a set of switch springs S617 that is operated when the wipers noted thereof are moved away from their home positions.

The thousand bank of lamps comprises ten individual lamps M1 to M0, inclusive; the hundred bank of lamps comprises ten individual lamps C1 to C0, inclusive; the ten bank of lamps comprises ten individual lamps X1 to X0, inclusive; and the unit bank of lamps comprises ten individual lamps U1 to U0, inclusive. Of course, it will be understood that the four banks of lamps mentioned are disposed at the operator test board 30. Also at the operator test board 30, and comprising a part of the automatic line testing circuit 200, there are provided a routine finished lamp L417, a test connector switch busy lamp L418, a battery fault lamp L601, a ground fault lamp L602, a loop fault lamp L603, a test start key K201, an office select key K203, an exchange select key K204, a thousand step key K202, a hundred step key K203 and a manually adjustable resistance selector S605.

Further the automatic line testing circuit 200 comprises a relay group, including an office mark relay R220; an office select relay R230, an exchange mark relay R240, and an exchange select relay R250. In the circuit 200, the office select key K205 is individual to the central office 10 and the exchange select key K204 is individual to the exchange 20, the keys K205 and K204 being arranged in interlocked relation. Operation of the office select key K230 connects the circuit 200 to the access cable 870 extending to the test distributor trunk circuit 800; while operation of the exchange select relay R250 connects the circuit 200 to the access cable 880 extending to the test distributor trunk circuit 860. Operation of the office mark relay R220 marks, at the contacts 221 to 220, inclusive, the respective marking conductors in an associated marking cable 206 corresponding to the thousand groups of subscriber lines that are vacant in the central office 10, a strap to ground being provided on the contact 222 since it has been assumed that the second thousand group of subscriber lines is vacant in the central office 10. Also the office mark relay R220 completes, at the contacts 221', a connection to the conductor 272 that is strapped to the ninth marking conductor in an associated marking cable 207 indicating that the ninth thousand group of subscriber lines in the central office 10 is the last thousand group of subscriber lines therein. Operation of the exchange mark relay R240 marks, at the contacts 241 to 240, inclusive, the respective marking conductors in the associated marking cable 206 corresponding to the thousand groups of subscriber lines that are vacant in the exchange 20, a strap to ground being provided on the contacts 241 and 242 since it has been assumed that the first and second thousand group of subscriber lines are vacant in the exchange office 20. Also the exchange mark relay R240 completes, at the contacts 241' a connection to the conductor 273 that is strapped to the eighth marking conductor in the associated marking cable 207 indicating that the eighth thousand group of subscriber lines in the exchange 20 is the last thousand group of subscriber lines therein.

The relay group provided in the automatic line testing circuit 200 further comprises a control relay R260, a transfer relay R320, a prepare relay R330, a hold relay R340, a start relay R350, a switch relay R360, a level finish relay R370, a hundred finish relay R380, a thousand finish relay R390, a routine finish relay R420, a prepare relay R430, a camp relay R440, a test relay R450, a supervisory relay R460, a vacant relay R470, a switch relay R480, a digit stop relay R490, a line test relay R520, a control relay R530, a test line relay R540, a pulse timer relay R550, a pulse relay R560, a cycle relay R570, and twelve individual count relays R580, R590, R620, R625, R630, R635, R640, R645, R650, R655, R660 and R670. The individual count relays R620, R630 and R640 serve to prime the line test relay R520 and have been designed "prime" in Fig. 6. Similarly the individual count relays R525, R535 and R545 set the circuit to cause the line test relay R520 to perform respective battery fault, ground fault and loop fault tests and have been respectively designated "battery," "ground" and "loop" in Fig. 6.

A better understanding of the connection and arrangement of the apparatus incorporated in the telephone system will be facilitated from a consideration of the extension of the various test connections and the performance of the various tests in conjunction therewith appearing hereinafter.

Section 3.—*Setting up a test connection from the operator test board 30 in the central office 10 to a subscriber line therein*

First assuming that a test connection is to be set up from the operator test board 30 in the central office 10 to a subscriber line therein, such, for example, as the subscriber line 1150 extending to the subscriber substation T1, the operator at the test board 30 first selects an idle cord circuit, such, for example, as the cord circuit 700 and inserts the plug thereof into a jack terminating an idle test distributor trunk circuit, such, for example, as the test distributor trunk circuit 800 that is included in the test switch train in the central office 10. The test distributor 800 is marked as idle by the extinguished condition of the busy lamp L804; and when the plug P705 is inserted into the jack J801, the contacts 801' of the jack J801 are closed completing a circuit, including the resistor 805, for energizing the lower winding of the seize relay R840, causing the latter relay to operate. Also when the plug P705 is thus inserted into the jack J801, a path, including the contacts 733 of the connector release key K730 and the contacts 761, is completed for applying resistance ground to the sleeve conductor 874, completing a circuit for energizing in series the winding of the test connect relay R810 and the upper winding of the B. C. O. relay R830. When this series circuit is thus completed, the test connect relay R810 operates; however the B. C. O. relay does not operate as it is of the marginal type.

Upon operating the seize relay R840 completes, at the contacts 844, a circuit for illuminating the busy lamp L804 in order to indicate to the operator at the test board 30 the present busy condition of the test distributor trunk circuit 800; and completes, at the contacts 843, a path, including the contacts 801' of the jack J801, for short-circuiting the winding of the control relay R850 in order positively to prevent operation of the latter relay at this time. Upon operating the test connect relay R810 completes, at the contacts 817 a circuit for energizing the lower winding of the supervisory relay R820; however, the latter relay does not operate at this time, as it is of the polarized type. Further the test connect relay R810 completes at the contacts 815, a path for bridging the upper winding of the supervisory relay R820 across the +0 and −0 leads and consequently for energizing in series the upper winding of the supervisory relay R820 and the windings of the line relays R940 and R950. The circuit mentioned extends from ground by way of the winding of the line relay R940, the contacts 925, the +0 lead, the contacts 815, the upper winding of the supervisory relay R820, the contacts 833 and 841, the −0 lead, the contacts 927 and the winding of the line relay R950 to battery. When this series circuit is thus completed, the line relays R940 and R950 operate; however, the supervisory relay R820 still does not operate since the upper winding thereof is not poled in the proper direction. Upon operating the line relay R940 completes, at the contacts 941, a circuit for operating the control relay R930. Upon operating the line relay R950 completes, at the contacts 951, a circuit for operating the hold relay R960. Upon operating the control relay R930 completes, at the contacts 931, a multiple holding circuit for retaining operated the hold relay R960. Also upon operating the seize relay R840 completes, at the contacts R844, a multiple circuit, including the set of switch springs S1022, for energizing the upper winding of the supervisory relay R1030, in order to cause the latter relay to operate. Upon operating the hold relay R860 completes, at the contacts 862, a multiple circuit for illuminating the busy lamp L804 and for energizing the upper winding of the transfer relay R1030.

At this time, the test distributor trunk circuit 800 and the individually connected test distributor switch 900 have been seized; and the operator at the operator test board 30 operates the dial key K710 in the cord circuit 700. When the dial key K710 is thus operated, the head set 701 is disconnected, at the contacts 712 and 714 thereof from the across the tip and ring of the plug P705, and the dial 765 is connected, at the contacts 711 and 713 thereof across the tip and ring of the plug P705. The operator then proceeds to dial the numerical portion of the directory number of the subscriber line 1150 in the central office 10 that is to be tested, which numerical portion of the directory number is 1111. When the operator actuates the finger wheel of the dial 765 in accordance with the first digit 1, the set of off-normal switch springs 767 in the dial 765 is closed effecting operation of the dial relay R760. The set of off-normal springs 767 is retained in its closed position until after the finger wheel of the dial 765 is returned back into its normal position, and during the return of the finger wheel back into its normal busy condition the set of impulsing springs 766 is operated in accordance with the digit dialed.

Upon operating the dial relay R760 interrupts, at the contacts 761, the previously traced path for applying resistance ground potential to the sleeve of the plug P705 effecting restoration of the test connect relay R810. Upon restoring the test connect relay R810 completes, at the contacts 812 and 814, an impulsing circuit, including the dial 765 in the cord circuit 700, across the +0 and −0 leads respectively extending to the line relays R940 and R950. Further the test connect relay R810 interrupts, at the contacts 815 and 817, the circuits for respectively energizing the upper and lower windings of the supervisory relay R820; however without effect since the supervisory relay R820 occupies its restored position at this time. The impulsing circuit mentioned extends from ground by way of the line relay R940, the contacts 925, the +0 lead, and the contacts 814 to the tip conductor 872, and from battery by way of the winding of the line relay R950, the contacts 927, the −0 lead, the contacts 841, 833, 822 and 812 to the ring conductor 871. The tip and ring conductors 872 and 871 are connected via the jack J801, the plug P705, the contact 732 of the connector relay key K730, the contacts 722 and 724 of the switch key K720, and the contacts 711 and 713 of the dial key K710 to the dial 765; and thus to the impulsing springs 766. Accordingly the circuit for energizing in series the windings of the line relays R940 and R950 includes the impulsing spring 766 of the dial 765, whereby a single impulse corresponding to the first digit 1 is transmitted from the dial 765 incident to the return of the finger wheel thereof back into its normal position to the line relays R940 and R950 causing the latter relays to restore and then reoperate.

The line relay R940 restores and then reoperates interrupting and then recompleting, at the contacts 941, the circuit for energizing the winding of the control relay R930 in order to cause the latter relay to restore and then reoperate, without effect. Similarly the line relay R950 restores and then reoperates in order to interrupt and then recomplete, at the contacts 951, the circuit for energizing the winding of the hold relay R960; whereby the latter relay is retained in its operated position during impulsing as it is of the slow-to-release type. Also the line relay R950 completes and then interrupts, at the contacts 952, a circuit, including the contacts 963 and 1033, for energizing in multiple the lower winding of the transfer relay R1030 and the vertical magnet M1017 so as to retain the transfer relay R1030 in its operated position during impulsing, the latter relay being of the slow-to-release type, and to operate the vertical magnet M1017 in accordance with the first digit. Specifically the vertical magnet M1017 operates and restores in accordance with the first digit 1 driving the wiper carriage of the Strowger mechanism 1010 one step in the vertical direction away from its normal vertical position, whereby the sets of switch springs S1022 and S1021 are operated. The set of switch springs S1021 is operated to prepare a circuit, traced hereinafter, for operating the release magnet M1020; and the set of switch springs S1022 is operated to interrupt the circuit for energizing the upper winding of the transfer relay R1030 so that the latter relay may restore following the first digit 1.

At the conclusion of the first digit 1, the finger wheel of the dial 765 is returned back into its normal position operating the set of off-normal springs 767 so as to deenergize the winding of the dial relay R760, whereby the latter relay restores shortly thereafter, it being of the slow-to-release type. Upon restoring the dial relay R760 recompletes, at the contacts 761, the path for applying resistance ground to the sleeve of the plug P705 so as to effect reoperation of the test connect relay R810. Upon reoperating the test connect relay R810 against substitutes the upper winding of the supervisory relay R820 for the dial 765 across the +0 and −0 leads so as to retain operated the line relays R840 and R850. The supervisory relay R820 is not operated at this time, as previously noted, since it is of the polarized type. Shortly following the conclusion of the first digit 1, the transfer relay R1030 restores, interrupting, at the contacts 1033, a further point in the previously traced multiple circuit for energizing the lower winding of the transfer relay R1030 and the vertical magnet M1017; and preparing, at the contacts 1034, a multiple circuit for energizing the winding of the digit relay R1050 and the rotary magnet M1018. At this time, the wiper carriage of the Strowger mechanism 1010 has been driven one step in the vertical direction away from its normal vertical position selecting the first thousand group of subscriber lines.

The operator at the test board 30 then dials the second digit 1 again effecting operation and subsequent restoration of the dial relay R760 and the consequent restoration and subsequent reoperation of the test connect relay R810, whereby the second digit 1 is transmitted from the dial 765 to the line relays R940 and R950 in a manner identical to that previously described. Specifically the line relay R950 follows the second digit 1 restoring and then reoperating so as to complete and then interrupt, at the contacts 952, the previously mentioned circuit, including the contacts 963, 1034 and 1064, for energizing the winding of the digit relay R1050, and the multiple circuit, including the contacts 1036, for operating the rotary magnet M1018. Accordingly the digit relay R1050 operates and remains operated during impulsing as it is of the slow-to-release type; while the rotary magnet M1018 is operated and restored driving the wiper carriage of the Strowger mechanism 1010 one step in the rotary direction to cause the wiper set to select trunk 11 in the associated contact bank extending to the test connector switch 1100. Upon operating the digit relay R1050 completes, at the contacts 1051, a circuit, including the contacts 1062 and 961 for operating the test relay R1070. Shortly following the second digit 1, the dial relay R760 restores effecting reoperation of the test connect relay R810, whereby the upper winding of the supervisory relay R820 is again connected in series circuit relation with the windings of the line relays R940 and R950 retaining the latter relays in their operated positions and preventing operation of the supervisory relay R820. The subsequent operation of the test distributor switch 900 depends upon the idle or busy condition of the test connector switch 1100.

First assuming that the test connector switch 1100 is busy at this time, when the digit relay R1050 restores shortly following the second digit 1, it completes, at the contacts 1052, a test circuit extending from battery by way of the winding of the test relay R1070 and the upper winding of the busy relay R1060 to the control wiper 1013 of the wiper set, this connection also including the contacts 1074 and 1082. At this time ground appears upon the control conductor of trunk 11 extending to the test connector switch 1100 due to the busy condition thereof, whereby the test relay R1070 is retained in its operated position and the busy relay R1060 is operated. Also upon restoring the digit relay R1050 interrupts, at the contacts 1051, the original circuit for operating the test relay R1070. Upon operating the busy relay R1060 completes, at the contacts 1063, a circuit for operating the supervisory relay R920. Upon operating the supervisory relay R920 reverses, at the contacts 924, 925, 926 and 927, the polarity of the line relays R940 and R950, whereby the upper winding of the supervisory relay R820 is poled to operate at this time. Upon operating the supervisory relay R820 interrupts, at the contacts 825, the circuit for illuminating steadily the busy lamp L804; and completes, at the contacts 826, an alternative circuit, including the interrupted pulse conductor 807, for flashing the busy lamp L804 so as to indicate to the operator at the test board 30 the busy condition of the test connector switch 1100. Further the supervisory relay R920 completes, at the contacts 921, a connection, including the contacts 911, 1061 and 811 and the condensers 1026 and 917 between the busy conductor 1025 and the ring conductor 871 so as to return an audible busy signal to the cord circuit 700.

Upon observing the flashing of the busy lamp L804, the operator at the test board 30 may restore the dial key K710 so as to disconnect the dial 765 from the cord circuit 700 and to reconnect the headset 701 thereto, whereby the audible busy tone signal may be heard by the operator in the headset 701 and thus verified. Upon receiving the visual and audible busy signals indicative of the busy condition of the test connector switch 1100, the operator at the test board 30 may modify her testing plan in certain particulars, as explained more fully hereinafter.

Now assuming that the test connector switch 1100 is idle at the conclusion of the second digit 1 and when the digit relay R1050 restores, the digit relay R1050 interrupts, at the contacts 1051, the previously traced original circuit for energizing the winding of the test relay R1070 and completes, at the contacts 1052, the previously traced test connection between battery and the control wiper 1013 of the wiper set by way of the winding of the test relay R1070 and the upper winding of the busy relay R1060. However in this case no ground appears upon the test conductor of trunk 11 extending to the test connector switch 1100, whereby the winding of the test relay R1070 is deenergized and the upper winding of the busy relay R1060 is not energized. Accordingly the test relay R1070 restores shortly thereafter, as it is of the slow-to-release type, and the busy relay R1060 is retained in its restored condition. During the short transition time between the restoration of the digit relay R1050 and the restoration of the test relay R1070, a circuit, including the contacts 1075, 1053, 1062 and 961, is completed for operating the switch relay R1080. Upon operating the switch relay R1080 completes, at the contacts 1081, a holding circuit, including the contacts 961, for energizing the winding thereof; and completes, at the contacts 1087, a loop circuit, including the contacts 953, and the operate wipers 1015 and 1016 of the wiper set for energizing in series the upper and lower winding of the line relay R1120 in the test connector switch 1100 causing the latter relay to operate. Further the switch relay R1080 interrupts, at the contacts 1086, a further point in the impulsing path extending to the rotary magnet M1018.

Upon operating the line relay R1120 completes, at the contacts 1122, a circuit for operating the hold relay R1130. Upon operating the hold relay R1130 completes, at the contacts 1131, a path, including the contacts 1137 of the busy key K1135, for applying ground to the test conductor of trunk 11 thereby positively to mark the test connector switch 1100 as busy to the other test distributor switches having access thereto. Also the hold relay R1130 prepares, at the contacts 1133, a circuit, traced hereinafter, for energizing the winding of the series relay R1140 and for operating the vertical magnet M1114. At this time the test distributor switch 900 has operated to seize the idle test connector switch 1100 and the test connector switch 1100 has been conditioned to respond to the third digit.

When the third digit 1 is then dialed at the operator test board 30, the relays in the cord circuit 700, in the test distributor trunk circuit 800 and in the test distributor switch 900 are controlled in the manner previously explained, whereby the line relays R940 and R950 follow. Specifically the line relay R950 restores and then reoperates so as to interrupt and then recomplete, at the contacts 953, the loop circuit extending via the operate wipers of the wiper set of the Strowger mechanism 1010 in the test distributor switch 900 to the line relay R1120 in the test connector switch 1100 so as to cause the latter relay to follow. More particularly the line relay R1120 restores and then reoperates in order to interrupt and then recomplete, at the contacts 1122, the circuit for energizing the winding of the hold relay R1130, whereby the latter relay is retained in its operated position during impulsing, as it is of the slow-to-release type. Further the line relay R1120 completes, and then interrupts, at the contacts 1121, the previously mentioned circuit, including the contacts 1133 and the contacts 1125 of the set of switch springs S1124, for energizing the winding of the series relay R1140 and for operating the vertical magnet M1114. Accordingly the series relay R1140 operates and remains operated during impulsing as it is of the slow-to-release type, and the vertical magnet M1114 operates and restores driving the wiper carriage of the Strowger mechanism 1110 one step in the vertical direction away from its normal vertical position in accordance with the third digit 1. When the wiper carriage of the Strowger mechanism 1110 is driven out of its normal vertical position, the sets of switch springs S1123 and S1124 are operated. Specifically the set of switch springs S1123 operates to interrupt a further point in a circuit traced hereinafter, for operating the release magnet M1116; and the set of switch springs S1124 is operated first to complete, at the contacts 1126 thereof, a multiple point in the circuit for energizing the winding of the series relay R1140 and for operating the vertical magnet M1114; and then to interrupt, at the contacts 1125 thereof, the original circuit for energizing the winding of the series relay R1140 and for operating the vertical magnet M1114.

At the conclusion of the third digit 1, the relays in the cord circuit 700, in the test distributor trunk circuit 800, and in the test distributor switch 900 are controlled in the manner previously explained, whereby the line relays R940 and R950 are retained in their operated positions in order to retain operated the line relay R1120. Accordingly the line relay R1120 retains interrupted, at the contacts 1121, the circuit for energizing the winding of the series relay R1140 and for operating the vertical magnet M1114 so that the series relay R1140 restores shortly thereafter. Upon restoring the series relay R1140 interrupts, at the contacts 1141, a further point in the holding circuit for energizing the winding thereof and for operating the vertical magnet M1114; and prepares, at the contacts 1142, a circuit traced hereinafter for operating the rotary magnet M1115.

When the fourth digit 1 is then dialed at the operator test board 30, the relays in the cord circuit 700, in the test distributor trunk circuit 800 and in the test distributor switch 900 are controlled in the manner previously explained, whereby the line relays R940 and R950 follow. Specifically the line relay R950 follows the fourth digit 1 repeating, at the contact 953, to the line relay R1120, causing the latter relay to follow. More particularly the line relay R1120 restores and then reoperates completing and then interrupting, at the contacts 1121, a circuit, including the contacts 1133 and 1142 and the contacts 1126 of the set of switch springs S1124, for operating the rotary magnet M1115; whereby the wiper carriage of the Strowger mechanism 1110 is driven one step in the rotary direction away from its normal rotary position so that the wiper set engages the contact set terminating line 11 comprising the subscriber line 1150 that is to be tested. Incident to the transmission of the fourth digit 1 from the operator test board 330, the line relay R950 repeated, at the contacts 952 to the digit relay R1050 in the test distributor switch 900 causing the latter relay to operate and remain operated during impulsing as it is of the slow-to-release type. Upon operating the digit relay R1050 completed, at the contacts 1051, the previously traced circuit, including the contacts 1062 and 961, for reoperating the test relay R1070. Accordingly at the conclusion of the fourth digit 1, the line relay R950 is retained in its operated position interrupting, at the contacts 952, the circuit for energizing the winding of the digit relay R1050, whereby the latter relay restores shortly thereafter, to interrupt, at the contacts 1051, the circuit for energizing the winding of the test relay R1070 so as to cause the latter relay to restore shortly thereafter, the digit relay R1050 and the test relay R1070 both being of the slow-to-release type. During the transition time between the restoration of the digit relay R1050 and the restoration of the test relay R1070, a test connection is completed between the winding of the supervisory relay R920 and the E. C. wiper 1014 of the Strowger mechanism 1010 in the test distributor switch 900, whereby the idle or busy condition of the subscriber line 1150 selected by the test connector switch 1100 is tested by the supervisory relay R920. The test connection mentioned extends from battery by way of winding of the supervisory relay R920, the contacts 1054, 1076, and 1084 to the E. C. wiper of the Strowger mechanism 1010. The subsequent operation of the test distributor switch 900 depends upon the idle or busy condition of the subscriber line 1150.

First assuming that the subscriber line 1150 is busy, ground appearing upon the control conductor 1153 thereof completes a connection via the control wiper 1113 of the wiper set of the Strowger mechanism 1110 and the E. C. wiper 1014 of the Strowger mechanism 1010, whereby the previously traced circuit for operating the supervisory relay R920 in the test distributor switch 900 is completed. Upon operating the supervisory relay R920 prepared, at the contacts 929, a holding circuit therefor, that is completed, at the contacts 1077, incident to the restoration of the test relay R1070. Further the supervisory relay R920 reverses, at the contacts 924, 925, 926 and 927 the polarity of the line relays R940 and R950 so as to effect operation of the supervisory relay R820. The supervisory relay R820 recompletes, at the contacts 826, the previously mentioned circuit for flashing the busy lamp L804 in order to indicate to the operator the busy condition of the subscriber line 1150 that is to be tested. After dialing the fourth digit 1, the operator at the test board 30 restores the dial key K710 placing the headset 701 across the cord circuit 700, as previously noted.

At this time, the operator observing the flashing of the busy lamp L804 indicative of the busy condition of the subscriber line 1150 may monitor the connection that is established to the busy subscriber line 1150 since the tip and ring conductors 872 and 871 are directly connected via the + and − test wipers 1012 and 1011 of the Strowger mechanism 1010 and the + and − line wipers 1112 and 1111 of the Strowger mechanism 1110 to the respective line conductors 1152 and 1151 of the subscriber line 1150. Upon verifying the busy condition of the subscriber line 1150, the operator at the test board 30 may modify her testing plan in certain particulars, as explained more fully hereinafter.

Now assuming that the subscriber line 1150 is idle at the conclusion of the fourth digit 1 and when the digit relay R1050 restores, the digit relay R1050 interrupts, at the contacts 1051, the previously traced original circuit for energizing the winding of the test relay R1070 so as to cause the latter relay to restore shortly thereafter, as previously explained, it being of the slow-to-release type. However in this case during the transition between the restoration of the digit relay R1050 and the restoration of the test relay R1070, the winding of the supervisory relay R920 in the test distributor switch 900 is short-circuited in series relation with the winding of the B. C. O. relay R1170 in the line circuit 1160 individual to the subscriber line 1150. Specifically battery is applied by way of the winding of the B. C. O. relay R1170 and the contacts 1167 to the control conductor 1153 of the subscriber line 1150 since the subscriber line 1150 is idle at this time. Accordingly when the test relay R1070 restores, it interrupts, at the contacts 1076, the previously mentioned path for short-circuiting the winding of the supervisory relay R920 in series with the winding of the B. C. O. relay R1170; and completes, at the contacts 1077, a path, including the contacts 1084, 921′, 933 and 931, for applying ground potential to the E. C. wiper 1014 of the wiper set of the Strowger mechanism 1010 and consequently to the control wiper 1113 of the wiper set of the Strowger mechanism 1110 and thus to the control conductor 1153 of the subscriber line 1150. This application of ground potential directly to the control conductor 1153 of the subscriber line 1150 completes a circuit for operating the B. C. O. relay R1170 so that the latter relay upon operating interrupts, at the contacts 1172 and 1173, the normal connection of the upper and lower windings of the line relay R1165 to the line conductors 1152 and 1151 of the subscriber line 1150. Thus at this time the subscriber line 1150 is freed of attachments so that a direct metallic connection is completed thereto when the operator at the test board 30 restores the dial key K710 in the cord circuit 700. At this time the operator may operate the switch key K720 in the cord circuit 700 so as to interrupt, at the contacts 722 and 724 thereof, the normal connection between the headset 701 and the tip and ring of the plug P705, and to substitute, at the contacts 721 and 723 thereof, the test set 702. Since the test set 702 is connected directly over the metallic connection including the ring and tip of the test distributor trunk circuit 800 and the corresponding test and line wipers of the wiper sets of the respective Strowger mechanism 1010 and 1110 to the line conductors 1151 and 1152 of the subscriber line 1150, the usual tests may be performed at the operator test board 30 upon the subscriber line 1150 by suitable manipulation of the test set 702 in a manner more fully explained hereinafter.

Section 4.—*Supervision, control and release of a test distributor switch and a test connector switch*

As explained in Section 3 in conjunction with the setting up of a test connection from the operator test board 30 in the central office 10 to the subscriber line 1150 therein, the test distributor switch 900 may encounter at the conclusion of the second digit 1, a busy condition of the test connector switch 1100. In this event the operator at the test board 30 may merely wait or camp upon the busy test connector switch 1100 until it becomes idle, whereupon ground is removed from the control conductor thereof interrupting the series circuit for energizing the upper winding of the busy relay R1060 and the test relay R1070, causing the busy relay R1060 to restore immediately and the test relay R1070 to restore shortly thereafter. Upon restoring the busy relay R1060 completes, at the contacts 1062, the previously traced circuit, including the contacts 1053 and 1075, for operating the switch relay R1080 so as to effect seizure by the test distributor switch 900 of the test connector switch 1100, in the manner previously explained. Also upon restoring the busy relay R1060 interrupts, at the contacts 1061, the path for returning busy tone current to the operator test board 30; and interrupts, at the contacts 1063, the circuit for energizing the winding of the supervisory relay R920 in order to cause the latter relay to restore shortly thereafter, it being of the slow-to-release type. Upon restoring the supervisory relay R920 restores, at the contacts 924, 925, 926 and 927, the normal polarity of the line relays R940 and R950 effecting the restoration of the supervisory relay R820 of the polar type. Upon restoring the supervisory relay R820 interrupts, at the contacts 826, the circuit for flashing the busy lamp L804; and recompletes, at the contacts 825, the circuit for illuminating steadily the busy lamp L804. When the return of the visual and audible busy signals to the operator test board 30 are thus arrested, the operator thereat proceeds with the dialing of the third digit 1 and the fourth digit 1.

On the other hand, upon receiving the visual and audible busy signals at the conclusion of the second digit 1, the operator at the test board 30 may hold the operated test distributor switch 900 selecting the busy test connector 1100 and proceed with her other testing merely by withdrawing the plug P705 from the jack J801. When the plug P705 is thus removed from the jack J801 the contacts 801′ of the jack J801 are opened to interrupt the direct circuit for energizing the lower winding of the seize relay R840 and to bring about the completion of a series circuit, including the contacts 843 and the resistor 805, for effecting energization of the winding of the control relay R850 and the lower winding of the seize relay R840 so that the control relay R850 is operated and the seize relay R840 is retained in its operated position. Upon operating the control relay R850 completes, at the contacts 852 and 855, and alternative circuit for bridging the upper winding of the supervisory relay R820 across the +0 and −0 leads; prepares, at the contacts 856 a circuit, including the +T conductor for energizing the upper winding of the seize relay R840; and prepares, at the contacts 857, a circuit, including the −T conductor for energizing the lower winding of the B. C. O. relay R830. Also when the plug P705 is withdrawn from the jack J801 the circuit for energizing in series the winding of the test connect relay R810 and the upper winding of the B. C. O. relay R830 is interrupted causing the test connect relay R810 to restore. Upon restoring the test connect relay R810 interrupts, at the contacts 815, the original circuit for bridging the upper winding of the supervisory relay R820 across the +0 and −0 leads.

At this time when the test connector switch 1100 becomes idle ground is removed from the control conductor thereof effecting the restoration of the relays R1060, R1070 and R920 in the manner previously explained; whereby the supervisory relay R920 restores, at the contacts 924, 925, 926 and 927, the normal polarity of the line relays R940 and R950 effecting the restoration of the supervisory relay R820 so that the return of the visual busy signal to the operator test board 30 is arrested. At this time the operator at the test board 30 again enters the connection by reinserting the plug P705 into the jack J801 in order to operate the contacts 801′ thereof so as again to complete the direct circuit for energizing the lower winding of the seize relay R840 and a corresponding path for short-circuiting the winding of the control relay R850; whereby the seize relay R840 is retained in its operated position and the control relay R850 is restored. Also when the plug P705 is reinserted into the jack J801 the test connect relay R810 is reoperated, as previously explained. Upon reoperating the test connect relay R810 recompletes, at the contacts 815, the original circuit for bridging the upper winding of the supervisory relay R820 across the +0 and −0 leads; and upon restoring the control relay R850 interrupts, at the contacts 852 and 855 the alternative circuit for bridging the upper winding of the supervisory relay R820 across the +0 and −0 leads. At this time the operator at the test board 30 proceeds to dial the third digit 1 and the fourth digit 1.

Moreover it is pointed out that upon receiving the visual and audible busy signals at the conclusion of the second digit 1, the operator at the test board 30 may modify her testing plan and proceed with the testing of another hundred group of subscriber lines by first effecting the release of the test distributor switch 900 and then by reseizing and dialing the required four digits comprising the numerical portion of the directory number of the desired subscriber line in the desired hundred group of subscriber lines. Specifically in order to effect the release of the test distributor switch 900 the operator at the test board 30 withdraws the plug P705 from the jack J801 placing the test distributor circuit 800 and the test distributor switch 900 in the hold position previously described as a consequence of the operation of the control relay R850 and the restoration of the test connect relay R810. Then the operator at the test board 30 momentarily operates the test distributor release key K803 in order to short-circuit in series the lower winding of the seize relay R840 and the winding of the control relay R850 so that the relays noted restore. Upon restoring the control relay R850 interrupts, at the contacts 852 and 855, the loop circuit for retaining operated the supervisory relay R820 and the line relays R940 and R950. Upon restoring the line relay R940 interrupts, at the contacts 941, the circuit for retaining operated the control relay R930; and upon restoring the line relay R950 interrupts, at the contacts 951, the circuit for energizing the winding of the hold relay R960 in order to cause the latter relay to restore shortly thereafter, it being of the slow-to-release type. Upon restoring the hold relay R960 completes, at the contacts 965, the circuit, including the set of switch springs S1021, for operating the release magnet M1020; whereby the wiper carriage of the Strowger mechanism 1011 is released and returned to its normal rotary and vertical positions, interrupting the circuit for retaining operated the busy relay R1060 and the test relay R1070. Upon restoring the busy relay R1060 interrupts, at the contacts 1063, the circuit for retaining operated the supervisory relay R920. Also when the wiper carriage of the Strowger mechanism 1010 is thus released, the sets of switch springs S1022 and S1021 are operated. Specifically the set of switch springs S1021 is operated to interrupt the circuit for operating the release magnet M1020, whereby the test distributor trunk circuit 800 and the test distributor switch 900 are completely released and available for further use. Accordingly the operator at the test board 30 may again insert the plug P705 into the jack J801 in order to effect reseizure of the test distributor trunk circuit 800 and the connected test distributor switch 900 and then dial the four digits to effect the setting up of the other test connection noted.

As explained in Section 3 in conjunction with the setting up of the test connection from the operator test board 30 in the central office 10 to the subscriber line 1150, therein, the test connector switch 1100 may encounter at the conclusion of the fourth digit 1, a busy condition of the subscriber line 1150. In this event the operator at the test board 30 may merely wait or camp upon the busy subscriber line 1150 until it becomes idle; whereupon ground is removed from the control conductor 1153 thereof interrupting the holding circuit for energizing the winding of the supervisory relay R920, causing the latter relay to restore shortly thereafter, as it is of the slow-to-release type. Upon restoring the supervisory relay R920 effects the restoration of the supervisory relay R820 and the consequent arresting of the return of the visual busy signal to the operator test board 30 in the manner previously explained. Also upon restoring the supervisory relay R920 completes, at the contacts 921′ the previously traced path, including the contacts 931 and 933, for forwarding ground to the control conductor 1153 of the subscriber line 1150 so as to effect operation of the B. C. O. relay R1170 in the individual line circuit 1160 in the manner previously explained. At this time the operator at the test board 30 proceeds with the testing of the idle subscriber line 1150 that has been selected for test purposes, as previously noted.

On the other hand, upon receiving the visual busy signal at the conclusion of the fourth digit 1, the operator at the test board 30 may hold the operated test distributor switch 900 and the operated test connector switch 1100 selecting the busy subscriber line 1150 and proceed with her other testing merely by withdrawing the plug P705 from the jack J801. When the plug P705 is thus withdrawn from the jack J801, the test distributor trunk circuit 800 and the test distributor switch 900 are held in the manner previously explained; whereby the operated test distributor switch 900 retained operated the test connector switch 1100. At this time when the subscriber line 1150 becomes idle ground is removed from the control conductor 1153 thereof effecting the restoration of the supervisory relay R920 and the consequent restoration of the supervisory relay R820 in the manner previously explained; whereby the return of the visual busy signal to the operator test board 30 is arrested, in the manner previously explained. The operator at the test board 30 again enters the connection by reinserting the plug P705 into the jack J801, in order again to complete the test connection extending on to the selected subscriber line 1150 so that testing thereof may proceed as previously noted.

Moreover it is pointed out that upon receiving the visual busy signal at the conclusion of the fourth digit 1, the operator at the test board 30 may modify her test plan and proceed with the testing of another hundred group of subscriber lines by first effecting the release of the test distributor switch 900 and the test connector switch 1100 and then by reseizing and dialing the required four digits comprising the numerical portion of the directory number of the desired subscriber line in the desired hundred group of subscriber lines. Specifically the operator at the test board 30 withdraws the plug P705 from the jack J801 and then momentarily operates the test distributor relay key K803; whereby the test distributor trunk circuit 800 and the test distributor switch 900 are released in the manner previously explained. When the test distributor switch 900 is thus released the loop circuit extending to the line relay R1120 in the test connector switch 1100 is interrupted causing the latter relay to restore. Upon restoring the line relay R1120 interrupts, at the contacts 1122, the circuit for energizing the winding of the hold relay R1130 in order to cause the latter relay to restore shortly thereafter, it being of the slow-to-release type. Upon restoring the hold relay R1130 completes, at the contacts 1132, a circuit, including the set of switch springs S1123, for operating the release magnet M1110; whereby the wiper carriage of the Strowger mechanism 1110 is released and returned to its normal rotary and vertical positions. When the wiper carriage of the Strowger mechanism 1110 is thus released, the set of switch springs S1123 and S1124 are operated. Specifically the set of switch springs S1123 is operated to interrupt the circuit for operating the release magnet M1116; whereby the test connector switch 1110 is completely released and available for further use. Accordingly the operator at the test board 30 may again insert the plug P705 into the jack J801 in order to effect reseizure of the test distributor trunk circuit 800 and the connected test distributor switch 900 and then dial the four digits to effect setting up of the other test connection noted.

Instead of releasing the test distributor trunk circuit 800, the test distributor switch 900 and the test connector switch 1100 upon receiving the busy signal at the conclusion of the fourth digit 1, the operator may effect the release of the test connector 1100 alone and proceed with a modified testing plan involving another subscriber line in the hundred group accessible to the test connector switch 1100 merely by operating the connector release key K730 in the cord circuit 700. Specifically when the connector release key K730 is thus operated, there is interrupted, at the contacts 732 thereof the bridge connection, including the dial 765 between the tip and the ring of the plug P705; there is completed, at the contacts 731 thereof, a path for applying battery by way of the resistor 751 to the tip of the plug P705; and there is interrupted, at the contacts 733, the path for applying resistance ground to the sleeve of the plug P705. When resistance ground is thus removed from the sleeve of the plug P705, the circuit for retaining operated the test connect relay R810 is interrupted causing the latter relay to restore so as to complete, at the contacts 814, a connection between the tip conductor 872 and the +0 lead in order to effect short-circuiting of the winding of the line relay R950 causing the latter relay to restore. Also the test connect relay R810 completes, at the contacts 816, a circuit, including the contacts 851, 823, 833 and 841, the resistor 806, the −0 lead and the contacts 926, for energizing the upper winding of the supervisory relay R820 in series with the winding of the line relay R940 so as to retain the relays mentioned in their operated positions.

Accordingly the line relay R940 is retained in its operated position and the line relay R950 is restored. The operated line relay R940 retains operated the control relay R930 in order to retain operated the hold relay R960. Upon restoring the line relay R950 interrupts, at the contacts 953, the previously traced loop circuit for retaining operated the line relay R1120 in the test connector switch 1100; whereby the latter relay restores effecting the restoration of the hold relay R1130 and the consequent operation of the release magnet M1116 so that the test connector switch 1100 is released, in the manner previously explained.

The operator at the test board 305 then restores the connector release key K730 in order again to complete, at the contacts 732 thereof, the bridge connection between the tip and the ring of the plug P705; to interrupt, at the contacts 731 thereof, the path for applying resistance battery to the tip of the plug P705; and to recomplete, at the contacts 733 thereof, the path for applying resistance ground to the sleeve of the plug P705. When resistance ground is thus reapplied to the sleeve of the plug P705, the test connect relay R810 is reoperated again bridging, at the contacts 815, the upper winding of the supervisory relay R820 across the +0 and −0 leads; whereby the line relay R940 is retained in its operated position and the line relay R950 is reoperated. However the supervisory relay R930 is now restored by virtue of the restoration of the supervisory relay R920 as a consequence of the release of the test connector switch 1100.

At this time since the test connector switch 1100 has been released, the operator at the test board 30 may again dial the third digit and the fourth digit so as to cause the test connector switch to select another subscriber line in the associated hundred group of subscriber lines to be tested in a manner identical to that previously described.

Instead of releasing the test connector switch 1100 upon receiving the busy signal at the conclusion of the fourth digit 1, the operator at the test board 30 may effect additional operation of the test connector switch 1100 to select line 12 adjacent to line 11, constituting the subscriber line 1150, by dialing an additional digit 1 at this time, whereby the effective value of the fourth digit is 2. Specifically when the operator dials the additional digit 1 at this time, the dial relay R760 is operated effecting the restoration of the test connect relay R810. Upon restoring the test connect relay R810 completes, at the contacts 816, an alternative circuit, including the contacts 851, 823, 833, 841 and 926, and the resistor 806 for energizing the upper winding of the supervisory relay R820 in series with the winding of the line relay R940 in order to retain the relays noted in their operated positions at this time. Also upon restoring the test connect relay R810 completes, at the contacts 812 and 814, an alternative holding circuit, including the dial 765, the contacts 821 and 924, as well as the ring conductor 871 and the tip conductor 872 for energizing the winding of the line relay R950. The above traced holding circuit is interrupted, at the impulsing contacts 766 of the dial 765; whereby the line relay R950 is restored and then reoperated effecting the transmission, at the contacts 953, of the additional digit 1 to the line relay R1120 so that the wiper carriage of the Strowger mechanism 1110 is driven an additional step in the rotary direction to select line 12 or the next adjacent line to line 11.

At the conclusion of the dialing of the additional digit 1, the dial relay R760 is restored effecting reoperation of the test connect relay R810, whereby the upper winding of the supervisory relay R820 is again bridged across the +0 and −0 leads retaining operated the line relays R940 and R950. Also when the wiper carriage of the Strowger mechanism 1110 is driven off of the contact set terminating the busy subscriber line 1150, the holding circuit for retaining operated the supervisory relay R920 is interrupted so that the latter relay is restored in the event line 12 is idle at this time. Of course incident to the transmission of the additional digit 1 by the line relay R950, the digit relay R1050 and the test relay R1170 were reoperated, so that following this additional digit the digit relay R1050 restores and thereafter the test relay R170 restores in order that the idle or busy condition of the presently selected line 12 may be tested in the manner previously explained. Assuming that the presently selected line 12 is idle, the supervisory relay R920 restores effecting the restoration of the supervisory relay R820, in the manner previously explained.

Again assume that the operator at the test board 30 has set up a test connection therefrom to the subscriber line 1150 in the central office 10 in the manner set forth in Section 3, that the subscriber line 1150 is tested as being idle, and that the operator wishes to hold this test connection. To accomplish this the operator at the test board 30 merely withdraws the plug P705 from the jack J801 effecting the restoration of the test connect relay R810, holding of the seize relay R840 and the operation of the control relay R850, in the manner previously explained. Upon operating the control relay R850 completes, at the contacts 852 and 855, the alternative circuit for bridging the upper winding of the supervisory relay R820 across the +0 and −0 leads in order to retain operated the line relays R940 and R950. However the supervisory relay R820 is not operated at this time by virtue of the restored position of the supervisory relay R920. Also the control relay R850 completes, at the contacts 856, a connection from ground by way of the upper winding of the seize relay R840 to the +T lead; and completes, at the contacts 857, a connection from battery by way of the lower winding of the B. C. O. relay R830 to the −T lead. Accordingly at this time, should the subscriber at the subscriber substation T1 attempt to initiate a call by removing the receiver of the telephone instrument thereat from its associated switchhook, there would be completed a loop circuit extending thereto over the +T and −T leads including the upper winding of the seize relay R840 and the lower winding of the B. C. O. relay R830, holding the seize relay R840 in its operated position and effecting operation of the B. C. O. relay R830. Upon operating the B. C. O. relay R830 completes, at the contacts 831, a circuit, including the contacts 854, for illuminating the supervisory lamp L802 in order to indicate the circumstance noted to the operator at the test board 30. The operator at the test board 30 then re-enters the connection by reinserting the plug P705 into the jack J801 so as again to effect operation of the test connect relay R810 and the restoration of the control relay R850. Upon restoring the control relay R850 interrupts, at the contacts 856, the loop circuit for energizing the upper winding of the seize relay R840 and the lower winding of the B. C. O. relay R830; whereby the seize relay R840 is retained in its operated position and the B. C. O. relay R830 is restored. Also upon restoring the control relay R850 interrupts, at the contacts 854, the above traced circuit for illuminating the supervisory lamp L802. At this time a direct connection, including the contacts 811 and 813, of the operated test connect relay R810 is completed between the headset 701 in the cord circuit 700, and the subscriber substation T1 connected to the subscriber line 1150, the headset 701 supplying battery to this loop circuit on a local basis, not shown; whereby the operator at the test board 30 may converse with the subscriber at the subscriber substation T1 advising him that the subscriber line 1150 is undergoing test at this time.

After testing the subscriber line 1150, the operator at the test board 30 may advance the test connector switch 11 from the idle line 11, comprising the subscriber line 1150, to the adjacent line 12, by dialing the additional digit 1 upon the dial 765. In this case the dial relay R760 operates to effect the restoration of the test connect relay R810, whereby the latter relay completes, at the contacts 812 and 814, an alternative loop circuit for retaining operated the line relays R940 and R950. This alternative loop circuit extends from ground by way of the winding of the line relay R940, the contacts 925, the +0 lead and the contacts 814 to the tip conductor 872; and from battery by way of the winding of the line relay R950, the contacts 927, the −0 lead, the contacts 841, 833, 822 and 812 to the ring conductor 871. Accordingly the line relays R940 and R950 follow the additional digit 1. Specifically the line relay R950 repeats, at the contacts 953, the single digit 1 to the line relay R1120 in the test connector switch 1100. The line relay R940 also repeats the additional digit 1, at the contacts 942; however without effect since the supervisory relay R920 occupies its restored position. Accordingly the line relay R1120 restores and then reoperates, whereby the wiper carriage of the Strowger mechanism 1110 is driven an additional step in the rotary direction in order to select line 12; whereby the latter line is tested, in the manner previously explained.

Moreover after testing the subscriber 1150, the operator at the test board 30 may selectively release the test connector switch 1100 selecting the idle subscriber line 1150 by operating the connector release key K730 so as to apply resistance battery to the tip of the plug P705 and to open the sleeve of the plug P705 in a manner similar to that previously described. In this case, when the sleeve of the plug P705 is opened, the test connect relay R810 restores; and resistance battery applied to the tip of the plug P705 completes a direct circuit for retaining operated the line relay R940. However since the ring of the plug P705 is interrupted, at the contacts 732 of the connector release key K730, the circuit for retaining operated the line relay R950 is interrupted causing the latter relay to restore and effect the restoration of the line relay R1120; whereby the test connector switch 1100 is released, in the manner previously explained. The operator at the test board 30 then restores the connector release key K730, operates the dial key K710 and again dials an appropriate third digit and an appropriate fourth digit with the dial 765 in order to effect reoperation of the test connector switch 1100.

Finally the operator at the test board 30 may release the entire test switch train, including the test distributor trunk circuit 800, the test distributor switch 900 and the test connector switch 1100 selecting the idle subscriber line 1150 by first withdrawing the plug P705 from the jack J801 and then by momentarily operating the test distributor release key K803. When the test connector switch 1100 is thus released, the B. C. O. relay R1170 in the line circuit 1160 is restored in order to reconnect the upper and lower windings of the line relay R1165 to the line conductors 1152 and 1151 of the subscriber line 1150. Also the subscriber line 1150 is again marked as idle by the application of battery via the winding of the B. C. O. relay R1170 to the control conductor 1153 thereof.

*Section 5.—Various tests that may be performed at the operator test board 30*

Again assume that the operator at the test board 30 has set up a test connection therefrom to the subscriber line 1150, and that the subscriber line 1150 has been tested as being idle, all in the manner described in Section 3. The operator may test the subscriber line 1150 for a stray battery fault thereon by appropriate manipulation of the test set 702 so as to effect the connection of ground via a test instrument to both the tip and the ring of the plug P705 in a well-known manner. Similarly the operator may test the subscriber line 1150 for a stray ground fault thereon by appropriately manipulating the test set 702 so as to effect the connection of battery via a test instrument to both the tip and the ring of the plug P705 in a well-known manner. Further the operator may test the subscriber line 1150 for a resistance loop fault thereon by appropriately manipulating the test set 702 so as to effect connection of ground and battery through a test instrument respectively to the tip and ring of the plug P705, in a well-known manner.

In order to test the line circuit 1160 individually associated with the idle subscriber line 1150, the operator momentarily operates the B. C. O. test key K750 in order to cause direct ground to be applied to the sleeve of the plug P705 so as to effect operation of the B. C. O. relay R830 of the marginal type in series with the test connect relay R810. Upon operating the B. C. O. relay R830 completes, at the contacts 931, a path, including the contacts 853 and 825, for short-circuiting the winding of the line relay R940; and completes, at the contacts 831, a multiple holding circuit, including the contacts 853, 832, 841 and 927, for retaining operated the line relay R950. Upon restoring the line relay R940 interrupts, at the contacts 941, the circuit for retaining operated the control relay R930. Upon restoring the control relay 930 interrupts, at the contacts 933, the path for applying ground to the control conductor 1153 of the subscriber line 1150 so as to effect the restoration of the B. C. O. relay R1170. Upon restoring the B. C. O. relay R1170 completes, at the contacts 1172 and 1173, the normal path for bridging the upper and lower windings of the line relay R1165 across the line conductor 1152 and 1151 of the subscriber line 1150, causing the line relay R1165 to be operated over the test connection, including the ring and the tip conductors 871 and 872 and extending to the dial 765 in the cord circuit 700. Upon operating the line relay R1165 completes, at the contacts 1169, a path for marking battery by way of the winding of the B. C. O. relay R1170 to the control conductor 1154; and interrupts, at the contacts 1167, a further point in the circuit for operating the B. C. O. relay R1170 via the control conductor 1153; completes, at the contacts 1168, a path for applying direct ground to the control conductor C1153; and completes, at the contacts 1166, a start circuit to the distributor 1180. The distributor 1180 operates an idle finder-selector link such, for example, as that illustrated, via the conductor 1181; whereby the finder 1182 operates to find the subscriber line 1150 so that the B. C. O. relay R1170 is operated effecting the restoration of the line relay R1165. At this time the line relay R1185 in the selector 1183 is operated over the test connection, including the ring and the tip conductors 871 and 872 and dial tone is returned from the selector 1183 to the operator test board 30. The operator at the test board 30, upon receiving the dial tone may operate the dial key K710 and proceed with dialing of the selector 1183 and the other elements of the local switch train, in an obvious manner. Subsequently when the test connector switch 1100 is released, the outgoing switch train, including the finder 1182 and the selector 1183, is released in a conventional manner.

Again consider the setting up of a connection from the operator test board 30 to the subscriber line 1150 and assume that the subscriber line 1150 is tested by the test connector switch 1100 as being busy, and that when the operator monitors the connection she can hear no conversation. The operator then challenges the connection and assumes that the subscriber line 1150 has a permanent loop fault thereon and has seized a finder-selector link in the associated local switch train, such, for example, as the link illustrated, including the finder 1182 and the selector 1183. In this case, the operator at the test board 30 momentarily operates the B. C. O. key K750 to effect operation of the B. C. O. relay R830. In this case, upon operating the B. C. O. relay R830 completes, at the contacts 831, the previously traced paths for applying ground to the +0 and —0 leads, whereby the winding of the line relay R940 is short-circuited and the winding of the line relay R950 is energized by virtue of the operated position of the supervisory relay R920, causing the line relay R940 to restore and the relay R950 to be retained in its operated position. Upon restoring the line relay R940 interrupts, at the contacts 941, the circuit for retaining operated the control relay R930. Upon restoring the control relay R930 completes, at the contacts 932, a circuit, including the contacts 951 and 928, for operating the B. C. O. relay R910 since the supervisory relay R920 occupies its operated position at this time. Upon operating the B. C. O. relay R910 completes, at the contacts 915, a multiple holding circuit for energizing the winding thereof; interrupts, at the contacts 911 and 913, the normal monitoring connection, including the condensers 917 and 918 between the —T and —0 leads and between the +T and +0 leads. Finally the B. C. O. relay R910 completes, at the contacts 914, a path, including the contacts 922, for applying direct ground to the +T lead; and completes, at the contacts 912, a path, including the contacts 921 and the resistor 934 for connecting battery via the three windings in multiple of the circuit breaker relay R970 to the —T lead. The application of direct ground to the +T lead completes a path for short-circuiting the upper winding of the line relay R1185 in the selector 1183; and the application of battery to the —T lead completes a path for short-circuiting the lower winding of the line relay R1185 in the selector 1183. Also the three windings of the circuit breaker relay R970 are energized in multiple over the test connection, including the loop fault between the line conductors 1151 and 1152 of the subscriber line 1150, whereby the circuit breaker relay R970 operates through a first stage and then through a second stage. In operating through the first stage, the circuit breaker relay R970 interrupts, at its contacts 972, the circuit for energizing its lower low-resistance winding; and upon operating through the second stage, the circuit breaker relay R970 interrupts, at the contacts 971, the circuit for energizing its upper intermediate resistance winding; whereby, at this time only the intermediate winding of the circuit breaker relay R970 is energized. By way of illustration, the lower, upper and intermediate windings of the circuit breaker relay R970 may have the respective resistances of a $\frac{1}{10}$ ohm, 19 ohms and 3,000 ohms. Thus the circuit breaker relay R970 causes the resistance of battery applied to the —T lead to be substantially increased in steps, whereby there is the possibility of burning clear a high resistance loop fault appearing across the line conductors 1151 and 1152 of the subscriber line 1150. Also the upper and lower windings of the line relay R1185 in the selector 1183 are effectively short-circuited unless the loop fault is of a very low resistance. Assuming that the loop fault upon the subscriber line 1150 is either burned clear or is of a tolerably high resistance, the upper and lower windings of the line relay R1185 in the selector 1183 are effectively short-circuited bringing about the release of the selector 1183 and the finder 1182, whereby ground in the selector 1183 is removed from the control conductor 1154 of the subscriber line 1150 effecting the restoration of the B. C. O. relay R1170 in the line circuit 1160 and the consequent removal of ground from the control conductor 1153 of the subscriber line 1150; whereby the holding circuit for retaining operated the supervisory relay R920 in the test distributor switch 900 is interrupted. The supervisory relay R920 then restores shortly thereafter, it being of the slow-to-release type. Upon restoring the supervisory relay R920 interrupts, at the contacts 921 and 922, the paths for connecting battery and ground to the —T and the +T leads, whereby the circuit breaker relay R970 is restored. Further the supervisory relay R920 reverses at the contacts 924, 925, 926 and 927, the polarity of the line relays R940 and R950 so as to cause the supervisory relay R820 to restore. After restoration of the B. C. O. relay R930 when the B. C. O. key K730 in the cord circuit 700 is restored since the supervisory relay R820 occupies its restored position, the busy lamp L804 is steadily illuminated indicating to the operator at the test board 30 that the loop fault has been removed from the subscriber line 1150 and that this subscriber line is now idle and may be tested in the manner previously described.

Section 6.—*One digit operation of the test distributor switch 900*

As explained in Section 1, the second thousand group of subscriber lines is not equipped in the central office 10, whereby the second level of the test distributor switch 900 may be employed for trunk and other testing purposes; which access is arranged through the second level of the test distributor switch 900. In this case, the test distributor switch 900 may be operated in response to the single digit 2 to select the first test connector switch that is terminated in this level. More specifically in order to test the trunks noted, the operator at the test board 30 may seize the test distributor trunk circuit 800 employing the cord circuit 700 in the manner described in Section 3, and then she may dial the digit 2 in order to effect operation of the test distributor switch 900 to select the first test connector switch terminated in the second level thereof; and then the operator may dial the other appropriate digits to effect operation of the selected test connector switch. This operation is essentially the same as that previously described in Section 3 except that in response to the first digit 2, the wiper carriage of the Strowger mechanism 1010 in the test distributor switch 900 is operated two steps in the vertical direction closing the set of switch springs 1023 so as to complete a circuit, including the contacts 961 and 1032, for energizing the winding of the rotary step relay R1040 so that the latter relay operates to complete, at the contacts 1041, a holding circuit, including the contacts 1019 and 961, for energizing the winding thereof.

At the conclusion of this first digit 2, the line relays R940 and R950 are retained in their operated positions and the transfer relay R1030 restores shortly thereafter. Upon restoring the transfe rrelay R1030 completes, at the contacts 1031, a direct circuit, including the contacts 961, the set of switch springs S1023, and the contacts 1042 and 1064, for energizing the winding of the digit relay R1050, and a multiple circuit, also including the contacts 1086, for operating the rotary magnet M1018. Accordingly the digit relay R1050 operates and the rotary magnet M1018 operates to drive the wiper carriage of the Strowger mechanism 1010 automatically one step in the rotary direction. Also upon operating the rotary magnet M1018 interrupts, at the contacts 1019, the holding circuit for retaining operated the rotary step relay R1040 so that the latter relay restores, interrupting, at the contacts 1042, the circuit for retaining operated the digit relay R1050 and the multiple circuit for operating the rotary magnet M1018. Shortly thereafter the digit relay R1050 restores, interrupting, at the contacts 1051, the direct circuit for retaining operated the test relay R1070 so that the test relay R1070 and the busy relay R1060 test the idle or busy condition of the selected first test connector switch terminating in the second level of the Strowger mechanism 1010 of the test distributor switch 900. The subsequent operation of the test distributor switch 900 is the same as that described in Section 3.

Section 7.—*Setting up a test connection from the operator test board 30 in the central office 10 to a subscriber line in the exchange 20*

In view of the foregoing description of the mode of setting up a test connection from the operator test board 30 in the central office 10 to the subscriber line 1150 in the central office 10 and the various controls that are exercised over the test distributor trunk circuit 800, the test distributor switch 900, and the test connector switch 1100, as well as the selective release of the pieces of apparatus mentioned and the selective tests that are performed upon the subscriber line 1150, all as described in Sections 3 to 5, inclusive, it will be understood that the operator may carry out a substantially identical procedure with respect to a subscriber line in the exchange 20, employing the cord circuit 700 and the test distributor circuit 860. It this case, the plug P705 of the cord circuit 700 may be inserted into the jack J861 of the test distributor trunk circuit 860 effecting seizure of the test distributor trunk circuit 860 in the central office 10 and the seizure of the test distributor switch 865 in the exchange 20. For example, a test connection may be set up to the subscriber line 867 in the exchange 20 by dialing the four appropriate digits at the operator test board 30, the first two digits effecting operation of the test distributor switch 865 to select the test connector switch 866 and the last two digits effecting operation of the test connector switch 866 to select the subscriber line 867. The various tests and selective release of the test distributor switch 865 and the test connector switch 866 are the same as described in Sections 3 to 5, inclusive.

*Section 8.—Conditioning the automatic line test circuit 200 to perform a routine subscriber line testing operation*

The automatic line testing circuit 200 may be conditioned selectively to perform a routine subscriber line testing operation either in the central office 10 or in the exchange 20 by selective operation of the respective office select key K205 and exchange select key K204. First assuming that the routine subscriber line testing operation is to be performed in the central office 10, the office select key K205 is operated and locked in its operated position. When the office select key K205 is thus operated, there is interrupted, at the back contacts thereof, a further point in a circuit for energizing the lower winding of the exchage select relay F250 and the winding of the exchange mark relay R240 in multiple therewith; and there is completed, at the front contacts thereof, a circuit, including the back contacts of the exchange select key K204, for energizing the lower winding of the office select relay R230 and the winding of the office mark relay R220 in multiple therewith. Thus the office select relay R230 and the office mark relay R220 are operated; and operation of the office select key K205 positively prevents effective operation of the exchange select key K204. Upon operating the office select relay R230 first completes, at the contacts 231, 232, 233, 235, 236 and 237, connections to the respective conductors 874, 873, 875, 876, 871 and 872 in the access cable 870 extending to the test distributor trunk circuit 800. Upon operating the office mark relay R220 completes, at the contacts 222, a ground connection to the second marking conductor in the marking cable 206 corresponding to the vacant second thousand group of subscriber lines in the central office 10. Further the office mark relay R220 completes, at the contacts 221′, a connection between the conductor 339 and the conductor 272 that is strapped to the ninth marking conductor in the marking cable 207 that corresponds to the last thousand group of subscriber lines in the central office 10. Also upon operating the office select relay R230 completes, at the contacts 238, a path for connecting the grounded conductor 271 to the conductor 236, thereby to complete a circuit, including the contacts 423, for operating the prepare relay R430. Further the application of ground potential to the conductor 336 completes a circuit, including the contacts 423, the conductor 338, and the contacts 385, for operating the prepare relay R330.

Upon operating the prepare relay R340 interrupts, at the contacts 431, the normally completed path for applying ground to the set of switch springs S416 of the hundred switch 410; and completes, at the contacts 432, a path for applying ground to the home contact engaged by the wiper 411 of the hundred switch 410 so as to complete a circuit, including the contacts 415, for operating the rotary magnet M414. Upon operating the rotary magnet M414 interrupts, at the contacts 415, the operating circuit therefor, whereby the rotary magnet M414 restores driving the wipers noted of the hundred switch 410 one step in the clockwise direction away from their home positions into their first positions. When the wiper 411 is driven into its first position, it disengages its home contact interrupting the circuit for operating the rotary magnet M414; and the set of switch springs S416 is operated. Also the prepare relay R430 interrupts, at the contacts 433 the normally completed path for applying ground to the set of switch springs S517 of the ten switch 510; and completes, at the contacts 434, a path for applying ground to the home contact engaged by the wiper 511 of the ten switch 510 so as to complete a circuit, including the contacts 516, for operating the rotary magnet M515. Upon operating the rotary magnet M515 interrupts, at the contacts 516, the operating circuit therefor, whereby the rotary magnet M515 restores driving the wipers noted of the ten switch 510 one step in the clockwise direction away from their home positions into their first positions. When the wiper 511 is driven into its first position, it disengages its home contact interrupting the circuit for operating the rotary magnet M515; and the set of switch springs S517 is operated. Further the prepare relay R430 interrupts, at the contacts 435, the normally complete path for applying ground potential to the set of switch springs S316 of the thousand switch 310; and completes, at the contacts 346, a path for applying ground to the home contact engaged by the wiper 311 of the thousand switch 310 so as to complete a circuit, including the contacts 315, for operating the rotary magnet M314. Upon operating the rotary magnet M314 interrupts, at the contacts 315, the operating circuit therefor, whereby the rotary magnet M314 restores driving the wipers noted of the thousand switch 310 one step in the clockwise direction away from their home positions into their first positions. When the wiper 311 is driven into its first position, it disengages its home contact interrupting the circuit for operating the rotary magnet M314; and the set of switch springs S316 is operated. Further the prepare relay R430 interrupts, at the contacts 437, the normally completed path for applying ground to the set of switch springs S617 of the unit switch 610; and completes, at the contacts 438, a path for applying ground to the home contact engaged by the wiper 611 of the unit switch 610 so as to complete a circuit, including the contacts 616, for operating the rotary magnet M615. Upon operating the rotary magnet M615 interrupts, at the contacts 616, the operating circuit therefor, whereby the rotary magnet M6615 restores driving the wipers noted of the unit switch 610 one step in the clockwise direction away from their home positions into their first positions. When the wiper 611 is driven into its first position, it disengages its home contact interrupting the circuit for operating the rotary magnet M615; and the set of switch springs S617 is operated.

Also the prepare relay R430 completes, at the contacts 436, 432, 434 and 438, paths for respectively grounding the conductors 404, 472, 504 and 699 so as to complete circuits for respectively illuminating the lamps M1, C1, X1 and U1. The circuit for illuminating the lamp M1 includes the grounded conductor 404, as well as the wiper 313 and the engaged first contact in the associated contact bank of the thousand switch 310; the circuit for illuminating the lamp C1 includes the grounded conductor 472, as well as the wiper 413 and the engaged first contact in the associated contact bank of the hundred switch 410; the circuit for illuminating the lamp X1 includes the grounded conductor 504, as well as the wiper 514 and the engaged first contact in the associated contact bank of the ten switch 510; and the circuit for illuminating lamp U1 includes the grounded conductor 699, as well as the wiper 614 and the engaged first contact of the associated contact bank of the unit switch 610. The illumination of the thousand lamp M1, the hundred lamp C1, the ten lamp X1 and the unit lamp U1 indicates to the operator at the test board 30 that the circuit 200 has been conditioned to begin testing on a routine basis the subscriber lines in the central office 10 beginning with the subscriber line, the numerical portion of the directory number of which is: 1111.

Now assuming that the routine subscriber line testing operation is to be performed in the exchange 20, the exchange select key K204 is operated and locked in its operated position. When the exchange select key K204 is thus operated, there is interrupted, at the back contacts thereof, a further point in the circuit for operating the office select relay R230 and the office mark relay R220; and there is completed, at the front contacts thereof, a circuit, including the back contacts of the office select key K205 for energizing the lower winding of the exchange select relay R250 and the winding of the exchange mark relay R240 in multiple therewith. Thus the exchange select relay R250 and the exchange mark relay R240 are operated; and operation of the exchange select key K204 positively prevents effective operation of the office select key K205. Upon operating the exchange select relay R250 first completes, at the contacts 251, 252, 253, 255, 256 and 257 connections to the respective conductors 884, 883, 885, 887, 881 and 882 in the access cable 880 extending to the test distributor trunk circuit 860. Upon operating the exchange mark relay R240 completes, at the contacts 241 and 242, ground connections to the first and second marking conductor in the marking cable 206 corresponding to the vacant first and second thousand groups of subscriber lines in the exchange 20. Further the exchange mark relay R240 completes, at the contacts 241′, a connection between the conductor 339 and the conductor 273 that is strapped to the eighth marking conductor in the marking cable 207 corresponding to the last thousand group of subscriber lines in the exchange 20. Also upon operating exchange select relay R250 completes, at the contacts 258, a path for connecting the grounded conductor 270 to the conductor 336 effecting operation of the prepare relays R430 and R330. Upon operating the prepare relay R430 sets the thousand switch 310, the hundred switch 410, the ten switch 510 and the unit switch 610 into their respective first positions effecting illumination of the lamps M1, C1, X1 and U1, so as to indicate to the operator at the test board 30 that the circuit 200 has been conditioned to begin testing on a routine basis the subscriber lines in the exchange 20 beginning with the subscriber line, the numerical portion of the directory number of which is: 1111.

Again assuming that the circuit 200 is to test upon a routine basis the subscriber lines in the central office 10, the office select key K205 is operated so as to effect illumination of the lamps M1, C1, X1 and U1, all in the manner previously explained. At this time, in the event the operator does not wish the route testing by the circuit 200 to begin in the first thousand group she merely operates one or more times the thousand step key K202 so as to effect the transmission of a corresponding number of ground impulses via the conductor 302 to the rotary magnet M314 of the thousand switch 310, whereby the wipers noted thereof are stepped a corresponding number of steps so that at the conclusion of the stepping of the thousand switch 310, the corresponding thousand lamp M is illuminated indicating to the operator the particular thousand group of the subscriber lines in the central office 10 at which testing by the circuit 200 is to begin. Also, at this time in the event the operator does not wish the routine testing by the circuit 200 to begin in the first hundred group, she merely operates one or more times the hundred step key K203 so as to effect the transmission of a corresponding number of impulses via the conductor 337 to the rotary magnet M414 of the hundred switch 410, whereby the wipers noted thereof are stepped a corresponding number of steps so that at the conclusion of the stepping of the hundred switch 410 the corresponding hundred lamp C is illuminated indicating to the operator the particular hundred group of the subscriber lines in the central office 10 at which testing by the circuit 200 is to begin.

In view of the foregoing, it will be understood that the operator at the test board 30 after conditioning the circuit 200 to test on a routine basis the subscriber lines in the central office 10 may further condition the circuit 200 to begin the routine testing at any desired thousand group and at any desired hundred group in the desired thousand group by appropriate manipulation of the thousand step key K202 and the hundred step key K203.

Section 9.—*General operation of the automatic line testing circuit 200*

Again assuming that the circuit 200 is to test upon a routine basis the subscriber lines in the central office 10, and that the testing of the subscriber lines is to begin with the subscriber line, the numerical portion of which is 1111, the subscriber line 1150 extending to the subscriber substation T1, the operator merely operates momentarily the test start key K201, after having operated the office select key K205, in the manner explained in Section 8. When the test start key K201 is thus momentarily operated, ground is applied to the conductor 407 completing a circuit, including the contacts 411 and the conductor 698, for operating the start relay R350. Upon operating the start relay R350 completes, at the contacts 352, a circuit, including the grounded conductor 336, and the contacts 423, for energizing the upper winding of the switch relay R360, causing the latter relay to operate. Upon operating the switch relay R360 completes, at the contacts 365, a path, including the contacts 332, for applying ground to the hold conductor 686. The application of ground to the hold conductor 686 completes a circuit, including the contacts 481 and 444, the conductor 509, the adjustable resistor 518 and the contacts 551, for operating the pulse relay R560. Upon operating the pulse relay R560 completes, at the contacts 563, a circuit, including the grounded hold conductor 686, the conductor 493, the contacts 345 and the conductor 494, for operating the first count relay R580. Upon operating the first count relay R580 completes, at the contacts 587, a circuit, including the contacts 347, the conductor 396, the conductor 395, the contacts 354 and 332, for operating the hold relay R340. Upon operating the hold relay R340 completes, at the contacts 346, a holding circuit, including the contacts 333, for energizing the winding thereof; and completes, at the contacts 341, a holding circuit, including the conductor 304 and the contacts 234, for energizing the upper winding of the office select relay R230.

Also the hold relay R340 completes, at the contacts 344, a circuit, including the grounded hold conductor 686, the contacts 481 and 444, the conductor 509, the contacts 351, the conductor 409, the contacts 552 and the adjustable resistor 519, for energizing the lower winding of the pulse timer relay R550 in order to cause the latter relay to operate. Upon operating the pulse timer relay R550 interrupts, at the contacts 552, the operating circuit for energizing the lower winding thereof; whereby the energy stored in the lower winding thereof is discharged through the adjustable resistor 519, the upper winding thereof, and the bank of condensers 522, rendering the pulse timer relay R550 slow-to-release. The slow-to-release characteristic of the pulse timer relay R550 may be adjusted by adjustment of the resistor 519, whereby the cycle time of the pulse timer relay R550 may be determined. Upon restoring the pulse timer relay R550 recompletes, at the contacts 552, its operating circuit causing the latter relay to reoperate and again interrupt, at the contacts 552, its operating circuit. Each time the pulse timer relay R550 operates, it interrupts, at the contacts 551, the circuit for operating the pulse relay R560 causing the latter relay to restore; and each time the pulse timer relay R550 restores, it recompletes, at the contacts 551, the circuit for operating the pulse relay R560, causing the latter relay to reoperate.

First consider the relationship of the cycle relay R570, the twelve count relays R580, etc., and the pulse relay R560, without reference to the circuit functions that are performed as a consequence of operation and restoration of these relays. When the first count relay R580 operates over the previously traced circuit, including the conductor 494, it completes, at the contacts 582, a path, including the contacts 582, the conductor 602, and the grounded hold conductor 686, for short-circuiting the lower winding of the cycle relay R570. Also when the hold relay R340 operated, it interrupted, at the contacts 345, the above traced path for short-circuiting the lower winding of the cycle relay R570. However at this time, an alternative path, including the contacts 571, 562, and the grounded hold conductor 686, is completed for short-circuiting the lower winding of the cycle relay R570. Now when the pulse relay R560 restores, the above traced alternative path for short-circuiting the lower winding of the cycle relay R570 is interrupted, whereby the lower winding of the cycle relay R570 is energized in series circuit relation with the winding of the first count relay R580 via a circuit, including the grounded hold conductor 686 and the contacts 592 and 582, causing the cycle relay R570 to operate. Upon operating the cycle relay R570 interrupts, at the contacts 571, a further point in the path for short-circuiting the lower winding thereof; and prepares, at the contacts 572, a holding circuit for energizing the upper winding thereof. Also upon operating the cycle relay R570 interrupts, at the contacts 573, a further point in a path for transmitting impulses over the conductor 604; and prepares, at the contacts 574, a point in a path for transmitting impulses over the conductor 606.

Upon the next operation of the pulse relay R560, there is completed, at the contacts 562, the holding circuit, including the grounded hold conductor 686 and the contacts 572, for energizing the upper winding of the cycle relay R570; and there is completed, at the contacts 563, the path, including the contacts 574, for transmitting a ground impulse from the grounded hold conductor 686 to the conductor 606. When this ground impulse is transmitted over the conductor 606 a circuit, including the contacts 583, is completed, for energizing the winding of the second count relay R590 in order to cause the latter relay to operate. Upon operating the second count relay R590 interrupts, at the contacts 592, the holding circuit for energizing the winding of the first count relay R580 in series with the lower winding of the cycle relay R570 so as to cause the first count relay R580 to restore; the cycle relay R570 being retained in its operated position at this time by virtue of the completed holding circuit for energizing the upper winding thereof. Also the second count relay R590 completes, at the contacts 594, a holding circuit, including the contacts 624, the conductor 607, the resistor 523, and the grounded hold conductor 686, for energizing the winding thereof.

Now when the pulse relay R560 again restores, it interrupts, at the contacts 562, the holding circuit for energizing the upper winding of the cycle relay R570 in order to cause the latter relay to restore. Upon restoring the cycle relay R570 interrupts, at the contacts 574, the path for transmitting ground impulses over the conductor 606; and completes, at the contacts 573, a path for transmitting ground impulses over the conductor 604. Upon the next operation of pulse relay R560 a ground impulse is transmitted over the conductor 604, a circuit, including the contacts 593, is completed for operating the third count or prime relay R620. Upon operating the third count relay R620 interrupts, at the contacts 624, the holding circuit for energizing the winding of the second count relay R590 in order to cause the latter relay to restore; and completes, at the contacts 622, an alternative path, including the contacts 627 and the conductor 602 and the grounded hold conductor 686, for short-circuiting the lower winding of the cycle relay R570. Now when the pulse relay R560 again restores, it interrupts, at the contacts 563, the path for transmitting the ground impulse over the conductor 604 thereby to interrupt the path for short-circuiting the lower winding of the cycle relay R570, whereby a holding circuit, including the grounded hold conductor 686, the conductor 602, and the contacts 627 and 622, is completed for energizing the lower winding of the cycle relay R570 in series with the winding of the third count relay R620 in order to retain the third count relay R620 in its operated position and to effect reoperation of the cycle relay R570.

In view of the foregoing explanation of the cooperation between the pulse relay R560, the cycle relay R570 and the first, second and third count relays R580, R590 and R620, the following sequence will be understood. Upon the first operation of the pulse relay R560, the first count relay R580 is operated; upon the first restoration of the pulse relay R560, the first count relay R580 is retained in its operated position and the cycle relay R570 is operated. Upon the second operation of the pulse relay R560, the cycle relay R570 is retained in its operated position, the second count relay R590 is operated and the first count relay R580 restored. Upon the second restoration of the pulse relay R560, the cycle relay R570 is restored and the second count relay R590 is retained in its operated position. Upon the third operation of the pulse relay R560, the prime or third count relay R620 is operated and the second count relay R590 is restored. Upon the third restoration of the pulse relay R560, the third count relay R620 is retained in its operated position and the cycle relay R570 is reoperated. Upon the fourth operation of the pulse relay R560, the battery or fourth count relay R625 is operated, the cycle relay R570 is retained in its operated position and the third count relay R620 is restored. Upon the fourth restoration of the pulse relay R560, the fourth count relay R625 is retained in its operated position and the cycle relay R570 is restored. This sequence continues, whereby the prime or fifth count relay R630, the ground or sixth count relay R635, the prime or seventh count relay R640, the loop or eighth count relay R645, the ninth count relay R650, the tenth count relay R655, the eleventh count relay R660 and the twelfth count relay R670 are sequentially operated with the restoration of each preceding count relay upon the operation of the succeeding count relay.

Finally when the twelfth count relay R670 operates, it completes, at the contacts 674, a connection between the conductor 604 and the conductor 494 so as to prepare the first count relay R580 for reoperation; and completes, at the contacts 675, a holding circuit for energizing the winding thereof that includes the conductor 608, the contacts 584, the resistor 623 and the grounded hold conductor 686. Accordingly when the pulse relay R560 operates the thirteenth time or the first time upon the second cycle, it completes, at the contacts 563, a circuit, including the contacts 573 and 674, as well as the grounded hold conductor 686 and the conductors 604 and 494 for reoperating the first count relay R580 so as to begin the second cycle through the twelve count relays R580, etc. Also upon reoperating the first count relay R580 interrupts, at the contacts 584, the holding circuit for retaining operated the twelfth count relay R670. Thus it will be understood that the twelve count relays R580, etc., are operated sequentially through successive cycles.

Now reverting to the circuit and control functions of the count relays R580, etc., in their first cycle of operation, when the ninth count relay R650 operates, it completes, at the contacts 651′ a circuit, including the grounded hold conductor 686, the conductor 688 and the contacts 267, for energizing the upper winding of the control relay R620, causing the latter relay to operate. Upon operating the control relay R260 completes, at the contacts 267′, a momentary path, also including the conductor 308, the contacts 391 and 385, the conductor 333, the contacts 423, the conductor 336, the contacts 238, and the grounded conductor 271, for short-circuiting the lower winding thereof. Also the control relay R260 interrupts, at the contacts 267, the operating circuit for energizing the upper winding thereof and the path noted above, whereby a holding circuit substantially identical to that traced above is completed for energizing the upper and lower winding thereof in series circuit relation.

Also upon operating the control relay R260 completes, at the contacts 263, a path, including the contacts 232, for applying ground to the conductor 873 in the access cable 870 extending to the test distributor trunk circuit 800 so as to effect operation of the seize relay R840 therein, for the purpose explained in Section 3. Further the control relay R260 completes, at the contacts 265, a path for applying ground to the conductor 306 terminated by the home contact engaged by the wiper 211 of the control switch 210 so as to complete a circuit, including the contacts 216, for operating the rotary magnet 215. Upon operating the rotary magnet 215 interrupts, at the contacts 216, the operating circuit therefor, and restores driving the wipers noted one step in the clockwise direction out of their home positions into their first positions. When the wiper 211 disengages the home contact in the associated contact bank, it interrupts the circuit for operating the rotary magnet M215. At this time ground is applied via the contacts 378 and 387, the resistor 317, the conductor 691, the contacts 325 and the conductor 692 to the multiple that is terminated upon the first, second, fourth, sixth, eighth and tenth contacts in the contact bank associated with the wiper 214 of the control switch 210, whereby resistance ground is applied to the wiper 214 in its first position and consequently via the conductor 276 and the contacts 231 to the conductor 874 in the access cable 870 causing selective operation of the test connect relay R810, without operation of the B. C. O. relay R830, in the test distributor trunk circuit 800, for the purpose explained in Section 3. In passing, it is noted that the third, fifth, seventh and ninth contacts in the contact bank associated with the wiper 214 of the control switch 210 are excluded from the multiple noted terminating the conductor 692, whereby resistance ground is removed from the conductor 874 in the access cable 870 in the corresponding positions of the control switch 210 so as to effect restoration of the test connect relay R810 in the test distributor trunk circuit 800 in the positions noted. As explained more fully hereinafter, in the third, fifth, seventh and ninth positions of the control switch 210, resistance ground is removed from the conductor 874 effecting the restoration of the test connect relay R810 in these positions; and in the third, fifth, seventh and ninth positions of the control switch 210, the respective first, second, third and fourth digits comprising the numerical portion of the directory number of the subscriber line in the central office 10 to be tested are transmitted over the conductors 871 and 872 in the access cable 870 in order to cause corresponding settings of the test distributor switch 900 and the test connector switch 1100, in the manner explained in Section 3.

When the twelfth count relay R670 is operated and then restored in the first cycle therethrough, there is completed and then interrupted, at the contacts 677, a path for applying ground to the conductor 307 in order to effect operation and restoration of the rotary magnet M215 so that the wipers noted of the control switch 210 are driven an additional step in the clockwise direction to engage the second contacts in the associated contact bank. The path noted extends when completed from the conductor 307 via the contacts 266, the conductor 394, the contacts 458, the conductor 693, the contacts 677, the conductor 694, the contacts 485, the conductor 439, the contacts 586, the conductor 395, and the contacts 354 and 332 to ground. Thus at the conclusion of the first cycle of operation of the count relays R580, etc., and incident to operation of the twelfth count relay R670, the control switch 210 is operated into its second position. Now the count relays R580, etc., operate through their second cycle and incident to the reoperation of the twelfth count relay R670 therein, the above traced circuit for operating and restoring the rotary magnet M215 of the control switch 210 is again completed and interrupted, at the contacts 677 thereof, whereby at the conclusion of the second cycle of operation of the count relays R580, etc., the control switch 210 is driven into its third position. When the wiper 214 of the control switch 210 is operated into its third position, it disengages the multiple including the grounded conductor 692 so as to remove resistance ground from the conductor 874 in the access cable 870 in order to effect the restoration of the test connect relay R810 in the test distributor circuit 800, for the purpose explained in Section 3.

In the third cycle of operation of the count relays R580, etc., the first count relay R580 completes, at the contacts 585, a shunt around the impulsing contacts 564 of the pulse relay R560 between the impulse conductors 501′ and 502′, thereby disabling the impulsing contacts 564. Now upon the second operation of the pulse relay R560, the second count relay R590 is operated effecting the restoration of the first count relay R580, whereby the shunt contacts 585 are opened while the impulsing contacts 564 are closed. Thus upon the next restoration and reoperation of the pulse relay R560 to operate the third count relay R620, the impulsing contacts 564 are effective to transmit an impulse over the impulse conductors 501′ and 502′, whereby the first complete impulse is transmitted by the contacts 564 incident to operation of the third count relay R620. Accordingly it will be understood that while there are twelve count relays R580, etc., a maximum of ten impulses may be transmitted, at the contacts 564, by the pulse relay R560, over the impulsing conductors 501′ and 502′ in a cycle of operation of the count relays R580, etc. The impulse, or impulses comprising the first digit are transmitted via the impulsing conductors 501′ and 502′, the contacts 454 and 455, the conductors 498 and 499, the contacts 375, 377, 361 and 362, the conductors 334 and 335, the contacts 268, 269, 236 and 237 and the conductors 871 and 872 in the access cable 870 to the test distributor trunk circuit 800 so as to control the line relays R940 and R950 in the test distributor switch 900, in the manner explained in Section 3. Each time the pulse relay R560 operates, it completes, at the contacts 561, a path for connecting the grounded hold conductor 686 to the conductor 698. Thus ground is applied to the first marking conductor in the marking cable 394, incident to operation of the third count relay R620, and at the conclusion of the transmission of the first impulse by the pulse relay R560 over the impulsing conductor 501′ and 502′, as explained above; and ground is applied to the second marking conductor in the marking cable 394 incident to operation of the fourth count relay R625 and at the conclusion of the transmission of the second impulse by the pulse relay R560 over the impulsing conductors 501′ and 502′, etc.

Accordingly in the present example, when the third count relay R520 is operated at the conclusion of the transmission of the first impulse over the impulsing conductors 501′ and 502′ by the pulse relay R560, ground is applied to the first marking conductor in the cable 394 effecting the completion of a circuit for energizing the intermediate winding of the digit stop relay R490 since the thousand switch 310 occupies its first position registering the thousand digit 1. Specifically this circuit extends from the first grounded marking conductor in the marking cable 394 by way of the wiper 312 and the engaged first contact in the associated contact bank in the thousand switch 310, the conductor 301, the wiper 213 and the engaged third contact in the associated contact bank in the control switch 210, the conductor 408, the intermediate winding of the digit stop relay R490 and the contacts 581 and 591 to battery. When this circuit is completed, the digit stop relay R490 operates to complete, at the contacts 491, an obvious multiple holding circuit for energizing the intermediate winding thereof; and completes, at the contacts 492, a direct shunt between the impulsing conductors 501′ and 502′ so as to disable the impulsing contacts 564 of the pulse relay R560.

In the third cycle of the count relays R580, etc., when the twelfth count relay R670 is again operated and restored, there is completed and then interrupted, at the contacts 677, the circuit for operating the rotary magnet M215 of the control switch 210, in order to drive the wipers noted thereof into their fourth positions; also at this time, the count relays R580, etc., begin operating through the next cycle, in the manner previously described. When the wiper 213 of the control switch 210 engages the fourth contact in the associated contact bank terminating the conductor 338 in the associated multiple, a holding circuit is completed for energizing the upper winding of the digit stop relay R490; which holding circuit also includes the conductor 408, the contacts 491, and the grounded hold conductor 686. In the fourth cycle of operation of the count relay R580, etc., the first count relay R580 interrupts, at the contacts 581, the original operating circuit for energizing the intermediate winding of the digit stop relay R490; however without effect since the previously traced holding circuit is completed for energizing the upper winding thereof so that the operated digit stop relay R490 disables, at the shunt contacts 492, the impulsing contacts 564 of the pulse relay R560 in the present cycle of operation of the count relays R580, etc.

Upon the completion of the fourth cycle of operation of the count relays R580, etc., and incident to operation and restoration of the twelfth count relay R670, the contacts 677 are again closed and then opened so as to cause the rotary magnet M215 of the control switch 210 to drive the wipers noted into their fifth positions. When the wiper 213 of the control switch 210 disengages the fourth contact in the associated contact bank, it interrupts the holding circuit for energizing the upper winding of the digit stop relay R490, whereby only the operating circuit for energizing the intermediate winding thereof is completed at this time, the last-mentioned circuit including the contacts 581 of the first count relay R580. Accordingly at this time when the first count relay R580 is operated in the fifth cycle of the count relays R580, etc., there is interrupted, at the contacts 581 of the first count relay R580, the operating circuit for energizing the intermediate winding of the digit stop relay R490 in order to cause the latter relay to restore so as to open the shunt contacts 492 between the impulsing conductors 501′ and 502′. The pulse relay R560 again transmits, at the contacts 564, the impulse (or impulses) comprising the second digit during the fifth cycle of the count relay R580, etc. In the present example, the second digit comprises the digit 1, whereby upon operation of the third count relay R620, at the conclusion of the transmission of the second digit 1, the application of ground potential to the first marking conductor in the marking cable 394 completes the previously traced circuit for energizing the intermediate winding of the digit stop relay R490 since the hundred switch 410 occupies its first position registering the hundred digit 1. This circuit extends from the grounded first marking conductor in the marking cable 394 by way of the wiper 412 and the engaged first contact in the associated contact bank of the hundred switch 410, the conductor 402, the wiper 213 and the engaged fifth contact in the associated contact bank of the control switch 210, the conductor 408, the intermediate winding of the digit stop relay R490 and the contacts 481 and 491 to battery. Thus the digit stop relay R490 is again operated in order to complete, at the contacts 492, the shunt around the impulsing contacts 564 of the pulse relay R560.

At the conclusion of the fifth cycle of the count relays R580, etc., the twelfth count relay R670 operates in order to effect driving of the wipers noted of the control switch 210 into its sixth position, so that the wiper 213 again completes the holding circuit for energizing the upper winding of the digit stop relay R490 during the six cycle of operation of the count relays R580, etc., and at the conclusion of the sixth cycle of operation of the count relays R580, etc., the twelfth count relay R670 again operates to drive the wipers noted of the control switch 210 from its sixth position into its seventh position so that the restoration of the digit stop relay R490 may be effected at the beginning of the seventh cycle of operation of the count relays R580, etc.

During the seventh cycle of operation of the count relays R580, etc., the pulse relay R560 sends, at the contacts 564, the impulse (or impulses) of the third digit; and in the present example since the third digit is 1, the previously traced circuit for energizing the intermediate winding of the digit stop relay R490 is completed incident to operation of the third count relay R620 since the ten switch 510 occupies its first position. In this case, the grounded first marking conductor in the marking cable 394 is extended via the wiper 513 of the ten switch 510 and the engaged first contact in the associated contact bank, the conductor 502, the wiper 213 of the control switch 210 and the engaged seventh contact in the associated contact bank to the conductor 408 and thence on to the intermediate winding of the digit stop relay R490. Thus the digit stop relay R490 is again operated in order to complete, at the contacts 492, the shunt around the impulsing contacts 564 of the pulse relay R560.

At the conclusion of the seventh cycle of the count relays R580, etc., the twelfth count relay R670 operates in order to effect driving the wipers noted of the control switch 212 into its eighth position so that the wiper 213 again completes the holding circuit for energizing the upper winding of the digit stop relay R490 during the eighth cycle of operation of the count relays R580, etc.; and at the conclusion of the eighth cycle of operation of the count relays R580, etc., the twelfth count relay R670 again operates to drive the wipers noted of the control switch 210 from its eighth position into its ninth position so that the digit stop relay R490 may be subsequently restored.

During the ninth cycle of operation of the count relays R580, etc., the pulse relay R560 sends, at the contacts 564, a single impulse comprising the fourth digit 1; whereupon the third count relay R620 upon operating completes the previously traced circuit for energizing the intermediate winding of the digit stop relay R490. This circuit extends from the grounded first marking conductor in the marking cable 394 directly to the ninth contact engaged by the wiper 213 of the control switch 210 and thence via the conductor 408 to the intermediate winding of the digit stop relay R490. Thus it will be understood that the fourth or unit digit is not taken from the unit switch 610 but is completed directly by virtue of the strap between the first marking conductor in the marking cable 394 and the ninth contact associated with the wiper 213 of the control switch 210, whereby the fourth digit always comprises the digit 1. Thus the digit stop relay R490 is again operated in order to complete, at the contacts 492, the shunt around the impulsing contacts 564 of the pulse relay R560.

At the conclusion of the ninth cycle of the count relays R580, etc., the twelfth count relay R670 operates in order to effect driving of the wipers noted of the control switch 210 into their tenth positions so that the wiper 212 engages the tenth contact in the associated contact bank terminating the conductor 495 in order to complete multiple circuits for operating the transfer relay R320 and the test relay R450. More particularly, ground, at the contacts 261, is applied via the conductor 275 to the wiper 212 and thence to the conductor 495, completing a direct circuit for operating the test relay R450 and a multiple circuit, including the contacts 323, for operating the transfer relay R320.

Upon operating the transfer relay R320 completes, at the contacts 322, a holding circuit, including the conductor 308, the contacts 391 and 385, the conductor 338 and the contacts 423, to the grounded conductor 336; and interrupts, at the contacts 323, the initial operating circuit therefor. Upon operating the test relay R450 completes, at the contacts 452, a circuit for operating the switch relay R480. Also upon operating the test relay R450 interrupts, at the contacts 454 and 455, the previously traced connection between the conductors 871 and 872 in the access cable 870 and the impulsing conductors 501′ and 502′; and completes, at the contacts 453 and 456, connections, including the contacts 464 and 465, between the conductors 871 and 872 in the access cable 870 and the test conductors 681 and 682, for a purpose more fully explained hereinafter.

Recapitulating, the first digit 1, the second digit 1, the third digit 1, and the fourth digit 1 were transmitted in the respective third, fifth, seventh and ninth positions of the control switch 210 when the wiper 214 thereof engaged the corresponding contacts in the associated contact bank that were excluded from the multiple connected to the conductor 692, whereby resistance ground was removed from the conductor 874 in the access cable 870 during the transmission of the four digits noted in order that the test connect relay R810 in the test distributor trunk circuit 800 restored during the transmission of the four digits over the conductors 871 and 872 in the access cable 870 so that the four digits were received by the line relays R940 and R950 in the test distributor switch 900 for the purpose explained in Section 3. Specifically the test distributor switch 900 responded to the first two of the digits noted and the test connector switch 1100 responded to the second two of the digits noted, whereby the subscriber line 1150 was selected.

In the fourth, sixth and eighth positions of the control switch 210 resistance ground was returned upon the conductor 874 in the access cable 870 so as to effect reoperation of the test connect relay R810 in the test distributor trunk circuit 800 between the four digits noted. Also at the present time while the control switch 210 occupies its tenth position resistance ground is returned upon the conductor 874 in the access cable 870 so as to effect reoperation of the test connect relay R810 in the test distributor trunk circuit 800; whereby the latter relay completes, at the contacts 811 and 813, direct metallic connections between the line conductors 1151 and 1152 of the subscriber line 1150 and the conductors 871 and 872 in the access cable 870.

At this time, the count relays R580, etc., are operating through their tenth cycle and when the third count relay R620 operates, it completes, at the contacts 621′ and 622′, paths for respectively applying battery via the resistor 607 to the conductor 683 and ground to the conductor 684, whereby a priming circuit, including the contacts 457, is completed for energizing the line test relay R520 so as to cause the latter relay to operate. Subsequently when the fourth count relay R625 operates it completes, at the contacts 627′, a path for connecting together the test conductors 681 and 682; effects the restoration of the third count relay R620; and completes, at the contacts 626′ and 628′ a test connection from ground via the wiper 606 of the resistance selector S605 and the engaged second contact in the associated contact bank and the associated two segments of resistance, the conductor 684, the contacts 457, the winding of the line test relay R520, and the conductor 683 to the multiple connected test conductors 681 and 682. Accordingly ground is connected through the two segments of resistance of the resistance selector S605 and the winding of the line test relay R520 to the multiple connected test conductors 681 and 682 and thence on to the conductors 871 and 872 in the access cable 870 and ultimately to the line conductors 1151 and 1152 of the subscriber line 1150, whereby the line test relay R520 will remain in its operated position only in the event there is a battery fault on the subscriber line 1150. Now assuming that there is no battery fault upon the subscriber line 1150, the line test relay R520 restores and when the fifth count relay R650 operates, it effects the restoration of the fourth count relay R625; and recompletes, at the contacts 631′ and 632′, an alternative priming circuit substantially identical to that previously traced for reoperating the line test relay R520. Subsequently when the sixth count relay R635 operates, it completes at the contacts 637′, a path for connecting together the test conductors 681 and 682; effects the restoration of the fifth count relay R630; and completes, at the contacts 636′ and 638′ a test connection from battery via the resistor 607 and the resistance selector S605 to the multiple connected test conductors 681 and 682 that also includes the winding of the line test relay R620. This test connection extends from battery by way of the resistor 607, the contacts 638′, the conductor 683, the winding of the line test relay R620, the contacts 457, the conductor 684, the two segments of resistance of the resistance selector S605, the wiper 606 and the engaged second contact thereof, and the contact 636′ to the multiple connected test conductors 681 and 682. Accordingly battery is connected through the two segments of resistance in the resistance selector S605 and the winding of the line test relay R520 to the multiple connected test conductors 681 and 682 and thence on to the conductors 871 and 872 in the access cable 870 and ultimately to the line conductors 1151 and 1152 of the subscriber line 1150, whereby the line test relay R520 will remain in its operated position only in the event there is a ground fault on the subscriber line 1150. Now assuming that there is no ground fault upon the subscriber line 1150, the line test relay R520 restores and when the seventh count relay R640 operates, it effects the restoration of the sixth count relay R635; and recompletes an alternative priming circuit substantially identical to that previously described for reoperating the line test relay R520. When the eighth count relay R645 operates, it completes, at the contacts 646′, 647′ and 648′, a test connection, including the winding of the line test relay R520 and the two segments of resistance in the resistance selector S605 to the test conductors 681 and 682. More particularly ground is applied directly via the contacts 647′ to the test conductor 682; and battery is applied via the resistor 607, the contacts 648′, the conductor 683, the winding of the line test relay R520, the contacts 457, the conductor 684, the two segments of resistance in the resistance selector 605, the wiper 606 of the resistance selector S605 and the engaged second contact in the associated contact bank and the contact 646′ to the test conductor 681. Accordingly ground and battery are respectively applied via the above traced test connection to the test conductors 682 and 681 and thence via the conductors 872 and 871 in the access cable 870 and ultimately to the line conductors 1152 and 1151 of the subscriber line 1150, whereby the line test relay R520 will remain in its operated position only in the event there is a loop fault between the line conductors 1151 and 1152 of the subscriber line 1150.

Now assuming that there is no loop fault between the line conductors of the subscriber line 1150, when the ninth count relay R650 operates, it interrupts, at the contacts 652′, the path for applying ground via the resistor 317 to the conductor 874 in the access cable 870 so as to effect the restoration of the test connect relay R810 in the test distributor trunk circuit 800. Upon restoring the test connect relay R810 disconnects, at the contacts 811 and 813, the —T and +T leads from the ring and tip conductors R871 and R872 in the access cable 870 and connects the line relays R940 and R950 respectively to the tip and ring conductors 872 and 871 in the access cable 870 which tip and ring conductors 872 and 871 are not connected together at this time in the circuit 200 so that the line relays R940 and R950 in the test distributor switch 900 restore. Upon restoring the line relay R950 interrupts, at the contacts 943, the circuit for retaining operated the line relay R1120 in the test connector switch 1100 so that upon restoring the latter relay effects reoperation of the rotary magnet M1115 so that the wiper carriage of the Strowger mechanism 1110 is driven to select line 12 accessible thereto.

Now when the tenth count relay R655 operates it completes, at the contacts 657', a path substantially identical to that previously traced for applying ground by way of the resistor 317 to the conductor 874 in the access cable 870 so as again to operate the test connect relay R810 in the test distributor trunk circuit 800 effecting reoperation of the line relays R840 and R850 in the test distributor switch 900 and the consequent reoperation of the line relay R1120 in the test connector switch 1100.

At this time, the subscriber line, the numerical portion of the directory number of which is: 1112 is selected by the test connector switch 1100; and when the twelfth count relay R670 is operated and then restored in the present tenth cycle of operation of the count relays R580, etc., it completes and then interrupts, at the contacts 672; a circuit, including the conductor 601, the contacts 451, and the conductor 696, for operating the rotary magnet M615 of the unit switch 610 so as to drive the wipers thereof to engage the second contacts in the associated contact banks. When the wiper 614 of the unit switch 610 is driven to disengage the first contact and to engage the second contact in the associated contact bank, the lamp U1 is extinguished and the lamp U2 is illuminated. Thus at this time the lamps M1, C1, X1 and U2 are illuminated indicating that the circuit 200 is in readiness to test the subscriber line in the central office 10, the numerical portion of the director number of which is: 1112. Upon the next cycle of operation of the count relays R580, etc., the line test relay R520 tests the selected subscriber line noted in order to determine whether there is a battery fault, or a ground fault, or a loop fault thereon, in the manner described above.

Referring to the line test relay R520, as previously explained, this relay is operated and saturated as a consequence of operation of the prime relays R620, R630 and R640 just preceding operation of the respective battery, ground and loop relays R625, R635 and R645 wherein respective battery, ground and loop fault tests are made. The line test relay R520 is retained in its operated position in series with one of the faults noted of a total resistance of 50,000 ohms and the segments of the resistance selector S605 are made of 10,000 ohms each so that the resistance selector S605 is adjustable to maintain the line test relay R520 in its operated position upon faults of adjustable resistance. In the example illustrated, the resistance selector S605 occupies its second position setting two segments thereof into each test connection so that the line test relay R520 will be retained in its operated position in the event of a fault having a resistance of 30,000 ohms, or less, in an obvious manner.

Moreover at the beginning of the testing of the subscriber line 1150, the switch relay R480 was operated, whereby it interrupted, at the contacts 481, the original circuit for energizing the winding of the pulse relay R560, whereby the pulse relay R560 is then energized via a first alternative circuit, including the contacts 551, the resistor 518, the conductor 509, the contacts 366, the conductor 689 and the chain back contacts 645'', 635'' and 626'' and the grounded hold conductor 686. Now when the battery relay R625 operates, it interrupts, at the contacts 626'' the first alternative circuit for operating the pulse relay R560 and completes, at the contacts 629' a further alternative circuit for operating the pulse relay R560 that includes the conductor 685, the contacts 541, 521 and 482 and the grounded hold conductor 686. Thus when the battery relay R625 occupies its operated position, the circuit for sustaining operation of the pulse relay R560 includes the conductor 685. Similarly when the ground relay R635 occupies its operated position, the circuit for sustaining operation of the pulse relay R560 includes the conductor 685 and the contacts 639'. Finally when the loop relay R635 occupies its operated position, the circuit for sustaining operation of the pulse relay R560 includes the conductor 685 and the contacts 649'.

Now since the line test relay R520 occupies its operated position when the battery relay R625 is operated, when the ground relay R635 is operated, and when the loop relay R645 is operated, the alternative circuit, including the conductor 685 for sustaining operation of the pulse relay R560 is interrupted, at the contacts 521 of the operated line test relay R520. Thus it will be understood that the line test relay R520 must restore in order to recomplete, at the contacts 521, the circuit for sustaining operation of the pulse relay R560. Accordingly in the event of any one of the faults noted, the line test relay R520 being retained in its operated position arrests further operation of the pulse relay R560 so that the cycle of operation of the count relays R560, etc., is arrested while one of the count relays R625, R635 or R645 occupies its operated position.

Since the test start key K201 was operated only momentarily, the start relay R350 is maintained in its operated position by virtue of the pulsing operation of the pulse relay R560 transmitting, at the contacts 561, ground impulses from the grounded hold conductor 686 over the conductor 689, and consequently to the winding of the start relay R350, the latter relay being of the slow-to-release type. Accordingly when the operation of the pulse relay R560 is arrested due to a fault, as explained above, the start relay R350 restores shortly thereafter, interrupting, at the contacts 352, a point in the holding circuit for energizing the upper winding of the switch relay R360 so as to cause the latter relay to restore shortly thereafter. Upon restoring the switch relay R360 interrupts, at the contacts 361 and 362 the test connection between the winding of the test relay R520 and the conductors 871 and 872 in the access cable 870 causing the line test relay R520 to restore. Also upon restoring the switch relay R360 completes, at the contacts 364, a path, including the contacts 332 and 324 for grounding the conductor 685, whereby one of the fault lamps L601, L602 or L603 is directly illuminated depending upon the operated position of the corresponding count relay R625, R635 or R645. Of course the illumination of one of the fault lamps L601, L602 or L603 indicates to the operator at the test board 30, the character of the fault that was found upon the subscriber line undergoing test; whereas the illumination of the lamps M1, C1, X1 and U1 identify the subscriber line that was found to be subject to the fault noted.

In order to restore operation of the circuit 200, it is only necessary for the operator at the test board 30 again momentarily to operate the test start key K201 so as again to effect operation of the start relay R350. Upon reoperating the start relay R350 recompletes, at the contacts 352, the previously traced circuit for energizing the upper winding of the switch relay R360 in order to effect reoperation of the latter relay. Upon reoperating the switch relay R360 interrupts, at the contacts 364, the previously traced circuit for illuminating one of the fault lamps L601, etc., corresponding to the operated one of the count relays R625, etc. However during the time that the circuit 200 is stopped, the operated one of the count relays R625, etc., was retained in its operated position; hence ground was retained upon the hold conductor 686 via a path, including the contacts 484 and 332. Also upon reoperating the start relay R350 completes, at the contacts 353, an alternative circuit, including the contacts 551, the resistor 518, the conductor 509, and the conductor 689, to the conductor 685 depending upon the particular operated one of the count relays R625, R635 or R645, and then from the conductor 685 via the contacts 541, 521, and 482 to the grounded hold conductor 686. Accordingly the pulse relay R560 reoperates advancing the counting chain through the counting relays R630, R640 or R650, and ultimately to the twelfth count relay R670.

In view of the foregoing, it will be understood that in the event operation of the circuit 200 is arrested as a consequence of finding a battery fault upon the subscriber line 1150, when operation thereof of the circuit 200 is again initiated by momentary reoperation of the test start key K201, the count relays R630, etc., progress, whereby the circuit 200 then proceeds to make the ground fault and loop fault tests upon the subscriber line 1150.

In view of the foregoing description of the operation of the circuit 200, it will be understood that the subscriber lines in the central office 10 having the directory numbers the numerical portions of which are: 1111 to 1110, inclusive, are sequentially tested; whereupon the twelfth count relay R670 is operated and then restored while the unit switch 610 is in its tenth position, completing a circuit for operating the level finish relay R370 and a multiple holding circuit for energizing the lower winding of the digit stop relay R490. This circuit extends when completed from the grounded hold conductor 686 via the conductor 506, the wiper 612 of the unit switch 610 and the engaged tenth contact in the associated contact bank and the conductor 697 to the windings noted of the relays R370 and R490 causing the level finish relay R370 to operate and the digit stop relay R490 to be retained in its operated position. Upon operating the level finish relay R370 interrupts, at the contacts 375, the connection to the ring conductor 871 in the access cable 870; and completes, at the contacts 376, a path, including the contacts 362, 269 and 237, for applying battery via the resistor 316 to the tip conductor 872 in the access cable 870. Further the level finish relay R370 interrupts, at the contacts 378, the path for applying ground via the resistor 317 to the conductor 874 in the access cable 870. When resistance ground is removed from the conductor 874, the test connect relay R810 in the test distributor trunk circuit 800 is restored so as to complete, at the contacts 814, the previously traced circuit for retaining operated the line ralay R940 in the test distributor switch 900. Also the test connect relay R810 completes, at the contacts 812, a connection between the ring conductor 871 and the line relay R950 in the test distributor switch 900, whereby the latter relay is restored since no potential is present upon the ring conductor 871. Accordingly in the test distributor switch 900 the line relay R940 is retained in its operated position and the line relay R950 is restored so as to effect the restoration of the line relay R1120 in the test connector switch 1100 and the consequent complete release of the test connector switch 1100 in the manner explained in Section 4. Also the level finish relay R370 completes, at the contacts 373, a holding circuit, including the conductor 690, the contact 664, the conductor 607, the resistor 623, and the grounded hold conductor 686, for energizing the winding thereof in multiple with the lower winding of the digit stop relay R490. Further the level finish relay R370 completes, at the contacts 374, a direct circuit, including the conductor 307, for operating the rotary magnet M215 of the control switch 210; and completes, at the contacts 371, a direct circuit, including the conductor 501, for operating the rotary magnet M515 of the ten switch control 510.

Also incident to the present restoration of the twelfth count relay R670, the unit switch 610 is driven out of its tenth position back into its home position, in the manner previously explained. When the wiper 612 of the unit switch 610 engages its home contact in its associated contact bank, the previously traced circuit, including the contacts 438 and 616 and the conductor 699 is completed for operating and then restoring the rotary magnet M615 so as to effect driving of the wipers noted of the unit switch into its first position in order again to illuminate the lamp U1. The cycle relays R580, etc. then proceeds through the next cycle of operation and when the eleventh count relay R660 operates, it interrupts, at the contacts 664, the holding circuit for energizing the winding of the level finish relay R370 and the lower winding of the digit stop relay R490 in order to cause the level finish relay R370 to restore. However the digit stop relay R490 is retained in its operated position by virtue of the completion of a holding circuit for energizing the intermediate winding thereof that was completed incident to operation of the digit stop relay R490. Upon restoring the level finish relay R370 interrupts, at the contacts 371, the circuit for operating the rotary magnet M515 in order to effect driving of the wipers noted of the ten switch 510 from their first positions into their second positions so that the lamp X1 is extinguished and the lamp X2 is illuminated. Also the level finish relay R370 interrupts, at the contacts 374, the circuit for operating the rotary magnet M215 to effect driving of the wipers noted of the control switch 210 from their tenth positions back into their home positions. When the wiper 211 engages the home contact in the associated contact bank, the previously traced circuit, including the contacts 265 and 216, and the conductor 306, is completed for operating and then restoring the rotary magnet M215, whereby the wipers noted of the control switch 210 are driven from their home positions into their first positions. At this time ground is applied via the contacts 265, the conductor 306, the contacts 321, and the conductor 303, to the multiple terminated upon the first five contacts in the contact bank associated with the wiper 211, whereby the rotary magnet M215 is operated buzzer-fashion to drive the wipers noted of the control switch 210 from their first positions into their sixth positions. When the wiper 213 of the control switch 210 engages the sixth contact in the associated contact bank terminating the conductor 338, the previously traced holding circuit for energizing the upper winding of the digit stop relay R490 is completed. When the wiper 212 of the control switch 210 disengaged the tenth contact in the associated contact bank the previously traced circuit for retaining operated the test relay R450 is interrupted so as to cause the latter relay to restore and effect the restoration of the switch relay R480.

Upon restoring the test relay R450 interrupts, at the contacts 453 and 456, the connections between the conductors 871 and 872 in the access cable 870 and the test conductors 681 and 682; and recompletes, at the contacts 454 and 455, the connections between the conductors 871 and 872 and the impulse conductors 501′ and 502′. At this time, the lamps M1, C1, X2 and U1 are illuminated indicating that the subscriber line in the central office 10, the directory number of which comprises the numerical portion: 1121, is to be next tested. The cycle relays R580 operate through another cycle, whereby the twelfth count relay R670 effects operation and restoration of the rotary magnet M215 driving the wipers noted of the control switch 210 into their seventh positions so as to interrupt the holding circuit for energizing the upper winding of the digit stop relay R490. In the next cycle of operation of the count relays R580, etc., the first count relay R580 upon operating interrupts the holding circuit for energizing the intermediate winding of the digit stop relay R490 in order to cause the latter relay to restore so as to render effective the impulsing contacts 564 of the pulse relay R560.

In the present example, the count relays R580, etc. transmit the digit 2 by virtue of the circumstance that the wipers noted of the ten switch 510 occupy their second positions; whereupon the previously traced operating circuit for energizing the intermediate winding of the digit stop relay R490 is completed causing the latter relay to reoperate. At the conclusion of the present cycle of operation of the count relays R580, etc., the wipers noted of the control switch 210 are driven into their eight positions, whereby the count relays R580, etc. operate through an additional cycle to drive the wipers noted of the control switch 210 into their ninth positions. In the succeeding cycle of operation of the count relays R580, etc., the digit 1 is transmitted by the pulse relay R560 prior to the operation of the digit stop relay R490, in the manner previously explained, whereupon the wipers noted of the control switch 210 are driven into their tenth position. At this time, the circuit 200 has operated to transmit the digit 2 followed by the digit 1 so as to effect operation of the Strowger mechanism 1110 in the test connector switch 1100 to select line 21 therein. In the next cycle of operation of the count relays R580, etc., the line 21 selected by the test connector switch 1100 is tested in the manner previously explained.

In view of the foregoing description of the operation of the circuit 200, it will be understood that lines 21 to 20, inclusive, accessible to the test connector switch 1100 are successively tested, whereby the level finish relay R370 is again operated so as to effect the release of the test connector switch 1100 and the subsequent reoperation thereof in accordance with the digits 3 and 1. Thus the lines accessible to the test connector switch 1100 are sequentially tested in each level until line 00, the tenth line in the tenth level, has been tested effecting reoperation of the level finish relay R380.

At this time, the level finish relay R370 is reoperated in the manner previously explained and effecting operation of the hundred finish relay R380 by virtue of the circumstance that the wipers noted of the ten switch 510 stand in their tenth positions. The circuit for operating the hundred finish relay R380 includes the contacts 372, the conductor 508, the wiper 512 of the ten switch 510 and the engaged tenth contact in the associated contact bank, the conductor 506, and the contacts 671′ of the operated twelfth count relay R670. Upon operating the hundred finish relay R380 completes, at the contacts 382, a holding circuit, including the contacts 341, for energizing the winding thereof; completes, at the contacts 384 and 383, a circuit, including the contacts 352, the conductor 338′ the contacts 423, and the grounded conductor 336 for operating the rotary magnet M414 of the hundred switch 410. Also the hundred finish relay R380 interrupts, at the contacts 385, the circuits for retaining operated the prepare relay R330, the transfer relay R320 and the control relay R260 causing the relays mentioned to restore. Upon restoring the control relay R260 completes, at the contacts 262 and 264, paths for applying ground to the conductors 303 and 274 so as to effect operation of the rotary magnet M215 so that the wipers of the control switch 210 are driven back into their home positions. Upon restoring the prepare relay R330 interrupts, at the contacts 333, the holding circuit for energizing the winding of the hold relay R340, in order to cause the latter relay to restore shortly thereafter, it being of the slow-to-release type.

During the time interval between the restoration of the prepare relay R330 and the hold relay R340 ground is applied to the conductor 305 and thence via the contacts 233 to the conductor 875 in the access cable 870 effecting the release of the seize relay R840 in the test distributor trunk circuit 800 and the consequent release of the test distributor switch 900 and the test connector switch 1100 as described in Section 4. Upon restoring the hold relay R340 interrupts, at the contacts 341, the holding circuit for retaining operated the hundred finish relay R380. Upon restoring the hundred finish relay R380 interrupts, at the contacts 384, the circuit for operating the rotary magnet M414 of the hundred switch 410 causing the wipers thereof to be driven into their second positions so that the lamp C2 is illuminated. Also the hundred finish relay R380 recompletes, at the contacts 385, the previously traced circuit for reoperating the prepare relay R330. The level finish relay R370 effected advancement of the wipers of the ten switch 510 from their tenth positions back into their first positions so as again to illuminate the lamp X1; and the eleventh count relay R670 effected operation of the wipers of the unit switch 610 from their tenth positions back into their first positions so as to effect illumination of the lamp U1.

At this time the lamps M1, C2, X1 and U1 are illuminated to indicate that the next subscriber line in the central office 10 that is to be tested has the directory number provided with the numerical portion 1211. The circuit 200 then operates in the manner previously explained, to transmit the digits 1, 2, 1 and 1, over the conductors 871 and 872, so as to reset the test distributor switch 900 to select trunk 12 accessible thereto and then to set the test connector switch, not shown, terminated by trunk 12 to select line 11, accessible thereto. The testing of the subscriber lines in the central office having the directory numbers, the numerical portions of which are 1211 to 1200, inclusive, is the same as that previously described effecting reoperation of the level finish relay R370 and the hundred finish relay R380, so that the hundred switch 410 is advanced into its third position and the ten switch 510 and the unit switch 610 are advanced back into their first positions. At this time the circuit 200 operates to effect the release of the test distributor switch 900 and the selected test connector switch and is normally operative to transmit the digits 1, 3, 1 and 1 so that the subscriber lines in the third hundred group in the first thousand group may be tested; however it has been assumed that the last mentioned hundred group of subscriber lines is vacant in the first thousand group of subscriber lines in the central office 10. Accordingly at the conclusion of the second digit 3, the wiper carriage of the Strowger mechanism 1010 in the test distributor switch 900 selects the vacant trunk 13 terminating no test connector switch. In this case the application of ground to the E. C. wiper 1014 effects operation of the supervisory relay R920 and the consequent operation of the supervisory relay R820; whereby the latter relay completes, at the contacts 827, a path for applying ground to the conductor 876 in the access cable 870 so as to complete a circuit, including the contacts 235 and the conductor 496 for operating the supervisory relay R460 in the circuit 200. Upon operating the supervisory relay R460 completes, at the contacts 463, a test connection, including the contacts 656′, 665 and 676 for applying battery via the conductor 609, the winding of the vacant relay R470, the conductor 497, the contacts 361, the conductor 334, the contacts 268 and 236 to the conductor 871 in the access cable 870. Also at this time the booster battery 1090 is connected via the test wiper 1011 and the contacts 1071 and 811 to the conductor 871 in the access cable 870; whereby the winding of the vacant relay R470 is energized with a potential corresponding to exchange battery plus booster battery, a voltage of approximately 93 volts, causing the latter relay to operate since it is of the marginal type. In passing, it will be observed that the vacant relay R470 being of the marginal type will not operate upon exchange battery and must encounter the booster battery potential of the booster battery 1090 to be operated. Upon operating the vacant relay R470 completes, at the contacts 471, a circuit for reoperating the hundred finish relay R380 so as to advance the wipers noted of the hundred switch 410 into their fourth positions and otherwise to recycle the circuit 200 in the manner previously explained.

Accordingly the circuit 200 then proceeds to set up and test the subscriber lines in the central office 10 in the fourth hundred group in the first thousand group. Ultimately the subscriber line having the directory number, the numerical portion of which is: 1000, is tested by the circuit 200 so that the level finish relay R370 and the hundred finish relay R380 are reoperated. In this case the hundred finish relay R380 completes, at the contacts 381, the circuit for operating the thousand finish relay R390 by virtue of the circumstance that the wipers noted of the hundred switch 410 stand in their tenth positions. The circuit for operating the thousand finish relay R390 includes the conductor 401, the wiper 413 of the hundred switch 410 and the engaged tenth contact in the associated contact bank, as well as the grounded conductor 472. Upon operating the thousand finish relay R390 completes, at the contacts 392, a circuit, including the conductor 302, the contacts 386, the conductor 338′, the contacts 423 and the grounded conductor 336 for operating the rotary magnet M314 of the thousand switch 310. Subsequently when the hundred finish relay R380 restores the circuit for retaining operated the thousand finish relay R390 is interrupted causing the latter relay to restore, whereby the rotary magnet M314 is deenergized so as to drive the wipers noted of the thousand switch 310 into their second positions. At this time the circuit 200 is normally operative to transmit the digits 2, 1, 1 and 1, but it has been assumed that the second thousand group of subscriber lines in the central office 10 is vacant; whereby the ground strap has been provided at the contacts 222 of the operated office mark relay R220 so that when the wiper 311 of the thousand switch 310 engages the second contact in the associated contact bank, it encounters the grounded second mark conductor in the marking cable 206 so that the rotary magnet M314 is operated and restored driving the wipers noted of the thousand switch 310 into their third positions. Accordingly at this time the lamps M3, C1, X1 and U1 are illuminated; and the circuit 200 operates to transmit the corresponding digits 3, 1, 1 and 1 in order that the subscriber lines in the first hundred group in the third thousand group may be tested in the manner previously explained.

The circuit 200 proceeds with the testing of the subscriber lines, the directory numbers of which include the numerical portions: 3111 to 9000, inclusive, it having been assumed that the ninth thousand group of subscriber lines is the last equipped group in the central office 10. At this time when the thousand finish relay R390 operates, it completes, at the contacts 393, a circuit for operating the routine finish relay R420. This circuit includes the contacts 393, the conductor 339, the contacts 221′, the conductor 272 connected to the ninth marking conductor in the marking cable 207, the wiper 313 and the engaged ninth contact in the associated contact bank of the thousand switch 310, the conductor 404 and the contacts 436. Upon operating the routine finish relay R420 completes, at the contacts 422, a holding circuit, including the grounded conductor 336, for energizing the winding thereof; and completes, at the contacts 421, a circuit for illuminating the routine finish lamp L417 so as to indicate the circumstance noted to the operator at the test board 30. Also upon operating the routine finish lamp R420 interrupts, at the contacts 423, the circuits for retaining operated the prepare relays R430 and R330 as well as the control relay R260. At this time all of the relays in the circuit 200 are restored except the office select relay R230 and the office mark relay R220 that are held operated directly by the operated office select key K205. Upon restoring the control relay R260 completes, at the contacts 262 and 264, paths for applying ground to the conductors 303 and 274, whereby the rotary magnet M215 is operated buzzer-fashion in order to drive the wipers noted of the control switch 210 back into their home position. Upon restoring the prepare relay R430 completes, at the contacts 435, a path for applying ground to the set of switch springs S316 so as to effect operation of the rotary magnet M314 buzzer-fashion in order to drive the wipers noted of the thousand switch 310 back into their home positions; whereupon the set of switch springs S315 is operated to interrupt the circuit mentioned. Also upon restoring the prepare relay R430 completes, at the contacts 431, a path for applying ground to the set of switch springs S416 so as to effect operation of the rotary magnet M414 buzzer-fashion in order to drive the wipers noted of the hundred switch 410 back into their home positions; whereupon the set of switch springs S416 is operated to interrupt the circuit mentioned. Also upon restoring the prepare relay R430 completes, at the contacts 433, a path for applying ground to the set of switch springs S517 so as to effect operation of the rotary magnet M515 buzzer-fashion in order to drive the wipers noted of the ten switch 510 back into their home positions; whereupon the set of switch springs S517 is operated to interrupt the circuit mentioned. Further the prepare relay R430 completes, at the contacts 437, a path for applying ground to the set of switch springs S617 so as to effect operation of the rotary magnet M615 buzzer-fashion in order to drive the wipers noted of the unit switch 610 back into their home positions; whereupon the set of switch springs 617 is operated to interrupt the circuit mentioned.

In order completely to release the circuit 200, the operator at the test board 30 restores the operated office select key K205 so as to remove ground from the conductor 271 effecting the restoration of the office select relay R230, the office mark relay R220 and the routine finish relay R420. Upon restoring the routine finish relay R420 interrupts, at the contacts 421, the circuit for illuminating the routine finish lamp L417. Upon restoring the office select relay R230 interrupts, at the contacts 231, etc., the connections to the conductors 874, etc., in the access cable 870. Upon restoring the office mark relay R220 interrupts, at the contacts 222, etc., the ground connections to the marking conductors in the marking cable 206. At this time the automatic line testing circuit 200 is completely released and available for further use.

At any time during operation of the circuit 200 in carrying out its routine test functions, either in the central office 10 or in the exchange 20, the operator at the test board 30 may arrest operation and release thereof by merely restoring the operated one of the select keys K205 or K204 so as to interrupt the application of ground to the corresponding conductor 271 or 270 so as to effect the restoration of the office select relay R230 and the office mark relay R220 or restoration of the exchange select relay R250 and the exchange mark relay R240 and the consequent removal of ground from the conductor 336 so as to bring about the restoration of the prepare relays R330 and R430 in the manner described above. Incident to the restoration of the prepare relay R330 the holding circuit for retaining operated the hold relay R340, is interrupted, whereby the latter relay restores shortly thereafter, it being of the slow-to-release type. During the transition time between the restoration of the prepare relay R330 and the restoration of the hold relay R340 ground is applied to the conductor 875 in the access cable 870 or to the conductor 885 in the access cable 880 so as to bring about the complete release of the connected test switch train. Also in passing, it is noted that the office select relay R230 or the operated exchange select relay R250 is retained in its operated position until the hold relay R340 restores, interrupting at the contacts 341, the particular holding circuit for the office select relay R230 or the exchange select relay R250 that is completed at this time.

Section 10.—*Special operations of the automatic line testing circuit 200*

Reconsidering the operation of the automatic line testing circuit 200, it is now assumed that incident to the operation thereof to set up a test connection therefrom to the subscriber line 1150 in the central office 10 that the test distributor switch 900 encounters a busy condition on trunk 11 accessible thereto and extending to the test connector switch 1100 at the conclusion of the second digit 1 that was transmitted from the circuit 200. In this case the supervisory relay R920 in the test distributor switch 900 is operated effecting operation of the supervisory relay R820 in the test distributor circuit 800 and the consequent application of ground upon the conductor 876 in the access cable 870, so as to complete the previously traced circuit for operating the supervisory relay R466. Upon operating the supervisory relay R460 prepares, at the contacts 466, a circuit for operating the camp relay R440; which circuit is completed when the control switch 210 is operated into its sixth position at the conclusion of the present cycle of operation of count relays R580, etc. Specifically when the wiper 212 of the control switch 210 engages the sixth contact in the associated contact bank, the circuit for operating the camp relay R440 is completed and includes the contacts 261, the conductor 275, the conductor 405 and the contacts 466. Upon operating the camp relay R440 interrupts, at the contacts 444, the circuit for sustaining operation of the pulse relay R560 so as to arrest further operation of the count relays R580, etc., at this time. Also the camp relay R440 completes, at the contacts 445, an additional path, including the contacts 481, for applying ground potential to the hold conductor 686 so as to insure that the first count relay R580 is retained in its operated position at this time. When pulsing operation of the pulse relay R560 is arrested, the start relay R350 restores shortly thereafter effecting the restoration of the switch relay R360 after an additional small time interval; at this time cperation of the circuit 200 is arrested and the circuit 200 is camping upon the test connection extending to the busy connector switch 1100.

When the test connector switch 1100 becomes idle the supervisory relay R920 in the test distributor switch 900 is restored effecting the restoration of the supervisory relay R820 in the test distributor trunk circuit 800 and the consequent removal of ground from the conductor 876 in the access cable 870 so as to bring about the restoration of the supervisory relay R460. Upon restoring the supervisory relay R460 interrupts, at the contacts 446, the circuit for retaining operated the camp relay R440, whereby the latter relay restores shortly thereafter. In the transition time between the restoration of the supervisory relay R460 and the restoration of the camp relay R440, a circuit, including the contacts 462 and 443 and the conductor 698 is completed for reoperating the start relay R350 so as to effect reoperation of the switch relay R360. Also the camp relay R440 recompletes, at the contacts 444, the circuit for causing operation of the pulse relay R560 to be resumed so as further to operate the count relays R580, etc., in their present cycle. At this time the circuit 200 continues its sending function transmitting the third digit 1 and the fourth digit 1 so as to operate the test connector switch 1100 to select the subscriber line 1150 in the manner described in Section 9.

During the time that the circuit 200 was camping upon the test distributor switch 900, in the manner explained above, the operated supervisory relay R460 completed, at the contacts 467, a circuit, including the contacts 483 and the grounded hold conductor 686 for illuminating the test connector switch busy lamp L418 so as to indicate to the operator at the test board 30 that the circuit 200 is camping upon a busy test connector switch.

When the operator at the test board 30 observes the illuminated test connector switch busy lamp L418 she may desire to restore operation of the circuit 200; which may be accomplished by momentary operation of the test start key K201, causing ground to be forwarded via the conductor 407, the contacts 442 and 461 and the conductor 406 to the hundred finish relay R380 effecting operation of the latter relay. The hundred finish relay R380 upon operating recycles the circuit 200 effecting movement of the hundred switch 410 into its second position, all in the manner described in Section 9 so that the test distributor switch 900 is released. The circuit 200 then operates to send the digits 1211 in the manner explained in Section 9.

Again reconsidering the operation of the circuit 200, it is now assumed that incident to the operation thereof to set up a test connection therefrom to the subscriber line 1150 in the central office 10 the test connector switch 1100 encounters a busy condition of the subscriber line 1150 at the conclusion of the fourth digit 1 that was transmitted from the circuit 200. In this case the supervisory relays R920, R820 and R460 are operated in the manner explained immediately above. However upon operating the supervisory relay R460 does not effect operation of the camp relay R440 since the wiper 212 of the control switch 210 has previously passed the sixth contact in the associated contact bank. Accordingly the count relays R580, etc. continue to operate sequentially; however there can be no testing over the test conductors 681 and 682 since the operated supervisory relay R460 interrupts, at the contacts 464 and 465, the normal connections between the test conductors 681 and 682 and the conductors 871 and 872 in the access cable 870. Of course at the conclusion of the present cycle of operation of the count relays R580, etc., the unit switch 610 is operated into its second position and the wiper carriage of the Strowger mechanism 1110 in the test connector switch 1100 is operated an additional step in the rotary direction to select line 12 accessible thereto, all in a manner explained in Section 9. The testing of line 12, etc., accessible to the test conductor switch 1100 by the circuit 200 is otherwise the same as previously described.

Further reconsidering the operation of the circuit 200 in conjunction with the routine testing of the hundred group of subscriber lines in the central office 10 that is accessible to the test connector switch 1100, it is again noted that line 99 comprises a test line providing the 10,000 ohms bridge between the + and − terminals of this contact set accessible to the + and − line wipers 1111 and 1112 carried by the wiper carriage of the Strowger mechanism 1110 in the test connector switch 1100. Also at this time the ten switch 510 occupies its ninth position and the unit switch 610 occupies its ninth position, whereby a chain circuit is completed for operating the test line relay R540 when the seventh count relay R640 is operated in the present cycle of operation of the count relays R580, etc. This chain circuit extends from ground via the contacts 434, the conductor 504, the wiper 514 of the ten switch 510 and the engaged ninth contact in the associated contact bank, the conductor 507, the wiper 613 of the unit switch 610 and the engaged ninth contact in the associated contact bank, the contact 641'', the conductor 687, the contacts 468, and the winding of the test line relay R540 to battery. Accordingly the test line relay R540 operates completing, at the contacts 544, a circuit, including the grounded hold conductor 686, for operating the control relay R530. During the operation of the prime or seventh count relay R640 in the present cycle of operation of the count relays R580, etc., the line test relay R520 is operated and saturated; and when the loop or eighth count relay R645 is operated, the prime relay R640 is restored and the loop fault test circuit, including the winding of the line test relay R520, is completed to the test conductors 681 and 682 due to the operated position of the loop relay R645, whereby the line test relay R520 should be retained in its operated position by the 10,000 ohms resistor 1191 that is connected across the wipers 1111 and 1112 of the wiper set in the Strowger mechanism 1110 in the test connector switch 1100, this 10,000 ohm resistor 1191 being included in series relation with the two 10,000 ohm segments of the resistance selector S605 in the manner explained in Section 9.

First assuming that the line test relay R520 is retained in its operated position by the artificial 10,000 ohm fault 1191 when the prime or seventh count relay R640 restores incident to the operation of the loop or eight count relay R645, there is interrupted, at the contacts 641'' the circuit for maintaining operated the test line relay R540 causing the latter relay to restore shortly thereafter. Upon restoring the test line relay R540 interrupts, at the contacts 544 the circuit for retaining operated the control relay R530 so as to cause the latter relay to restore shortly thereafter, it being of the slow-to-release type. In the transition time between the restoration of the test line relay R540 and the control relay R530 the grounded hold conductor 686 is connected via the contacts 543 and 531, the conductor 685, the contacts 649', the conductor 689, the contact 366, the conductor 509, the resistor 518 and the contacts 551 to the winding of the pulse relay R560 so as to effect reoperation thereof. In passing, it is noted that the normal circuit for operating the pulse relay R560 at this time was interrupted, at the contacts 521, incident to operation of the line test relay R520. Accordingly at this time the count relays R580, etc. continue to operate, whereby the unit switch 610 is driven into its tenth position, bringing about the next testing of line 90, appearing before the test connector switch 1100. in the manner explained in Section 9.

Now assuming that the line test relay R520 fails to be held in its operated position by the artificial 10,000 ohm fault 1191, upon restoring the line test relay R520 completes, at the contacts 521, a holding circuit, including the grounded hold conductor 686, the contacts 482 and 542 for retaining operated the test line relay R540 so as to retain operated the control relay R530. The operated test line relay R540 retains interrupted, at the contacts 541, the previously traced circuit for reoperating the pulse relay R560, whereby further operation of the latter relay is arrested so that the start relay R350 restores shortly thereafter effecting the restoration of the switch relay R360. Upon restoring the switch relay R360 completes, at the contacts 364, the previously traced circuit for illuminating the loop fault lamp L603 since the loop or eighth count relay R645 occupies its operated position at this time. The illumination of the loop fault lamp L603, when the lamps M1, C1, X9 and U9 are illuminated indicates to the operator at the test board 30 that the line test relay R520 has failed to be retained in its operated position as it should have been upon the artificial 10,000 ohm fault 1191 comprising the test line 99 accessible to the test connector switch 1100.

Thus it will be understood that the arrangement described immediately above constitutes facility for testing the operativeness or competence of the line test relay R520 to perform line testing functions on the lines other than the test line 99. Restating the matter, the illumination of the loop fault lamp L603 when other than the lamps X9 and U9 are conjointly illuminated indicates the presence of a loop fault upon the line that is being tested; whereas the illumination of the loop fault lamp L603 when the lamps X9 and U9 are conjointly illuminated indicates a fault in the line test relay R520 incorporated in the automatic line testing circuit 200.

Section 11.—*Conclusion*

In view of the foregoing it is apparent that there has been provided an improved manual line testing and automatic line testing or routining arrangement that is selectively controllable to bring about the testing of any subscriber line either in the central office or in the associated exchange in a simple and efficient manner and requiring a minimum number of operations on the part of the operator at the test board in the central office.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a group of subscriber lines having individual multi-digit numbers assigned thereto, a test switch having access to said group of subscriber lines, an operator position, means controllable from said operator position for connecting said test switch to said operator position, additional means controllable from said operator position for transmitting the digits of any given multi-digit number to said connected test switch in order to operate it to select said given subscriber line in said group, additional means controllable from said operator position for performing any one of a given series of predetermined fault tests upon a subscriber line selected by said connected test switch, automatic routine apparatus, and further means controllable from said operator position for connecting said test switch to said apparatus; said apparatus comprising a register, means controlled by the connection of said test switch to said apparatus for automatically registering in said register a first predetermined multi-digit number, a sender operative to send to said connected test switch the digits of said first predetermined number registered in said register in order to operate it to select a corresponding first predetermined subscriber line in said group, additional means controllable from said operator position for operating said sender, a tester operative through a cycle to perform said given series of said predetermined fault tests upon a subscriber line selected by said connected test switch, means controlled by the operation of said connected test switch to select said first predetermined subscriber line in said group for initiating operation of said tester, means governed by the completion of a cycle of operation of said tester for arresting operation of said tester and for registering a second predetermined multi-digit number in said register and for reoperating said connected test switch to select a corresponding second predetermined subscriber line in said group, means controlled by the reoperation of said connected test switch to select said second predetermined subscriber line in said group for initiating reoperation of said tester, means for indicating to said operator position the particular digits of any multi-digit number registered in said register, means governed by said tester finding a fault on a subscriber line selected by said connected test switch for arresting operation of said tester in its cycle, and means governed by the arrest position of said tester in its cycle for indicating to said operator position the particular fault found by said tester.

2. In a telephone system, a group of subscriber lines having individual multi-digit numbers assigned thereto, a test switch having access to said group of subscriber lines, an operator position, means controllable from said operator position for connecting said test switch to said operator position, additional means controllable from said operator position for transmitting the digits of any given multi-digit number to said connected test switch in order to operate it to select said given subscriber line in said group, additional means controllable from said operator position for performing any one of a given series of predetermined fault tests upon a subscriber line selected by said connected test switch, automatic routine apparatus, and further means controllable from said operator position for connecting said test switch to said apparatus; said apparatus comprising a register, means controlled by the connection of said test switch to said apparatus for automatically registering in said register a first predetermined multi-digit number, a sender operative to send to said connected test switch the digits of said first predetermined number registered in said register in order to operate it to select a corresponding first predetermined subscriber line in said group, additional means controllable from said operator position for operating said sender, a tester operative through a cycle to perform said given series of said predetermined fault tests upon a subscriber line selected by said connected test switch, means controlled by the operation of said connected test switch to select said first predetermined subscriber line in said group for initiating operation of said tester, means governed by the completion of a cycle of operation of said tester for arresting operation of said tester and for registering a second predetermined multi-digit number in said register and for reoperating said connected test switch to select a corresponding second predetermined subscriber line in said group, means controlled by the reoperation of said connected test switch to select said second predetermined subscriber line in said group for initiating reoperation of said tester, means for indicating to said operator position the particular digits of any multi-digit number registered in said register, means governed by said tester finding a fault on a subscriber line selected by said connected test switch for arresting operation of said tester in its cycle, means governed by the arrested position of said tester in its cycle for indicating to said operator position the particular fault found by said tester, and further means controllable from said operator position for initiating further operation of said tester in its cycle from its arrest position therein.

3. In a telephone system, a central office including an operator position and a first group of subscriber lines having individual multi-digit numbers assigned thereto and an associated first test switch having access to the subscriber lines in said first group, an exchange including a second group of subscriber lines having individual multi-digit numbers assigned thereto and an associated second test switch having access to the subscriber lines in said second group, means controllable from said operator position for connecting either one of said test switches to said operator position, additional means controllable from said operator position for transmitting the digits of any given multi-digit number to said connected test switch in order to operate it to select said given subscriber line in the associated group, additional means controllable from said operator position for performing any one of a given series of predetermined fault tests upon a subscriber line selected by said connected switch, automatic routine apparatus in said central office, further means controllable from said operator position for connecting either one of said test switches to said apparatus, means controlled by the connection of one of said test switches to said apparatus for preventing the connection of the other of said test switches to said apparatus, and means for indicating to said operator position the particular one of said test switches that is connected to said apparatus; said apparatus comprising a register, means controlled by the connection of said one test switch to said apparatus for automatically registering in said register a first predetermined multi-digit number, a sender operative to send to said connected one test switch the digits of said first predetermined number registered in said register in order to operate it to select a corresponding first predetermined subscriber line in the associated group, additional means controllable from said operator position for operating said sender, a tester operative through a cycle to perform said given series of said predetermined fault tests upon a subscriber line selected by said connected one test switch, means controlled by the operation of said connected one test switch to select said first predetermined subscriber line in the associated group for initiating operation of said tester, means governed by the completion of a cycle of operation of said tester for arresting operation of said tester and for registering a second predetermined multi-digit number in said register and for reoperating said connected one test switch to select the corresponding second predetermined subscriber line in the associated group, means controlled by the reoperation of said connected one test switch to select said second predetermined subscriber line in the associated group for initiating reoperation of said tester, means for indicating to said operator position the particular digits of any multi-digit number registered in said register, means governed by said tester finding a fault on a subscriber line selected by said connected one test switch for arresting operation of said tester in its cycle, and means governed by the arrested position of said tester in its cycle for indicating to said operator position the particular fault found by said tester.

4. In a telephone system, a plurality of offices each including a group of subscriber lines having individual multi-digit numbers assigned thereto and an associated test switch having access to the subscriber lines in said group, automatic routine apparatus common to said offices, means for connecting any one of said test switches to said apparatus, means controlled by the connection of one of said test switches to said apparatus for preventing the connection of any other of said test switches to said apparatus; and means for indicating the particular one of said test switches that is connected to said apparatus, said apparatus comprising a register, means controlled by the connection of said one test switch to said apparatus for automatically registering in said register a first predetermined multi-digit number, a sender operative to send to said connected one test switch the digits of said first predetermined number registered in said register in order to operate it to select the corresponding first predetermined subscriber line in the associated group, means for operating said sender, a tester operative through a cycle to perform a given series of predetermined fault tests upon a subscriber line selected by said connected one test switch, means controlled by the operation of said connected one test switch to select said first predetermined subscriber line in the associated group for initiating operation of said tester, means controlled by the operation of said tester through its cycle for arresting operation of said tester and for registering a second predetermined multi-digit number in said register and for reoperating said connected one test switch to select the corresponding second predetermined subscriber line in the associated group, means controlled by the reoperation of said connected one test switch to select said second predetermined subscriber line in the associated group for initiating reoperation of said tester, means for identifying the particular digits of any multi-digit number registered in said register, and means controlled by said tester in response to the finding of a predetermined fault upon a subscriber line selected by said connected one test switch for arresting operation of said tester in its cycle and for identifying said predetermined fault.

5. In a telephone system, a first office including an operator position and a first group of subscriber lines having individual multi-digit numbers assigned thereto and an associated first test switch having access to the subscriber lines in said first group, a second office including a second group of subscriber lines having individual multi-digit numbers assigned thereto and an associated second test switch having access to the subscriber lines in said second group, automatic routine apparatus in said first office, means controllable from said operator position for connecting either one of said test switches to said apparatus, means controlled by the connection of one of said test switches to said apparatus for preventing the connection of the other of said test switches to said apparatus, and means for indicating to said operator position the particular one of said test switches that is connected to said apparatus; said apparatus comprising a register, means controlled by the connection of said one test switch to said apparatus for automatically registering in said register a first predetermined multi-digit number, a sender operative to send to said connected one test switch the digits of said first predetermined number registered in said register in order to operate it to select the corresponding first predetermined subscriber line in the associated group, means controllable from said operator position for operating said sender, a tester operative through a cycle to perform a given series of predetermined fault tests upon a subscriber line selected by said connected one test switch, means controlled by the operation of said connected one test switch to select said first predetermined subscriber line in the associated group for initiating operation of said tester, means controlled by the operation of said tester through its cycle for arresting operation of said tester and for registering a second predetermined multi-digit number in said register and for reoperating said connected one test switch to select the corresponding second predetermined subscriber line in the associated group, means controlled by the reoperation of said connected one test switch to select said second predetermined subscriber line in the associated group for initiating reoperation of said tester, means for indicating to said operator position the particular digits of any multi-digit number registered in said register, and means controlled by said tester in response to the finding of a predetermined fault upon a subscriber line selected by said connected one test switch for arresting operation of said tester in its cycle and for indicating to said operator position said predetermined fault.

6. In a telephone system, a first office including an operator position and a first group of subscriber lines having individual multi-digit numbers assigned thereto and an associated first test switch having access to the subscriber lines in said first group, a second office including a second group of subscriber lines having individual multi-digit numbers assigned thereto and an associated second test switch having access to the subscriber lines in said second group, automatic routine apparatus in said first office, means controllable from said operator position for connecting either one of said test switches to said apparatus, means controlled by the connection of one of said test switches to said apparatus for preventing the connection of the other of said test switches to said apparatus, and means for indicating to said operator position the particular one of said test switches that is connected to said apparatus; said apparatus comprising a register, means controlled by the connection of said one test switch to said apparatus for automatically registering in said register a first predetermined multi-digit number, a sender operative to send to said connected one test switch the digits of said first predetermined number registered in said register in order to operate it to select the corresponding first predetermined subscriber line in the associated group, means controllable from said operator position for operating said sender, a tester operative through a cycle to perform a given series of predetermined fault tests upon a subscriber line selected by said connected one test switch, means controlled by the operation of said connected one test switch to select said first predetermined subscriber line in the associated group for initiating operation of said tester, means controlled by the operation of said tester through its cycle for arresting operation of said tester and for registering a second predetermined multi-digit number in said register and for reoperating said connected one test switch to select the corresponding second predetermined subscriber line in the associated group, means controlled by the reoperation of said connected one test switch to select said second predetermined subscriber line in the associated group for initiating reoperation of said tester, means for indicating to said operator position the particular digits of any multi-digit number registered in said register, means controlled by said tester in response to the finding of a predetermined fault upon a subscriber line selected by said connected one test switch for arresting operation of said tester in its cycle and for indicating to said operator position said predetermined fault, and additional means controllable from said operator position for again initiating operation of said tester in its cycle from its arrested position therein.

7. In a telephone system, a first office including an operator position and a first group of subscriber lines having individual multi-digit numbers assigned thereto and an associated first test switch having access to the subscriber lines in said first group, a second office including a second group of subscriber lines having individual multi-digit numbers assigned thereto and an associated second test switch having access to the subscriber lines in said second group, automatic routine apparatus in said first office, means controllable from said operator position for connecting either one of said test switches to said apparatus, means controlled by the connection of one of said test switches to said apparatus for preventing the connection of the other of said test switches to said apparatus, and means for indicating to said operator position the particular one of said test switches that is connected to said apparatus; said apparatus comprising a register, means controlled by the connection of said one test switch to said apparatus for automatically registering in said register a first predetermined multi-digit number, a sender operative to send to said connected one test switch the digits of said first predetermined number registered in said register in order to operate it to select the corresponding first predetermined subscriber line in the associated group, means controllable from said operator position for operating said sender, a tester operative through a cycle to perform a given series of predetermined fault tests upon a subscriber line selected by said connected one test switch, means controlled by the operation of said connected one test switch to select said first predetermined subscriber line in the associated group for initiating operation of said tester, means controlled by the operation of said tester through its cycle for arresting operation of said tester and for registering a second predetermined multi-digit number in said register and for reoperating said connected one test switch to select the corresponding second predetermined subscriber line in the associated group, means controlled by the reoperation of said connected one test switch to select said second predetermined subscriber line in the associated group for initiating reoperation of said tester, means for indicating to said operator position the particular digits of any multi-digit number registered in said register, means controlled by said tester in response to the finding of a predetermined fault upon a subscriber line selected by said connected one test switch for arresting operation of said tester in its cycle and for indicating to said operator position said predetermined fault, and additional means controlled jointly by operation of said connected one test switch to select the last subscriber line in the associated group and by operation of said tester through its cycle for arresting operation of said tester and for transmitting a routine finished signal to said operator position.

8. In a telephone system, a plurality of subscriber lines having individual multi-digit numbers assigned thereto, a test switch having access to said subscriber lines, a register, means for connecting said test switch to said register, means controlled by the connection of said test switch to said register for automatically registering in said register a first number assigned to a first of said subscriber lines, manually operable means for selectively registering in said register a second number assigned to a second of said subscriber lines, a sender operative to send to said test switch the digits of a number registered in said register, manually operable means for initiating operation of said sender, means included in said test switch and controlled by the digits of a particular number sent thereto for operating said test switch to select said particular subscriber line, a tester operative through a cycle to perform a given series of predetermined fault tests upon a subscriber line selected by said test switch, means controlled by the operation of said test switch to select said particular subscriber line for initiating operation of said tester, means for indicating the digits of a number registered in said register, means controlled by said tester finding a fault on a subscriber line selected by said test switch for arresting operation of said tester in its cycle, and means controlled by the arrested position of said tester in its cycle for indicating the particular fault found by said tester.

9. In a telephone system, a plurality of subscriber lines divided into thousand groups each divided into hundred groups each divided into ten groups each divided into unit positions, each of said subscriber lines being assigned an individual four-digit number the respective digits of which identify the respective thousand group and hundred group and ten group and unit position thereof, a test switch having access to said subscriber lines, a register, means for connecting said test switch to said register, means controlled by the connection of said test switch to said register for automatically registering in said register the number 1111, first manually operable means for selectively changing the thousand digit of the number 1111 registered in said register, second manually operable means for selectively changing the hundred digit of the number 1111 registered in said register, a sender operative to send to said test switch the four digits of a number registered in said register, manually operable means for initiating operation of said sender, means included in said test switch and controlled by the four digits of a particular number sent thereto for operating said test switch to select said particular subscriber line, a tester operative through a cycle to perform a given series of predetermined fault tests upon a subscriber line selected by said test switch, means controlled by the operation of said test switch to select said particular subscriber line for initiating operation of said tester, means for indicating the four digits of a number registered in said register, means controlled by said tester finding a fault on a subscriber line selected by said test switch for arresting operation of said tester in its cycle, and means controlled by the arrested position of said tester in its cycle for indicating the particular fault found by said tester.

10. In a telephone system, a plurality of subscriber lines having individual multi-digit numbers assigned thereto, a test switch having access to said subscriber lines, a register, means for connecting said test switch to said register, means controlled by the connection of said test switch to said register for automatically registering in said register a first number assigned to a first of said subscriber lines, a controller operative through a cycle and governed by the number registered in said register for operating said test switch to select the particular one of said subscriber lines to which said number is assigned, a tester operative through a cycle to perform a given series of predetermined tests upon a subscriber line selected by said test switch, means for initiating the first cycle of operation of said controller, means governed by the completion of a cycle of operation of said controller for initiating a cycle of operation of said tester, means governed jointly by the number registered in said register and by the completion of a cycle of operation of said tester for registering in said register the next adjacent number assigned to another of said subscriber lines and for initiating another cycle of operation of said controller, means for indicating the digits of a number registered in said register, means controlled by said tester finding a fault on a subscriber line selected by said test switch for arresting operation of said tester in its cycle, and means controlled by the arrested position of said tester in its cycle for indicating the particular fault found by said tester.

11. In a telephone system, a plurality of subscriber lines having individual multi-digit numbers assigned thereto, a test switch having access to said subscriber lines, a register, means for connecting said test switch to said register, means controlled by the connection of said test switch to said register for automatically registering in said register a first number assigned to a first of said subscriber lines, manually operable means for selectively registering in said register a different number assigned to a different one of said subscriber lines, a controller operative through a cycle and governed by the number registered in said register for operating said test switch to select the particular one of said subscriber lines to which said number is assigned, a tester operative through a cycle to perform a given series of predetermined tests upon a subscriber line selected by said test switch, means for initiating the first cycle of operation of said controller, means governed by the completion of a cycle of operation of said controller for initiating a cycle of operation of said tester, means governed jointly by the number registered in said register and by the completion of a cycle of operation of said tester for registering in said register the next adjacent number assigned to another of said subscriber lines and for initiating another cycle of operation of said controller, means for indicating the digits of a number registered in said register, means controlled by said tester finding a fault on a subscriber line selected by said test switch for arresting operation of said tester in its cycle, and means controlled by the arrested position of said tester in its cycle for indicating the particular fault found by said tester.

12. In a telephone system, a plurality of subscriber lines having individual multi-digit numbers assigned thereto, a test switch having access to said subscriber lines, a register, means for connecting said test switch to said register, means controlled by the connection of said test switch to said register for automatically registering in said register a first number assigned to a first of said subscriber lines, a controller operative through a cycle and governed by the number registered in said register for operating said test switch to select the particular one of said subscriber lines to which said number is assigned, a tester operative through a cycle to perform a given series of predetermined tests upon a subscriber line selected by said test switch, means for initiating the first cycle of operation of said controller, means governed by the completion of a cycle of operation of said controller for initiating a cycle of operation of said tester, means governed jointly by the number registered in said register and by the completion of a cycle of operation of said tester for registering in said register the next adjacent number assigned to another of said subscriber lines and for initiating another cycle of operation of said controller, means for indicating the digits of a number registered in said register, means controlled by said tester finding a fault on a subscriber line selected by said test switch for arresting operation of said tester in its cycle, means controlled by the arrested position of said tester in its cycle for indicating the particular fault found by said tester, and additional means for initiating further operation of said tester in its cycle from its arrested position therein.

13. In a telephone system, a plurality of subscriber lines divided into thousand groups each divided into hundred groups each divided into ten groups each divided into unit positions, each of said subscriber lines being assigned an individual four-digit number the respective digits of which identify the respective thousand group and hundred group and ten group and unit position thereof, a test switch having access to said subscriber lines, a register, means for connecting said test switch to said register, means controlled by the connection of said test switch to said register for automatically registering in said register the number 1111, a controller operative through a cycle and governed by the number registered in said register for operating said test switch to select the particular one of said subscriber lines to which said number is assigned, a tester operative through a cycle to perform a given series of predetermined tests upon a subscriber line selected by said test switch, means for initiating the first cycle of operation of said controller, means governed by the completion of a cycle of operation of said controller for initiating a cycle of operation of said tester, means governed jointly by the number registered in said register and by the completion of a cycle of operation of said tester for registering in said register the next adjacent number assigned to another of said subscriber lines and for initiating another cycle of operation of said controller, additional means governed by the registration in said register of the number X111 including the thousand digit X assigned to a vacant thousand group of said subscriber lines for automatically registering in said register the number Y111, where Y is the digit following the digit X, means for indicating the four digits of a number registered in said register, means controlled by said tester finding a fault on a subscriber line selected by said test switch for arresting operation of said tester in its cycle, and means controlled by the arrested position of said tester in its cycle for indicating the particular fault found by said tester.

14. In a telephone system, a plurality of subscriber lines divided into thousand groups each divided into hundred groups each divided into ten groups each divided into unit positions, each of said subscriber lines being assigned an individual four-digit number the respective digits of which identify the respective thousand group and hundred group and ten group and unit position thereof, a test switch having access to said subscriber lines, a register, means for connecting said test switch to said register, means controlled by the connection of said test switch to said register for automatically registering in said register the number 1111, a controller operative through a cycle and governed by the number registered in said register for operating said test switch to select the particular one of said subscriber lines to which said number is assigned, a tester operative through a cycle to perform a given series of predetermined tests upon a subscriber line selected by said test switch, means for initiating the first cycle of operation of said controller, means governed by the completion of a cycle of operation of said controller for initiating a cycle of operation of said tester, means governed jointly by the number registered in said register and by the completion of a cycle of operation of said tester for registering in said register the next adjacent number assigned to another of said subscriber lines and for initiating another cycle of operation of said controller, additional means governed by the operation of said test switch in accordance with the number AX11 including the hundred digit X assigned to a vacant hundred group of said subscriber lines for automatically registering in said register the number AY11, where A is any digit and Y is the digit following the digit X, means for indicating the four digits of a number registered in said register, means controlled by said tester finding a fault on a subscriber line selected by said test switch for arresting operation of said tester in its cycle, and means controlled by the arrested position of said tester in its cycle for indicating the particular fault found by said tester.

15. In a telephone system, a plurality of subscriber lines having individual multi-digit numbers assigned thereto, a test switch having access to said subscriber lines, a register, means for registering in said register a first number assigned to a first of said subscriber lines, means controlled by said register for sending to said test switch the digits of said first number registered in said register, means included in said test switch and controlled by the digits of said first number for operating said test switch to select said first subscriber line, a tester operative through a cycle to perform a given series of predetermined fault tests upon a subscriber line selected by said test switch, means controlled by the operation of said test switch to select said first subscriber line for initiating operation of said tester, means controlled jointly by the registration in said register of said first number and by the operation of said tester through its cycle for registering in said register a second number assigned to a second of said subscriber lines and for sending to said test switch a step signal and for arresting operation of said tester, means included in said test switch and controlled by said step signal for reoperating said test switch to select said second subscriber line, means controlled by the operation of said test switch to select said second subscriber line for again initiating operation of said tester, means for indicating the digits of a number registered in said register, means controlled by said tester finding a fault on a subscriber line selected by said test switch for arresting operation of said tester in its cycle, and means controlled by the arrested position of said tester in its cycle for indicating the particular fault found by said tester.

16. In a telephone system, a plurality of subscriber lines divided into thousand groups each divided into hundred groups each divided into ten groups each divided into unit positions, each of said subscriber lines being assigned an individual four-digit number the respective digits of which identify the respective thousand group and hundred group and ten group and unit position thereof, a test switch having access to said subscriber lines, a register, means for registering in said register the number XY11, where X is any digit and Y is any digit, means controlled by said register for sending to said test switch the digits of the number XY11 registered in said register, means included in said test switch and controlled by the digits of the number XY11 for operating said test switch to select said subscriber line XY11, a tester operative through a cycle to perform a given series of predetermined fault tests upon a subscriber line selected by said test switch, means controlled by the operation of said test switch to select said subscriber line XY11 for initiating operation of said tester, means controlled jointly by the registration in said register of the number XY11 and by the operation of said tester through its cycle for registering in said register the number XY12 and for sending to said test switch a step signal and for arresting operation of said tester, means included in said test switch and controlled by said step signal for reoperating said test switch to select said subscriber line XY12, means controlled by the operation of said test switch to select said subscriber line XY12 for again initiating operation of said tester, means for indicating the four digits of a number registered in said register, means controlled by said tester finding a fault on a subscriber line selected by said test switch for arresting operation of said tester in its cycle, and means controlled by the arrested position of said tester in its cycle for indicating the particular fault found by said tester.

17. In a telephone system, a plurality of subscriber lines divided into thousand groups each divided into hundred groups each divided into ten groups each divided in unit positions, each of said subscriber lines being assigned an individual four-digit number the respective digits of which identify the respective thousand group and hundred group and ten group and unit position thereof, a group of test connector switches each having access to a given hundred group of said subscriber lines, a test distributor switch having access to said test connector switches, a trunk extending to said test distributor switch, a register, means for registering in said register the number XY11, where X is any digit and Y is any digit, means controlled by said register for sending over said trunk the digits of the number XY11 registered in said register, means included in said test distributor switch and controlled by the digits X and Y of the number XY11 sent over said trunk for operating said test distributor switch to select the corresponding one of said test connector switches, means included in said test distributor switch and controlled by the digits 1 and 1 of the number XY11 sent over said trunk for operating said one test connector switch to select the corresponding subscriber line XY11, a tester operative through a cycle to perform a given series of predetermined fault tests over said trunk upon a selected subscriber line, means controlled by the operation of said one test connector switch to select said subscriber line XY11 for initiating operation of said tester, means controlled jointly by the registration in said register of the number XY11 and by the operation of said tester through its cycle for registering in said register the number XY12 and for sending over said trunk a step signal and for arresting operation of said tester, means included in said test distributor switch and controlled by said step signal sent over said trunk for reoperating said one test connector switch to select said subscriber line XY12, means controlled by the reoperation of said one test connector switch to select said subscriber line XY12 for again initiating operation of said tester, means for indicating the four digits of a number registered in said register, means controlled by said tester finding a fault on a selected subscriber line for arresting operation of said tester in its cycle, and means controlled by the arrested position of said tester in its cycle for indicating the particular fault found by said tester.

18. The telephone system set forth in claim 17, wherein said trunk includes a pair of line conductors and a control conductor, said sending means sends the digits of a number over the line conductors of said trunk and sends said step signal over the control conductor of said trunk, and said tester tests a selected subscriber line over the line conductors of said trunk.

19. The telephone system set forth in claim 17, wherein said test distributor switch includes means controlled by the operation thereof to select said one test connector switch for testing the idle or busy condition of said one test connector switch and means controlled during the testing of said one test connector switch as being busy for returning a delay signal over said trunk, and said sending means includes means controlled during the return of said delay signal over said trunk for delaying the sending of the digits 1 and 1 of the number XY11 over said trunk.

20. The telephone systm set forth in claim 17, wherein said test distributor switch includes means controlled by the operation of said one test connector to select said subscriber line XY11 for testing the idle or busy condition of said subscriber line XY11 and means controlled by the testing of said subscriber line as busy for returning a busy signal over said trunk, and further including means jointly controlled by the registration in said register of the number XY11 and by said busy signal for registering in said register the number XY12 and for sending over said trunk said step signal and for preventing testing by said tester of said busy subscriber line XY11.

21. In a telephone system, a plurality of subscriber lines having individual multi-digit numbers assigned thereto, a test switch having access to said subscriber lines, a register, means for registering in said register a first number assigned to a first of said subscriber lines, a cyclic operative mechanism, means for initiating cyclic operation of said mechanism, means controlled by initial cyclic operation of said mechanism for sending to said test switch the digits of said first number registered in said register, means included in said test switch and controlled by the digits of said first number for operating said test switch to select said first subscriber line, means controlled by a subsequent cycle of operation of said mechanism for performing a given series of predetermined fault tests upon a subscriber line selected by said test switch, means controlled jointly by the registration in said register of said first number and by the operation of said mechanism through said subsequent cycle for registering in said register a second number assigned to a second of said subscriber lines and for sending to said test switch a step signal, means included in said test switch and controlled by said step signal for reoperating said test switch to select said second subscriber line, means for indicating the digits of a number registered in said register, means controlled by said testing means finding a fault on a subscriber line selected by said test switch for arresting cyclic operation of said mechanism, and means controlled by the arrested position of said mechanism for indicating the particular fault found by said testing means.

22. The telephone system set forth in claim 21, wherein said cyclic operative mechanism is in the form of a chain of count relays, the operation of each count relay in said chain effecting restoration of the preceding count relay in said chain and preparing operation of the succeeding count relay in said chain, and also including means for operating the count relays in said chain at a predetermined rate.

23. In a telephone system, a plurality of subscriber lines having individual multi-digit numbers assigned thereto, a test switch having access to said subscriber lines, a register, means for registering in said register a first number assigned to a first of said subscriber lines, means controlled by said register for sending to said test switch the digits of said first number registered in said register, means included in said test switch and controlled by the digits of said first number for operating said test switch to select said first subscriber line, a tester operative through a cycle to perform a given series of predetermined fault tests upon a subscriber line selected by said test switch, means controlled by the operation of said test switch to select said first subscriber line for initiating operation of said tester, means controlled jointly by the registration in said register of a predetermined number and by the operation of said tester through its cycle for registering in said register a second number assigned to a second of said subscriber lines and for sending to said test switch a partial release signal and for arresting the operation of said tester, means included in said test switch and controlled by said partial release signal for effecting a partial release of said test switch, additional means controlled by said register for sending to said test switch certain only of the digits of said second number registered in said register, means included in said test switch and controlled by the certain digits of said second number for reoperating said test switch to select said second subscriber line, means controlled by the reoperation of said test switch to select said second subscriber line for again initiating operation of said tester, means for indicating the digits of a number registered in said register, means controlled by said tester finding a fault on a subscriber line selected by said test switch for arresting operation of said tester in its cycle, and means controlled by the arrest position of said tester in its cycle for indicating the particular fault found by said tester.

24. In a telephone system, a plurality of subscriber lines divided into thousand groups each divided into hundred groups each divided into ten groups each divided into unit positions, each of said subscriber lines being assigned an individual four-digit number the respective digits of which identify the respective thousand group and hundred group and ten group and unit position thereof, a test switch having access to said subscriber lines, a register, means for registering in said register the number XY11, where X is any digit and Y is any digit, means controlled by said register for sending to said test switch the digits of the number XY11 registered in said register, means included in said test switch and controlled by the digits of the number XY11 for operating said test switch to select said subscriber line XY11, a tester operative through a cycle to perform a given series of predetermined fault tests upon a subscriber line selected by said test switch, means controlled by the operation of said test switch to select said subscriber line XY11 for initiating operation of said tester, means controlled jointly by the registration in said register of the number XY10 and by the operation of said tester through its cycle for registering in said register the number XY21 and for sending to said test switch a partial release signal and for arresting the operation of said tester, means included in said test switch and controlled by said partial release signal for effecting a partial release of said test switch, additional means controlled by said register for sending to said test switch the digits 2 and 1 of the number XY21 registered in said register, means included in said test switch and controlled by the digits 2 and 1 of the number XY21 for reoperating said test switch to select said subscriber line XY21, means controlled by the operation of said test switch to select said subscriber line XY21 for again initiating operation of said tester, means for indicating the four digits of a number registered in said register, means controlled by said tester finding a fault on a subscriber line selected by said test switch for arresting operation of said tester in its cycle, and means controlled by the arrested position of said tester in its cycle for indicating the particular fault found by said tester.

25. In a telephone system, a plurality of subscriber lines divided into thousand groups each divided into hundred groups each divided into ten groups each divided in unit positions, each of said subscriber lines being assigned an individual four-digit number the respective digits of which identify the respective thousand group and hundred group and ten group and unit position thereof, a group of test connector switches each having access to a given hundred group of said subscriber lines, a test distributor switch having access to said test connector switches, a trunk extending to said test distributor switch, a register, means for registering in said register the number XY11, where X is any digit and Y is any digit, means controlled by said register for sending over said trunk the digits of the number XY11 registered in said register, means included in said test distributor switch and controlled by the digits X and Y of the number XY11 sent over said trunk for operating said test distributor switch to select the corresponding one of said test connector switches, means included in said test distributor switch and controlled by the digits 1 and 1 of the number XY11 sent over said trunk for operating said one test connector switch to select the corresponding subscriber line XY11, a tester operative through a cycle to perform a given series of predetermined fault tests over said trunk upon a selected subscriber line, means controlled by the operation of said one test connector switch to select said subscriber line XY11 for initiating operation of said tester, means controled jointly by the registration in said register of the number XY10 and by the operation of said tester through its cycle for registering in said register the number XY21 and for sending over said trunk a partial release signal and for arresting operation of said tester, means included in said test distributor switch and controlled by said partial release signal sent over said trunk for effecting the release of said one test connector switch, additional means controlled by said register for sending over said trunk the digits 2 and 1 of the number XY21 registered in said register, means included in said test distributor switch and controlled by the digits 2 and 1 of the number XY21 sent over said trunk for operating said one test connector switch to select the corresponding subscriber line XY21, means controlled by the operation of said one test connector switch to select said subscriber line XY21 for again initiating operation of said tester, means for indicating the four digits of a number registered in said register, means controlled by said tester finding a fault on a selected subscriber line for arresting operation of said tester in its cycle, and means controlled by the arrest position of said tester in its cycle for indicating the particular fault found by said tester.

26. The telephone system set forth in claim 25, wherein said trunk includes a pair of line conductors, said sending means sends the digits of a number over both of the line conductors of said trunk and sends said partial release signal over only one of the line conductors of said trunk, and said tester tests a selected subscriber line over both of the line conductors of said trunk.

27. The telephone system set forth in claim 25, wherein said test distributor switch includes means controlled by the operation thereof to select said one test connector switch for testing the idle or busy condition of said one test connector switch and means controlled during the testing of said one test connector switch as being busy for returning a delay signal over said trunk, and said sending means includes means controlled during the return of said delay signal over said trunk for delaying the sending of the digits 1 and 1 of the number XY11 over said trunk.

28. In a telephone system, a plurality of subscriber lines having individual multi-digit numbers assigned thereto, a test switch having access to said subscriber lines, a register, means for registering in said register a first number assigned to a first of said subscriber lines, a cyclic operative mechanism, means for initiating cyclic operation of said mechanism, means controlled by initial cyclic operation of said mechanism for sending to said test switch the digits of said first number registered in said register, means included in said test switch and controlled by the digits of said first number for operating said test switch to select said first subscriber line, means controlled by a subsequent cycle of operation of said mechanism for performing a given series of predetermined fault tests upon a subscriber line selected by said test switch, means controlled jointly by the registration in said register of a predetermined number and by the operation of said mechanism through a still subsequent cycle for registering in said register a second number assigned to a second of said subscriber lines and for sending to said test switch a partial release signal, means included in said test switch and controlled by said partial release signal for effecting a partial release of said test switch, means controlled by a later cycle of operation of said mechanism for sending to said test switch certain only of the digits of said second number registered in said register, means included in said test switch and controlled by the certain digits of said second number for reoperating said test switch to select said second subscriber line, means for indicating the digits of a number registered in said register, means controlled by said testing means finding a fault on a subscriber line selected by said test switch for arresting cyclic operation of said mechanism, and means controlled by the arrested position of said mechanism for indicating the particular fault found by said testing means.

29. In a telephone system, a plurality of subscriber lines having individual multi-digit numbers assigned thereto, a test switch having access to said subscriber lines, a register, means for registering in said register a first number assigned to a first of said subscriber lines, means controlled by said register for sending to said test switch the digits of said first number registered in said register, means included in said test switch and controlled by the digits of said first number for operating said test switch to select said first subscriber line, a tester operative through a cycle to perform a given series of predetermined fault tests upon a subscriber line selected by said test switch, means controlled by the operation of said test switch to select said first subscriber line for initiating operation of said tester, means controlled jointly by the registration of a predetermined number in said register and by the operation of said tester through its cycle for registering in said register a second number assigned to a second of said subscriber lines and for sending to said test switch a full release signal and for arresting operation of said tester, means included in said test switch and controlled by said full release signal for effecting a full release of said test switch, additional means controlled by said register for sending to said test switch the digits of said second number registered in said register so as to reoperate said test switch to select said second subscriber line, means controlled by the operation of said test switch to select said second subscriber line for again initiating operation of said tester, means for indicating the digits of a number registered in said register, means controlled by said tester finding a fault on a subscriber line selected by said test switch for arresting operation of said tester in its cycle, and means controlled by the arrested position of said tester in its cycle for indicating the particular fault found by said tester.

30. In a telephone system, a plurality of subscriber lines divided into thousand groups each divided into hundred groups each divided into ten groups each divided into unit positions, each of said subscriber lines being assigned an individual four-digit number the respective digits of which identify the respective thousand group and hundred group and ten group and unit position thereof, a test switch having access to said subscriber lines, a register, means for registering in said register the number X111, where X is any digit, means controlled by said register for sending to said test switch the digits of the number X111 registered in said register, means included in said test switch and controlled by the digits of the number X111 for operating said test switch to select said subscriber line X111, a tester operative through a cycle to perform a given series of predetermined fault tests upon a subscriber line seleced by said test switch, means controlled by the operation of said test switch to select said subscriber line X111 for initiating operation of said tester, means controlled jointly by the registration in said register of the number X100 and by the operation of said tester through its cycle for registering in said register the number X211 and for sending to said test switch a full release signal and for arresting operation of said tester, means included in said test switch and controlled by said full release signal for effecting a full release of said test switch, additional means controlled by said register for sending to said test switch the digits of the number X211 registered in said register so as to reoperate said test switch to select said subscriber line X211, means controlled by the operation of said test switch to select said subscriber line X211 for again initiating operation of said tester, means for indicating the four digits of a number registered in said register, means controlled by said tester finding a fault on a subscriber line selected by said test switch for arresting operation of said tester in its cycle, and means controlled by the arrested position of said tester in its cycle for indicating the particular fault found by said tester.

31. In a telephone system, a plurality of subscriber lines divided into thousand groups each divided into hundred groups each divided into ten groups each divided into unit positions, each of said subscriber lines being assigned an individual four-digit number the respective digits of which identify the respective thousand group and hundred group and ten group and unit position thereof, a test switch having access to said subscriber lines, a register, means for registering in said register the number 1111, means controlled by said register for sending to said test switch the digits of the number 1111 registered in said register, means included in said test switch and controlled by the digits of the number 1111 for operating said test switch to select said subscriber line 1111, a tester operative through a cycle to perform a given series of predetermined fault tests upon a subscriber line selected by said test switch, means controlled by the operation of said test switch to select said subscriber line 1111 for initiating operation of said tester, means controlled jointly by the registration in said register of the number 1000 and by the operation of said tester through its cycle for registering in said register the number 2111 and for sending to said test switch a full release signal and for arresting operation of said tester, means included in said test switch anr rontrolled by said full release signal for effecting a full release of said test switch, additional means controlled by said register for sending to said test switch the digits of the number 2111 registered in said register so as to reoperate said test switch to select said subscriber line 2111, means controlled by the operation of said test switch to select said subscriber line 2111 for again initiating operation of said tester, means for indicating the four digits of a number registered in said register, means controlled by said tester finding a fault on a subscriber line selected by said test switch for arresting operation of said tester in its cycle, and means controlled by the arrested position of said tester in its cycle for indicating the particular fault found by said tester.

32. In a telephone system, a plurality of subscriber lines divided into thousand groups each divided into hundred groups each divided into ten groups each divided in unit positions, each of said subscriber lines being assigned an individual four-digit number the respective digits of which identify the respective thousand group and hundred group and test group and unit position thereof, a group of test connector switches each having access to a given hundred group of said subscriber lines, a test distributor switch having access to said test connector switches, a trunk extending to said test distributor switch, a register, means for registering in said register the number X111, where X is any digit, means controlled by said register for sending over said trunk the digits of the number X111 registered in said register, means included in said test distributor switch and controlled by the digits X and 1 of the number X111 sent over said trunk for operating said test distributor switch to select the corresponding one of said test connector switches, means included in said test distributor switch and controlled by the digits 1 and 1 of the number X111 sent over said trunk for operating said one test connector switch to select the corresponding subscriber line X111, a tester operative through a cycle to perform a given series of predetermined fault tests over said trunk upon a selected subscriber line, means controlled by the operation of said one test connector switch to select said subscriber line X111 for initiating operation of said tester, means controlled jointly by the registration in said register of the number X100 and by the operation of said tester through its cycle for registering in said register the number X211 and for sending over said trunk a full release signal and for arresting operation of said tester, means included in said test distributor switch and controlled by said full release signal sent over said trunk for releasing both said test distributor switch and said one test connector switch, additional means controlled by said register for sending over said trunk the digits of the number X211 registered in said register so as to reoperate said test distributor switch in accordance with the digits X and 2 of the number X211 to select the corresponding other of said test connector switches and to operate said other test connector switch in accordance with the digits 1 and 1 of the number X211 to select the corresponding subscriber line X211, means controlled by the operation of said other test connector switch to select said subscriber line X211 for again initiating operation of said tester, means for indicating the four digits of a number registered in said register, means controlled by said tester finding a fault on a selected subscriber line for arresting operation of said tester in its cycle, and means controlled by the arrested position of said tester in its cycle for indicating the particular fault found by said tester.

33. In a telephone system, a plurality of subscriber lines divided into thousand groups each divided into hundred groups each divided into ten groups each divided in unit positions, each of said subscriber lines being assigned an individual four-digit number the respective digits of which identify the respective thousand group and hundred group and ten group and unit position thereof, a group of test connector switches each having access to a given hundred group of said subscriber lines, a test distributor switch having access to said test connector switches, a trunk extending to said test distributor switch, a register, means for registering in said register the number 1111, means controlled by said register for sending over said trunk the digits of the number 1111 registered in said register, means included in said test distributor switch and controlled by the first two digits 1 and 1 of the number 1111 sent over said trunk for operating said test distributor switch to select the corresponding one of said test connector switches, means included in said test distributor switch and controlled by the second two digits 1 and 1 of the number 1111 sent over said trunk for operating said one test connector switch to select the corresponding subscriber line 1111, a tester operative through a cycle to perform a given series of predetermined fault tests over said trunk upon a selected subscriber line, means controlled by the operation of said one test connector switch to select said subscriber line 1111 for initiating operation of said tester, means controlled jointly by the registration in said register of the number 1000 and by the operation of said tester through its cycle for registering in said register the number 2111 and for sending over said trunk a full release signal and for arresting operation of said tester, means included in said test distributor switch and controlled by said full release signal sent over said trunk for releasing both said test distributor switch and said one test connector switch, additional means controlled by said register for sending over said trunk the digits of the number 2111 registered in said register so as to reoperate said test distributor switch in accordance with the digits 2 and 1 of the number 2111 to select the corresponding other of said test connector switches, and to operate said other test connector switch in accordance with the digits 1 and 1 of the number 2111 to select the corresponding subscriber line 2111, means controlled by the operation of said other test connector switch to select said subscriber line 2111 for again initiating operation of said tester, means for indicating the four digits of a number registered in said register, means controlled by said tester finding a fault on a selected subscriber line for arresting operation of said tester in its cycle, and means controlled by the arrested position of said tester in its cycle for indicating the particular fault found by said tester.

34. The telephone system set forth in claim 32, wherein said trunk includes a pair of line conductors and a control conductor, said sending means sends the digits of a number over the line conductors of said trunk and sends said full release signal over the control conductor of said trunk, and said tester tests a selected subscriber line over the line conductors of said trunk.

35. The telephone system set forth in claim 32, wherein said test distributor switch includes means controlled by the operation thereof to select said one test connector switch for testing the idle or busy condition of said one test connector switch and means controlled during the testing of said one test connector switch as being busy for returning a relay signal over said trunk, and said sending means includes means controlled during the return of said delay signal over said trunk for delaying the sending of the last two digits 1 and 1 of the number X111 over said trunk.

36. In a telephone system, a plurality of subscriber lines having individual multi-digit numbers assigned thereto, a test switch having access to said subscribed lines, a register, means for registering in said register a first number assigned to a first of said subscriber lines, a cyclic operative mechanism, means for initiating cyclic operation of said mechanism, means controlled by initial cyclic operation of said mechanism for sending to said test switch the digits of said first number registered in said register, means included in said test switch and controlled by the digits of said first number for operating said test switch to select said first subscriber line, means controlled by a subsequent cycle of operation of said mechanism for performing a given series of predetermined fault tests upon a subscriber line selected by said test switch, means controlled jointly by the registration in said register of a predetermined number and by the operation of said mechanism through a still subsequent cycle for registering in said register a second number assigned to a second of said subscriber lines and for sending to said test switch a full release signal, means included in said test switch and controlled by said full release signal for effecting a full release of said test switch, means controlled by a later cycle of operation of said mechanism for sending to said test switch the digits of said second number registered in said register so as to reoperate said test switch to select said second subscriber line, means for indicating the digits of a number registered in said register, means controlled by said testing means finding a fault on a subscriber line selected by said test switch for arresting cyclic operation of said mechanism, and means controlled by the arrested position of said mechanism for indicating the particular fault found by said testing means.

37. In a telephone system, a plurality of subscriber lines divided into thousand groups each divided into hundred groups each divided into ten groups each divided into unit positions, each of said subscriber lines being assigned an individual four digit number the respective digits of which identify the respective thousand group and hundred group and ten group and unit position thereof, a test switch having access to said subscriber lines, a register, means for registering in said register the number 1111, means controlled by said register for sending to said test switch the digits of the number 1111 registered in said register, means included in said test switch and controlled by the digits of the number 1111 for operating said test switch to select said subscriber line 1111, a tester operative through a cycle to perform a given series of predetermined fault tests upon a subscriber line selected by said test switch, means controlled by the operation of said test switch to select said subscriber line 1111 for initiating operation of said tester, means controlled jointly by the registration in said register of the number 1111 and by the operation of said tester through its cycle for registering in said register the number 1112 and for sending to said test switch a step signal and for arresting operation of said tester, means included in said test switch and controlled by said step signal for reoperating said test switch to select said subscriber line 1112, means controlled by the reoperation of said test switch to select said subscriber line 1112 for again initiating operation of said tester, means controlled jointly by the registration in said register of the number 1110 and by the operation of said tester through its cycle for registering in said register the number 1121 and for sending to said test switch a partial release signal and for arresting the operation of said tester, means included in said test switch and controlled by said partial release signal for effecting a partial release of said test switch, additional means controlled by said register for sending to said test switch the digits 2 and 1 of the number 1121 registered in said register, means included in said test switch and controlled by the digits 2 and 1 of the number 1121 for reoperating said test switch to select said subscriber line 1121, means controlled by the reoperation of said test switch to select said subscriber line 1121 for again initiating operation of said tester, means controlled jointly by the registration in said register of the number 1100 and by the operation of said tester through its cycle for registering in said register the number 1211 and for sending to said test switch a full release signal and for arresting operation of said tester, means included in said test switch and controlled by said full release signal for effecting a full release of said test switch, additional means controlled by said register for sending to said test switch the digits of the number 1211 registered in said register so as to reoperate said test switch to select said subscriber line 1211, means controlled by the reoperation of said test switch to select said subscriber line 1211 for again initiating operation of said tester, means for indicating the digits of a number registered in said register, means controlled by said tester finding a fault on a subscriber line selected by said test switch for arresting operation of said tester in its cycle, and means controlled by the arrested position of said tester in its cycle for indicating the particular fault found by said tester.

38. In a telephone system, a plurality of subscriber lines divided into thousand groups each divided into hundred groups each divided into ten groups each divided into unit positions, each of said subscriber lines being assigned an individual four-digit number the respective digits of which identify the respective thousand group and hundred group and ten group and unit position thereof, a thousand register, a hundred register, a ten register, a unit register, a finish relay, a thousand relay, a hundred relay, a ten relay, cyclic operative mechanism, means for registering the digit 1 in each of said registers, means for initiating cyclic operation of said mechanism, means controlled by cyclic operation of said mechanism for successively registering the digits 2, 3, etc., 0, 1, 2, etc., in said unit register, means jointly controlled by the registration of the digit 0 in said unit register and by the next cycle of operation of said mechanism for operating said ten relay, means controlled by successive operation of said ten relay for successively registering the digits 2, 3, etc., 0, 1, 2, etc., in said ten register, means jointly controlled by the registration of the digit 0 in said ten register and by the next operation of said ten relay for operating said hundred relay, means controlled by successive operations of said hundred relay for successively registering the digits 2, 3, etc., 0, 1, 2, etc., in said hundred register, means jointly controlled by the registration of the digit 0 in said hundred register and by the next operation of said hundred relay for operating said thousand relay, means controlled by successive operations of said thousand relay for successively registering the digits 2, 3, etc., and 0 in said thousand register, means controlled jointly by the registration of the digit 0 in said thousand register and by the next operation of said thousand relay for operating said finish relay, means controlled by operation of said finish relay for arresting cyclic operation of said mechanism and for clearing said registers of the digits registered therein, a test switch having access to said subscriber lines, means controlled by the cyclic operation of said mechanism for operating said test switch successively to select said subscriber lines corresponding to the four-digit numbers registered in said registers, means for indicating the four digits registered in registers, and means controlled by the cyclic operation of said mechanism for testing each idle subscriber line selected by said test switch.

39. In a telephone system, a plurality of subscriber lines divided into thousand groups each divided into hundred groups each divided into ten groups each divided into unit positions, each of said subscriber lines being assigned an individual four-digit number the respective digits of which identify the respective thousand group and hundred group and ten group and unit position thereof, a thousand register, a hundred register, a ten register, a unit register, a finish relay, a thousand relay, a hundred relay, a ten relay, cyclic operative mechanism, means for registering the digit 1 in each of said registers, means for initiating cyclic operation of said mechanism, means controlled by cyclic operation of said mechanism for successively registering the digits 2, 3, etc., 0, 1, 2, etc., in said unit register, means jointly controlled by the registration of the digit 0 in said unit register and by the next cycle of operation of said mechanism for operating said ten relay, means controlled by successive operation of said ten relay for successively registering the digits 2, 3, etc., 0, 1, 2, etc., in said ten register, means jointly controlled by the registration of the digit 0 in said ten register and by the next operation of said ten relay for operating said hundred relay, means controlled by successive operations of said hundred relay for successively registering the digits 2, 3, etc., 0, 1, 2, etc., in said hundred register, means jointly controlled by the registration of the digit 0 in said hundred register and by the next operation of said hundred relay for operating said thousand relay, means controlled by successive operations of said thousand relay for successively registering the digits 2, 3, etc., and 0 in said thousand register, a test switch having access to said subscriber lines, means controlled by the cyclic operation of said mechanism for operating said test switch successively to select said subscriber lines corresponding to the four-digit numbers registered in said registers, means for indicating the four digits registered in registers, means controlled by the cyclic operation of said mechanism for testing each idle subscriber line selected by said test switch, means jointly controlled by the registration in said thousand register of the digit corresponding to the last thousand group of subscriber lines and by the next operation of said thousand relay for operating said finish relay, means controlled by operation of said finish relay for arresting cyclic operation of said mechanism and for clearing said registers of the digits registered therein.

40. The telephone system set forth in claim 38, wherein said testing means performs a given series of predetermined fault tests upon each idle subscriber line selected by said test switch, and further includes means controlled by the finding of a fault by said testing means for arresting operation of said mechanism in its cycle, and means controlled by the arrested position of said mechanism in its cycle for indicating the particular fault found by said testing means.

41. In a telephone system, a plurality of subscriber lines, a test line, a test switch having access to said subscriber lines and said test line, means for operating said test switch to select successively said subscriber lines and said test line, a test relay, means controlled by the operation of said test switch to select one of said subscriber lines or said test line for connecting said test relay to said test switch, means whereby said test relay is operated when it is connected to said one subscriber line only in the event said one subscriber line has a line fault thereon and whereby said test relay is restored when it is connected to said test line only in the event said test relay has a fault therein, a signal, an operating circuit for said signal, control means for completing said operating circuit, means whereby said control means is responsive jointly to operation of said test relay and to connection thereof to one of said subscriber lines, additional means whereby said control means is responsive jointly to restoration of said test relay and to connection thereof to said test line, and means for indicating the one of said subscriber lines or said test line selected by said test switch.

42. In a telephone system, a plurality of subscriber lines, a test line, a test switch having access to said subscriber lines and said test line, means for operating said test switch to select successively said subscriber lines and said test line, a test relay, means controlled by the operation of said test switch to select one of said subscriber lines or said test line for first operating said test relay and then for connecting said operated test relay to said test switch, means whereby said test relay is held in its operated position when it is connected to said one subscriber line only in the event said one subscriber line has a line fault thereon and whereby said test relay is returned to its restored position when it is connected to said test line only in the event said test relay has a fault therein, a signal, an operating circuit for said signal, control means for completing said operating circuit, means whereby said control means is responsive to operation of said test relay when it is connected to one of said subscriber lines, additional means whereby said control means is responsive to restoration of said test relay when it is connected to said test line, and means for indicating the one of said subscriber lines or said test line selected by said test switch.

43. In a telephone system, a plurality of subscriber lines, a test line, a test switch having access to said subscriber lines and said test line, means for operating said test switch to select successively said subscriber lines and said test line, a test relay, a given number of test circuits, normally operating cyclic means having said given number of positions and controlled by the operation of said test switch to select one of said subscriber lines or said test line for successively connecting said test relay in said test circuits to said test switch, means whereby said test relay is operated when it is connected in one of said test circuits to said one subscriber line only in the event said one subscriber line has a corresponding type of line fault thereon and whereby said test relay is restored when it is connected in a predetermined one of said test circuits to said test line only in the event said test relay has a fault therein, means jointly controlled by the operation of said test relay and by the operation of said test switch to select said one subscriber line for arresting operation of said cyclic means in its cycle, additional means jointly controlled by the restoration of said test relay and by the operation of said test switch to select said test line for arresting operation of said cyclic means in its cycle, a given number of signals respectively corresponding to said given number of positions of said cycle means, respective operating circuits for said signals, control means for selectively completing said operating circuits, means whereby said control means is responsive jointly to operation of said test relay and to the arrested position of said cycle means in its cycle so as to operate the corresponding one of said signals to indicate the corresponding fault found by said test relay upon a subscriber line selected by said test switch, additional means whereby said control means is responsive jointly to the restoration of said test relay and to the arrested position of said cycle means in its cycle so as to operate the corresponding one of said signals to indicate the corresponding fault found in said test relay when said test line is selected by said test switch, and means for indicating the one of said subscriber lines or said test line selected by said test switch.

44. In a telephone system a plurality of subscriber lines, a plurality of test lines, said lines being grouped so that each group includes a fixed number of subscriber lines and one test line, a test switch having access to said lines, means for operating said test switch to select in a predetermined order the subscriber lines and the test line in successive ones of said groups, means controlled by the operation of said test switch to select one of said subscriber lines or one of said test lines for connecting said test relay to said test switch, means whereby said test relay is operated when it is connected to said one subscriber line only in the event said one subscriber line has a line fault thereon and whereby said test relay is restored when it is connected to said one test line only in the event said test relay has a fault therein, a signal, an operating circuit for said signal, first control means for arresting further operation of said test switch, second control means for completing said operating circuit, means whereby said first and second control means are responsive to operation of said test relay when said test switch has selected one of said subscriber lines, additional means whereby said first and second control means are responsive to restoration of said test relay when said test switch has selected one of said test lines, and means for indicating the one of said subscriber lines or the one of said test lines selected by said test switch.

FRANK KESSLER.

REFERENCES CITED

The following references are of record in the file of this patent:

UNITED STATES PATENTS

| Number | Name | Date |
|---|---|---|
| 1,632,048 | Van de Water | June 14, 1927 |
| 1,881,554 | Hartley | Oct. 11, 1932 |